US011263155B2

(12) United States Patent
Parker et al.

(10) Patent No.: US 11,263,155 B2
(45) Date of Patent: Mar. 1, 2022

(54) MANAGING FUSION OF MEMORY REGIONS AND OWNERSHIP ATTRIBUTES FOR FUSED MEMORY REGIONS

(71) Applicant: ARM Limited, Cambridge (GB)

(72) Inventors: Jason Parker, Sheffield (GB); Martin Weidmann, Havervill (GB)

(73) Assignee: Arm Limited, Cambridge (GB)

( * ) Notice: Subject to any disclaimer, the term of this patent is extended or adjusted under 35 U.S.C. 154(b) by 39 days.

(21) Appl. No.: 16/647,642

(22) PCT Filed: Dec. 10, 2018

(86) PCT No.: PCT/GB2018/053574
§ 371 (c)(1),
(2) Date: Mar. 16, 2020

(87) PCT Pub. No.: WO2019/145667
PCT Pub. Date: Aug. 1, 2019

(65) Prior Publication Data
US 2020/0218673 A1 Jul. 9, 2020

(30) Foreign Application Priority Data

Jan. 26, 2018 (GB) ..................................... 1801295

(51) Int. Cl.
*G06F 12/14* (2006.01)
*G06F 12/1009* (2016.01)
*G06F 12/1027* (2016.01)
(52) U.S. Cl.
CPC ...... *G06F 12/1483* (2013.01); *G06F 12/1009* (2013.01); *G06F 12/1027* (2013.01);
(Continued)

(58) Field of Classification Search
CPC ............ G06F 12/0253; G06F 12/1408; G06F 12/1458; G06F 12/1491; G06F 2212/1044;
(Continued)

(56) References Cited

U.S. PATENT DOCUMENTS

2006/0212675 A1 9/2006 Sartorius et al.
2009/0019253 A1 1/2009 Stecher et al.
(Continued)

FOREIGN PATENT DOCUMENTS

GB 2539435 12/2016
WO 2010/131373 11/2010
WO 2016/204913 12/2016

OTHER PUBLICATIONS

International Search Report and Written Opinion of the ISA for PCT/GB2018/053574 dated Mar. 6, 2019, 15 pages.
(Continued)

*Primary Examiner* — Michael Krofcheck
(74) *Attorney, Agent, or Firm* — Nixon & Vanderhye P.C.

(57) ABSTRACT

A realm management unit (RMU) maintains an ownership table specifying ownership entries for corresponding memory regions defining ownership attributes specifying, from among a plurality of realms, an owner realm of the corresponding region. Each realm corresponds to at least a portion of at least one software process. The owner realm has a right to exclude other realms from accessing data stored in the corresponding region. Memory access is controlled based on the ownership table. In response to a region (Continued)

fuse command specifying a fuse target address indicative contiguous regions of memory to be fused into a fused group of regions, a region fuse operation updates the ownership table to indicate that the ownership attributes for the fused group of regions are represented by a single ownership entry. This provides architectural support for enabling improvement of TLB performance.

22 Claims, 36 Drawing Sheets

(52) U.S. Cl.
CPC ...... *G06F 12/1458* (2013.01); *G06F 12/1491* (2013.01); *G06F 2212/1052* (2013.01); *G06F 2212/68* (2013.01)

(58) Field of Classification Search
CPC ......... G06F 2212/1052; G06F 12/1483; G06F 12/1009; G06F 12/1027; G06F 12/1441; G06F 12/1425; G06F 12/0284; G06F 12/10; G06F 12/1036; G06F 12/1475; G06F 2212/68
See application file for complete search history.

(56) References Cited

U.S. PATENT DOCUMENTS

| | | |
|---|---|---|
| 2010/0082929 A1 | 4/2010 | Kobayashi |
| 2011/0145512 A1* | 6/2011 | Adl-Tabatabai .... G06F 9/30087 711/141 |
| 2011/0145531 A1 | 6/2011 | Kobayashi |
| 2011/0153954 A1* | 6/2011 | Seki ...................... G06F 3/0647 711/141 |
| 2014/0201490 A1 | 7/2014 | Yoo et al. |
| 2016/0371496 A1* | 12/2016 | Sell ...................... G06F 9/45558 |
| 2018/0011797 A1 | 1/2018 | Shi et al. |
| 2018/0150251 A1* | 5/2018 | Parker ................ G06F 12/1491 |

OTHER PUBLICATIONS

Combined Search and Examination Report for GB1801295.5 dated Jul. 17, 2018, 7 pages.
Robert Bedichek, "Some Efficient Architecture Simulation Techniques," Proceedings of the Winter 1990 USENIX Conference, Jan. 22-26, 1990, 12 pages.
Seongwook Jin et al., "Architectural Support for Secure Virtualization under a Vulnerable Hypervisor", Micro '11, Dec. 3-7, 2011, pp. 272-283.

\* cited by examiner

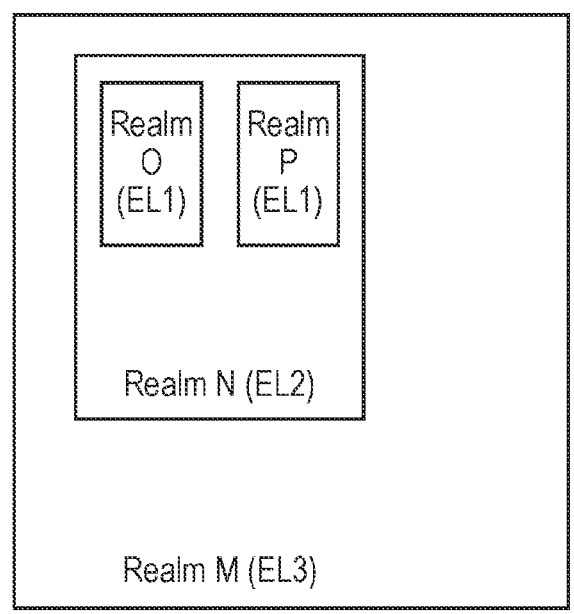
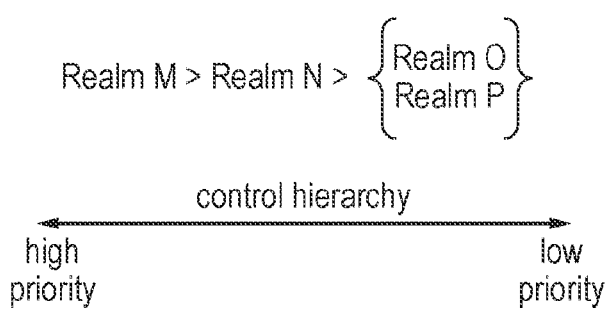
FIG. 6

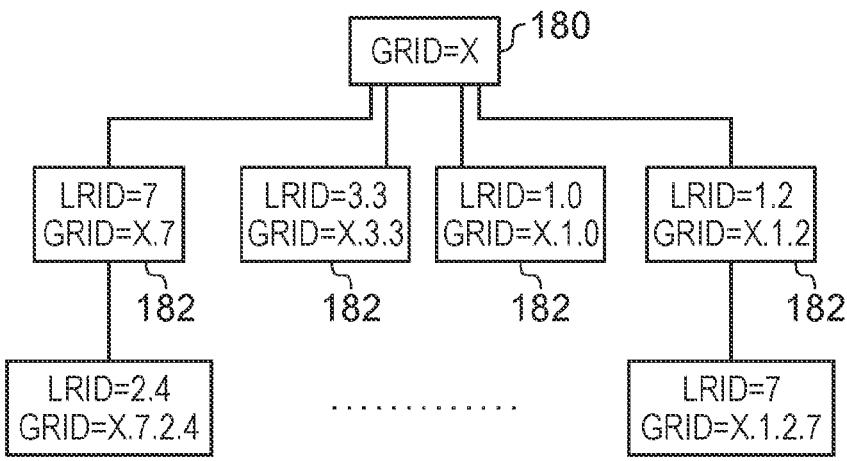

FIG. 15

| Field | Description |
|---|---|
| gRID | gRID of this Realm. |
| State | Life cycle state. |
| Type | Realm type. |
| BEL | Boundary Exception level. |
| Resource count | Total number of RPGs owned by the Realm and all of its descendants. |
| Protected address start | Start of protected address range. |
| Protected address end | End of protected address range. |
| Memory key | Used to encrypt contents of memory owned by the Realm. |
| Paging key | Used to encrypt data which is paged out from memory to persistent storage. |
| RDTE | Realm Descriptor Tree Entry, root of Realm Descriptor Tree. |
| REC pointer | Pointer to the primary REC of the Realm. |

| State | Parameters modifiable | Valid encryption keys | Can own RPGs | Executable |
|---|---|---|---|---|
| Clean | Yes | No | No | No |
| New | No | Yes | Yes | No |
| Active | No | Yes | Yes | Yes |
| Invalid | No | Yes | Yes | No |

FIG. 17

| Property | Description |
|---|---|
| Owner Realm | Owner of this RPG. |
| State | Life cycle state of this RPG. |
| Mapped address | RBA at which the RPG was mapped at the point it became owned by the Realm. |
| Visibility | Which Realms, in addition to the owner, can access the RPG. |

| Parent visibility bit | Global visibility bit | Resulting RPG visibility |
|---|---|---|
| 0 | 0 | *Owner* |
| 0 | 1 | Invalid |
| 1 | 0 | *Parent* |
| 1 | 1 | *Global* |

FIG. 20

| | State | Accesible to software | Reserved for RMU | In use by RMU |
|---|---|---|---|---|
| | *Invalid* | No | No | No |
| | *Valid* | Yes | No | No |
| RMU-private | *RMUClean* | No | Yes | No |
| | *RMURegistered* | No | Yes | Yes |
| | *RMUExporting* | No | Yes | Yes |
| | *RMUImporting* | No | Yes | Yes |

FIG. 21

| State | Accessible to Software | Allocated to owner and prevented from being reallocated | Reserved for RMU | In use by RMU |
|---|---|---|---|---|
| Invalid | No | No | No | No |
| Zero Commit | No | Yes | No | No |
| Valid | Yes | Yes | No | No |
| RMUClean | No | Yes | Yes | No |
| RMURegistered | No | Yes | Yes | Yes |
| RMUExporting | No | Yes | Yes | Yes |
| RMUImporting | No | Yes | Yes | Yes |

RMU-Private: { RMUClean, RMURegistered, RMUExporting, RMUImporting }

FIG. 35

MANAGING FUSION OF MEMORY REGIONS AND OWNERSHIP ATTRIBUTES FOR FUSED MEMORY REGIONS

This application is the U.S. national phase of International Application No. PCT/GB2018/053574 filed Dec. 10, 2018 which designated the U.S. and claims priority to GB Patent Application No. 1801295.5 filed Jan. 26, 2018, the entire contents of each of which are hereby incorporated by reference.

The present technique relates to the field of data processing.

It is known to provide memory access control techniques for enforcing access rights for particular memory regions. Typically, these are based on privilege level, so that a process executing at a higher privilege can exclude less privileged processes from accessing memory regions.

At least some examples provide an apparatus comprising: processing circuitry to perform data processing in response to one or more software processes;

a realm management unit to maintain an ownership table specifying a plurality of ownership entries, each ownership entry defining ownership attributes for a corresponding region of memory of a predetermined size, the ownership attributes specifying, from among a plurality of realms, an owner realm of the corresponding region, where each realm corresponds to at least a portion of at least one of the software processes and the owner realm has a right to exclude other realms from accessing data stored in the corresponding region; and memory access circuitry to control access to the memory based on the ownership table; in which:

the realm management unit is responsive to a region fuse command specifying a fuse target address indicative of a plurality of contiguous regions of the memory to be fused into a fused group of regions, to perform a region fuse operation to update the ownership table to indicate that the ownership attributes for each region in the fused group of regions are represented by a single ownership entry corresponding to a predetermined region of the fused group.

At least some examples provide a method comprising: maintaining an ownership table specifying a plurality of ownership entries, each ownership entry defining ownership attributes for a corresponding region of memory of a predetermined size, the ownership attributes specifying, from among a plurality of realms, an owner realm of the corresponding region, where each realm corresponds to at least a portion of at least one software process processed by processing circuitry, and the owner realm has a right to exclude other realms from accessing data stored in the corresponding region;

controlling access to the memory based on the ownership table; and in response to a region fuse command specifying a fuse target address indicative of a plurality of contiguous regions of the memory to be fused into a fused group of regions, performing a region fuse operation to update the ownership table to indicate that the ownership attributes for each region in the fused group of regions are represented by a single ownership entry corresponding to a predetermined region of the fused group.

At least some examples provide a computer program for controlling a host data processing apparatus to simulate processing of one or more software processes on a target data processing apparatus, the computer program comprising:

processing program logic to control the host data processing apparatus to perform data processing in response to target code representing said one or more software processes;

realm management program logic to maintain an ownership table specifying a plurality of ownership entries, each ownership entry defining ownership attributes for a corresponding region of memory of a predetermined size, the ownership attributes specifying, from among a plurality of realms, an owner realm of the corresponding region, where each realm corresponds to at least a portion of at least one of the software processes and the owner realm has a right to exclude other realms from accessing data stored in the corresponding region; and memory access program logic to control access to the memory based on the ownership table; in which:

the realm management program logic is responsive to a region fuse command specifying a fuse target address indicative of a plurality of contiguous regions of the memory to be fused into a fused group of regions, to perform a region fuse operation to update the ownership table to indicate that the ownership attributes for each region in the fused group of regions are represented by a single ownership entry corresponding to a predetermined region of the fused group.

The computer program may be stored on a storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates a data processing system including a plurality of processing elements utilising memory regions stored within a first memory and a second memory;

FIG. 2 schematically illustrates a relationship between a plurality of processes executed, privilege levels associated with those processes, and realms associated with those processes for controlling which process owns a given memory region and accordingly has exclusive rights to control access to that given memory region;

FIG. 3 schematically illustrates memory regions under management by a realm management unit and a memory management unit;

FIG. 4 schematically illustrates a sequence of program instructions executed to export a given memory region from a first memory to a second memory;

FIG. 5 is a flow diagram schematically illustrating page export;

FIG. 6 schematically illustrates a plurality of realms and their relationship within a control hierarchy to control which export commands can interrupt which other export commands;

FIG. 7 is a flow diagram schematically illustrating page import;

FIG. 8 schematically illustrates a first export command source and a second export command source performing overlapping export operations for a given memory region;

FIG. 15 shows an example of local and global realm identifiers for each realm in a realm hierarchy;

FIG. 16 shows an example of contents of a realm descriptor;

FIG. 17 is a table illustrating different realm lifecycle states;

FIG. 19 is a table showing contents of an entry in an ownership table for a given memory region;

FIG. 20 is a table showing visibility attributes which can be set for a given memory region to control which realms other than the owner are allowed to access the region;

FIG. 21 shows an example of different lifecycle states for a memory region, including states corresponding to RMU-private memory regions which are reserved for exclusive access by the realm management unit;

Figure 24:
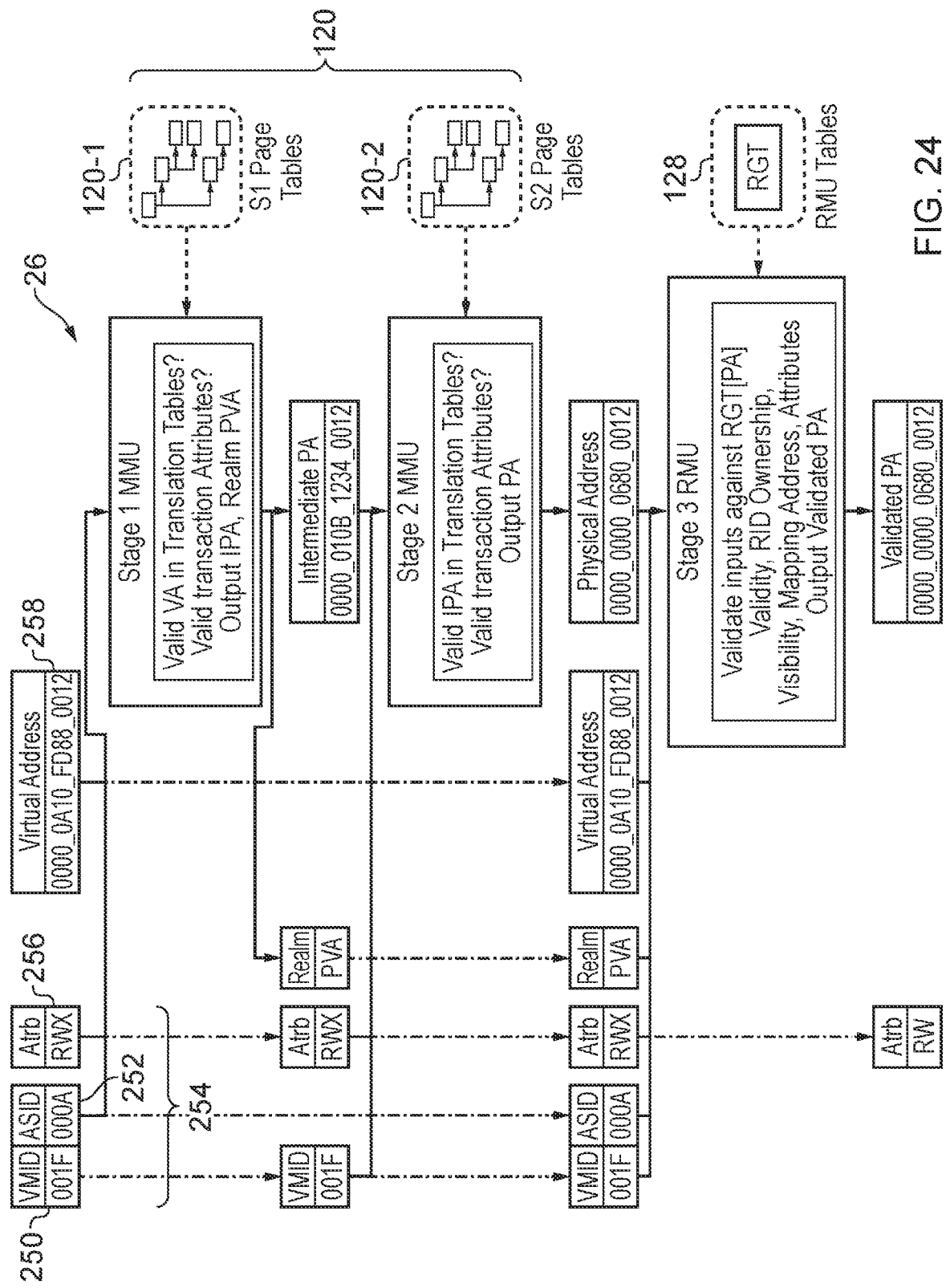
Figure 25:
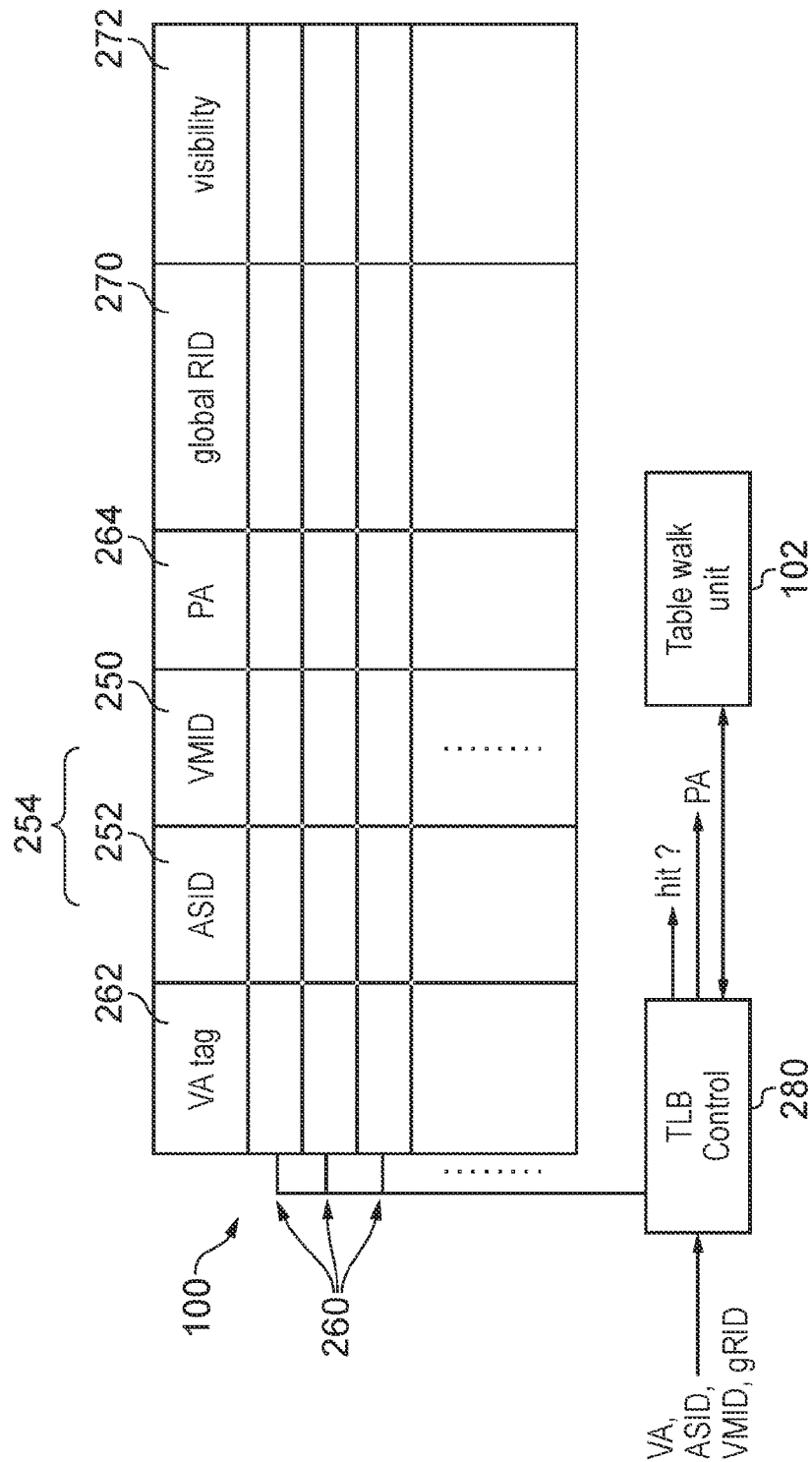
Figure 26:
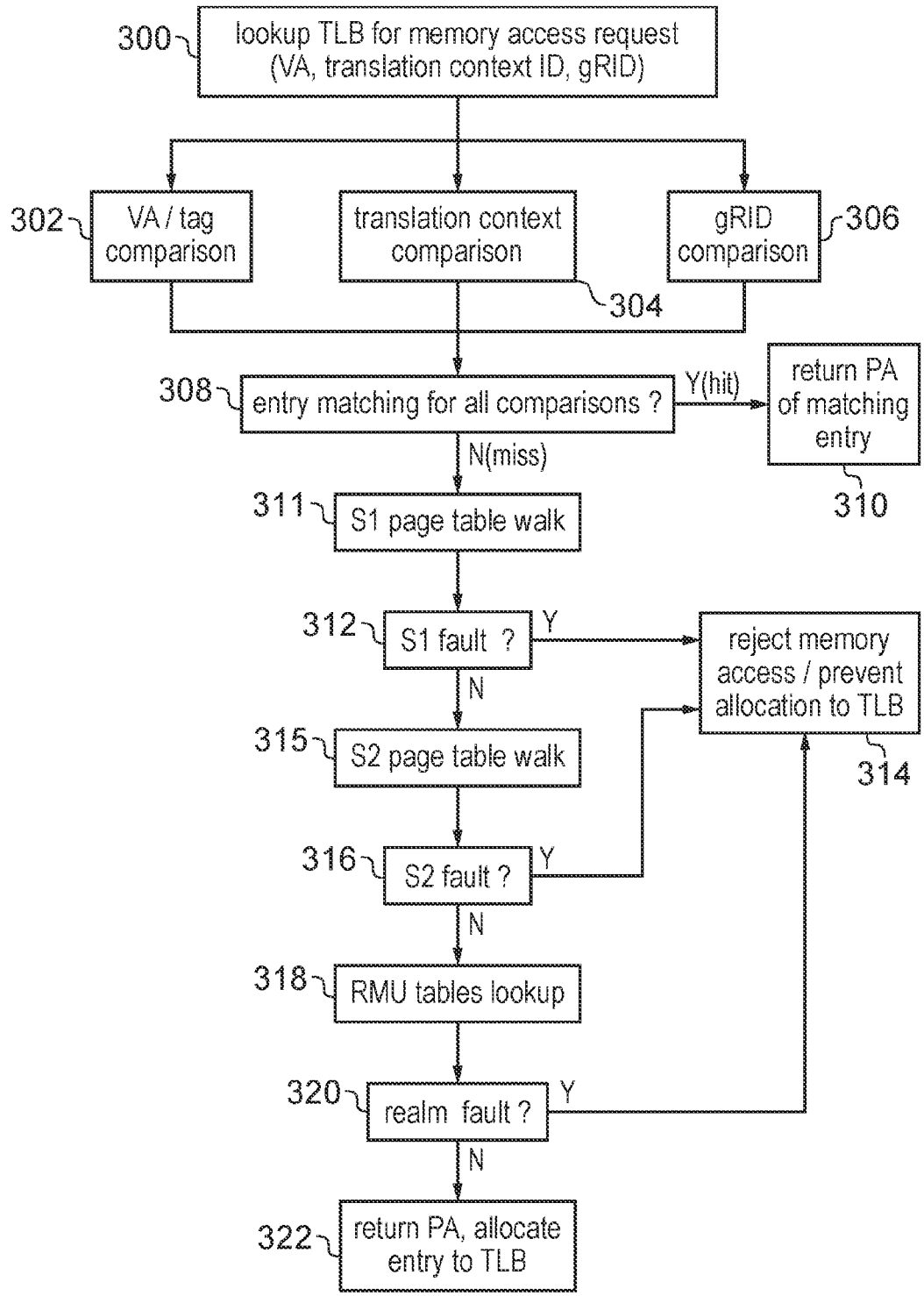
Figure 27:
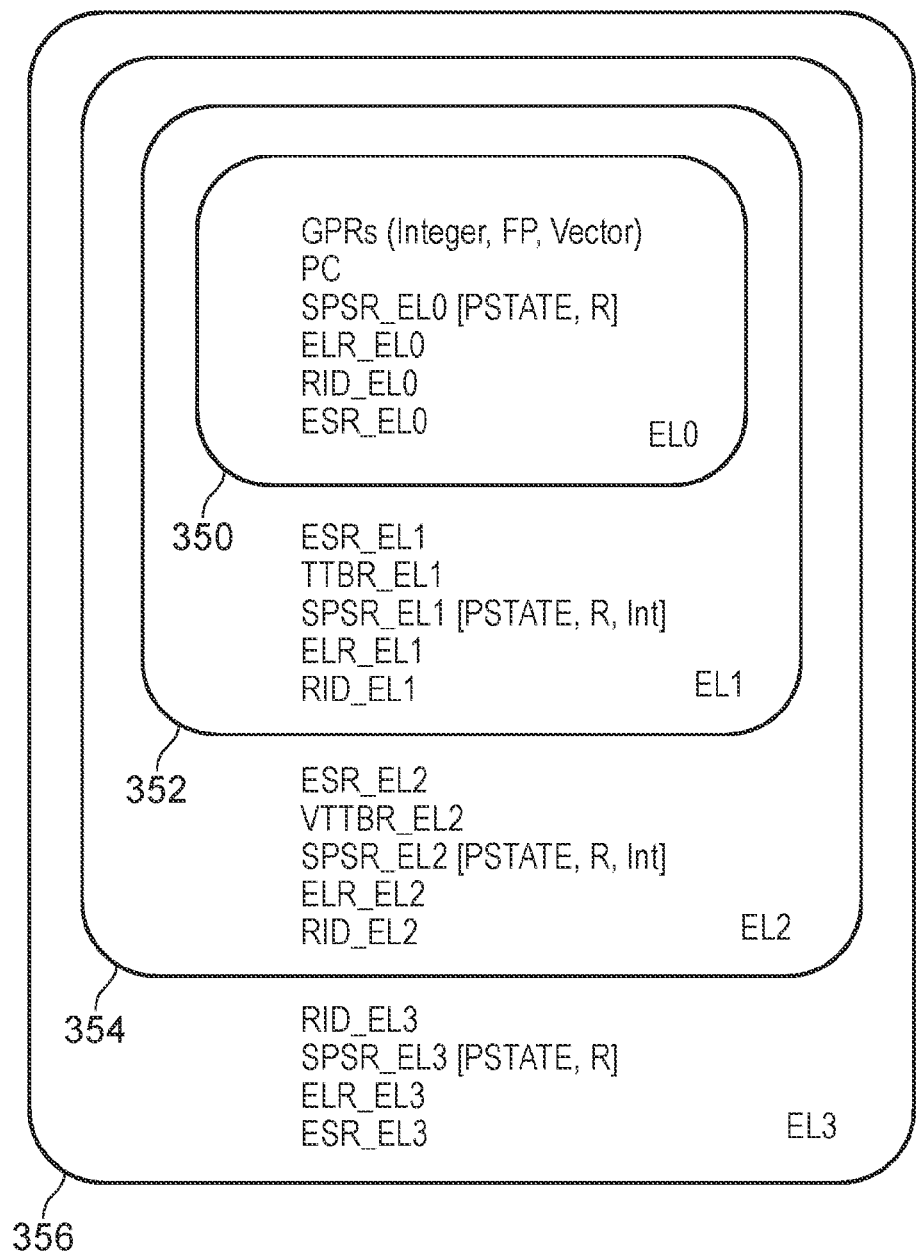
Figure 28:
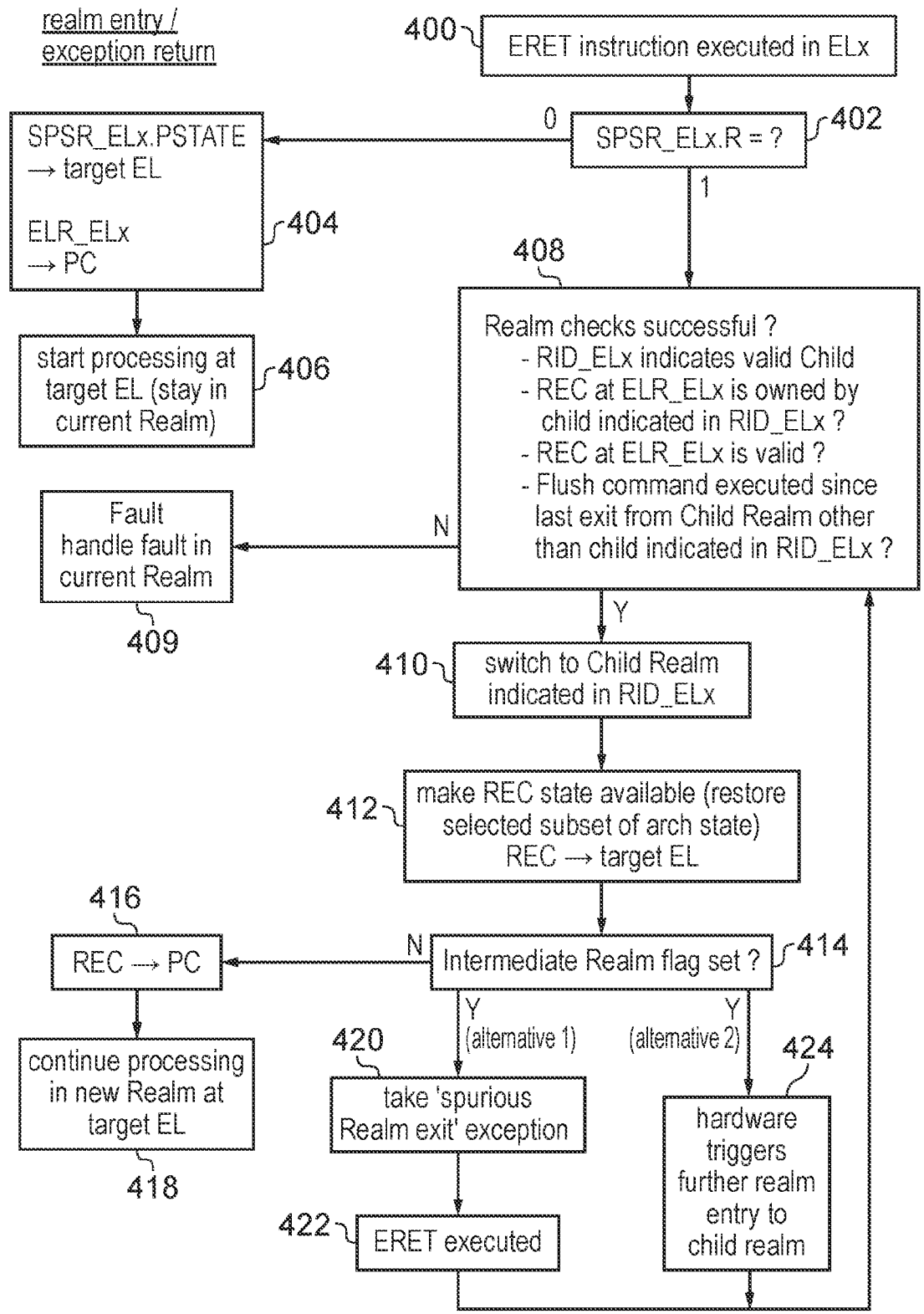
Figure 29:
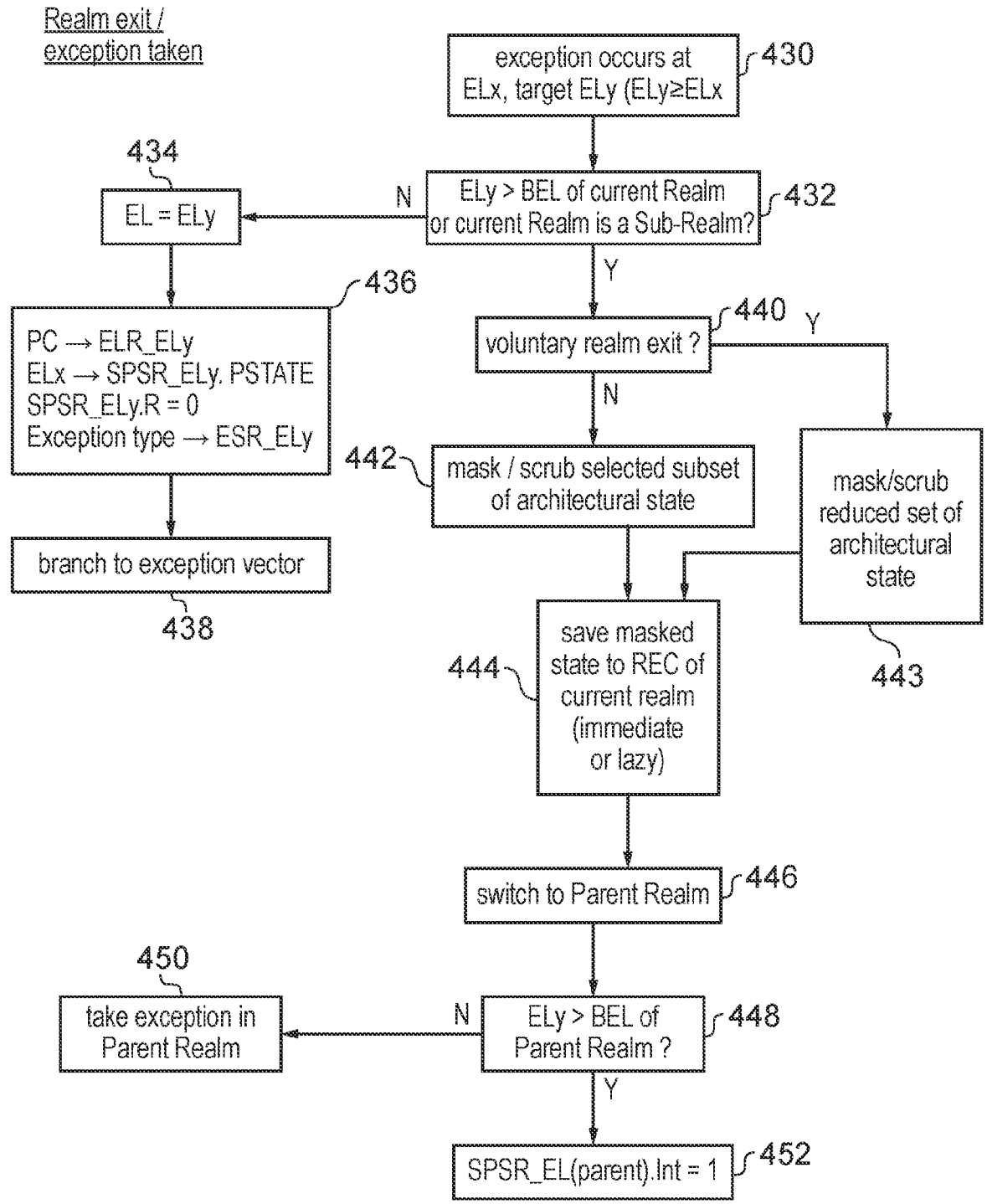
Figure 30:
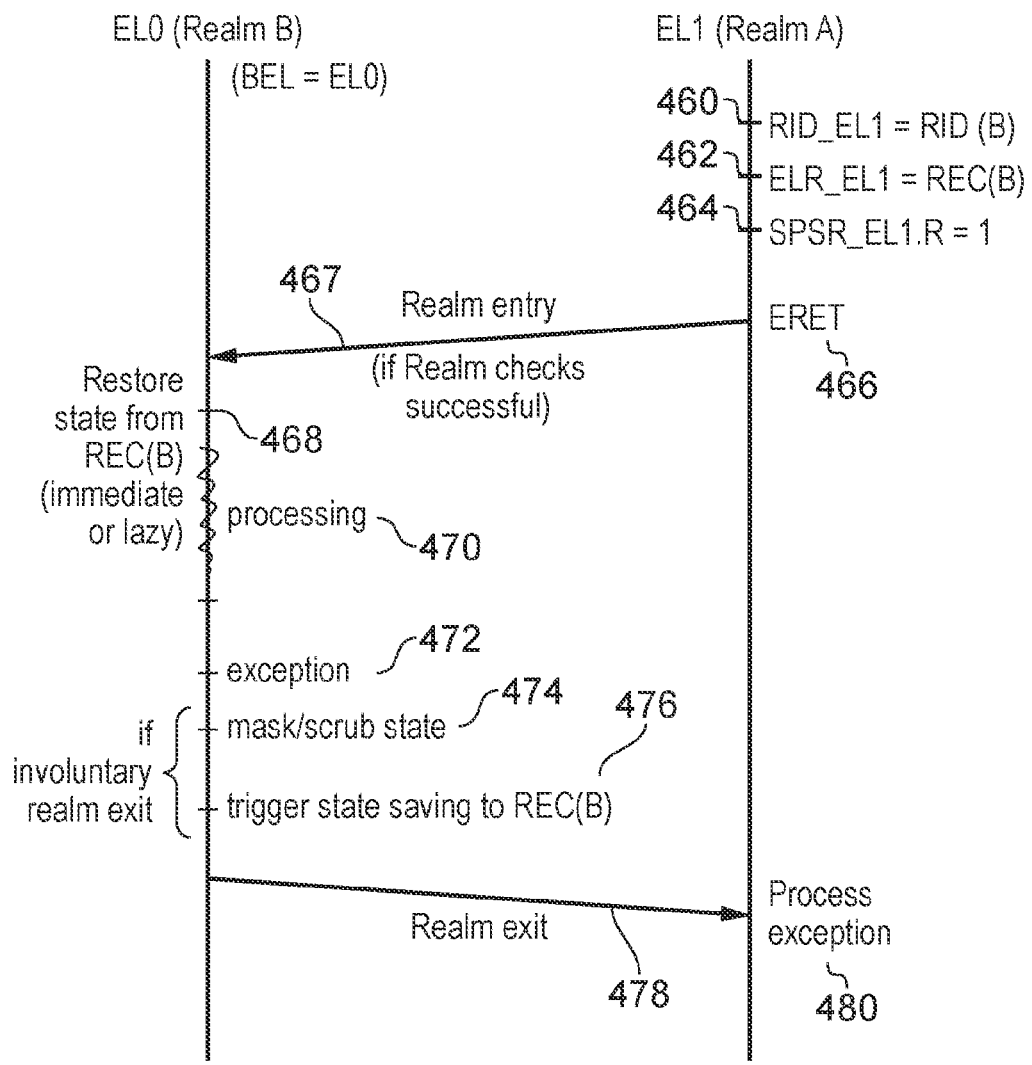
Figure 31:
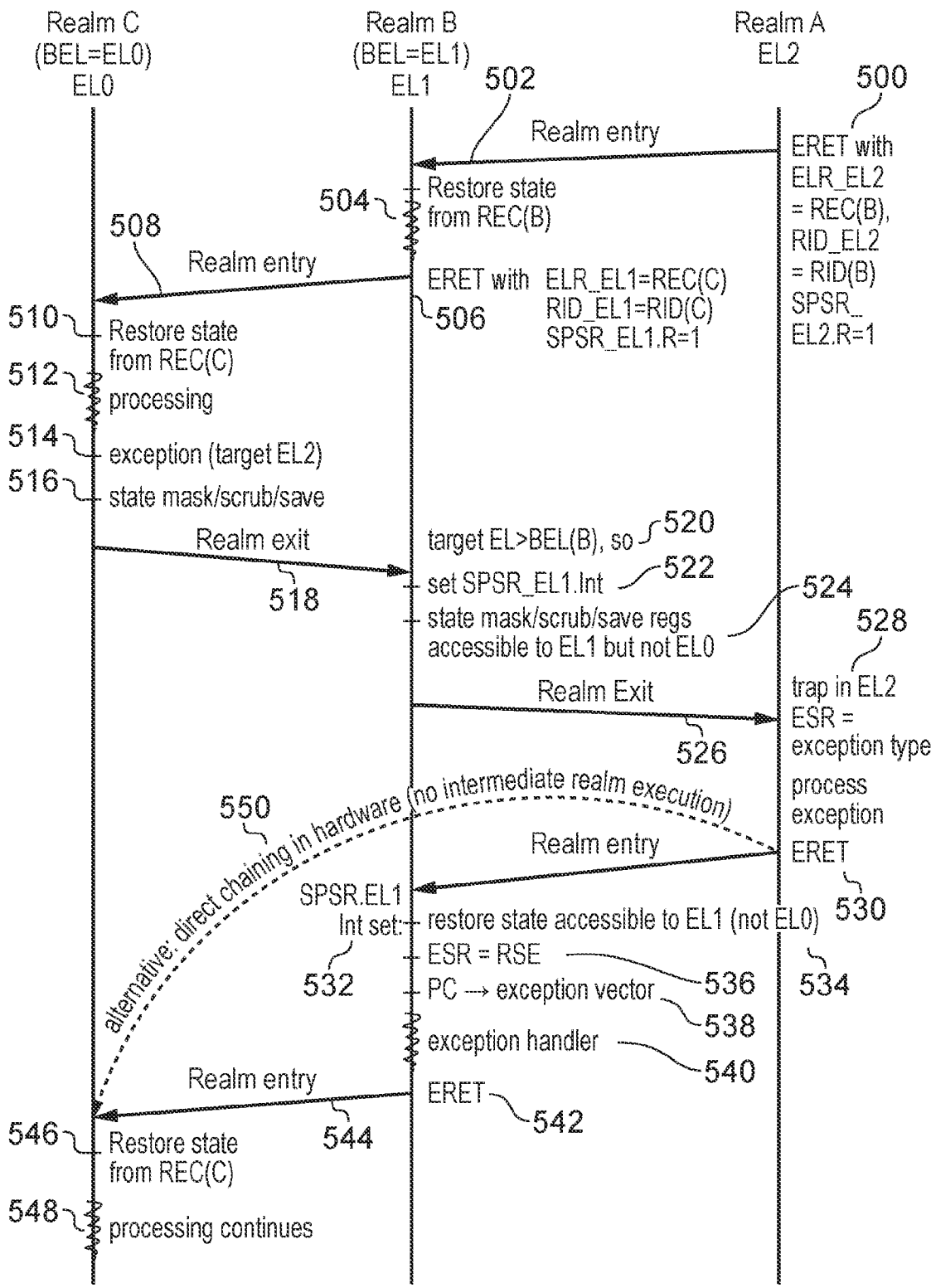
Figure 32:
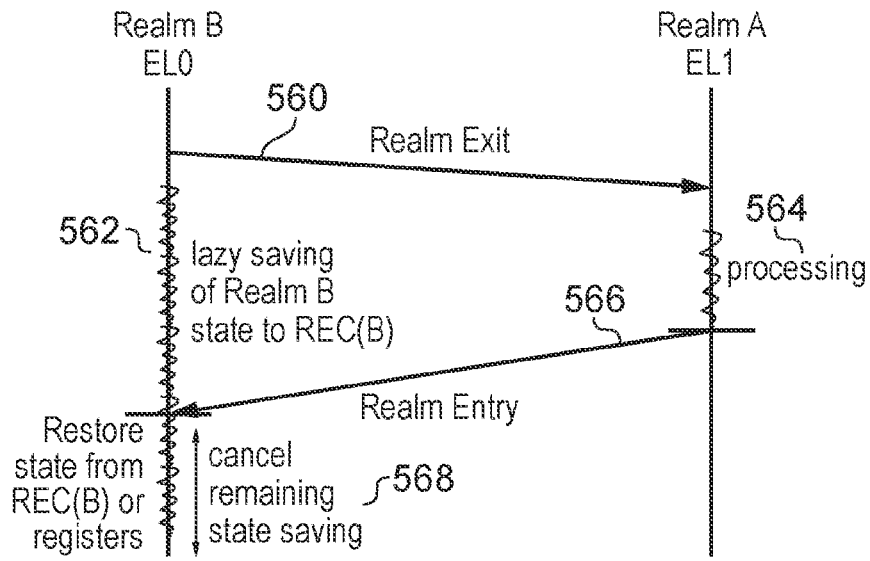
Figure 33:
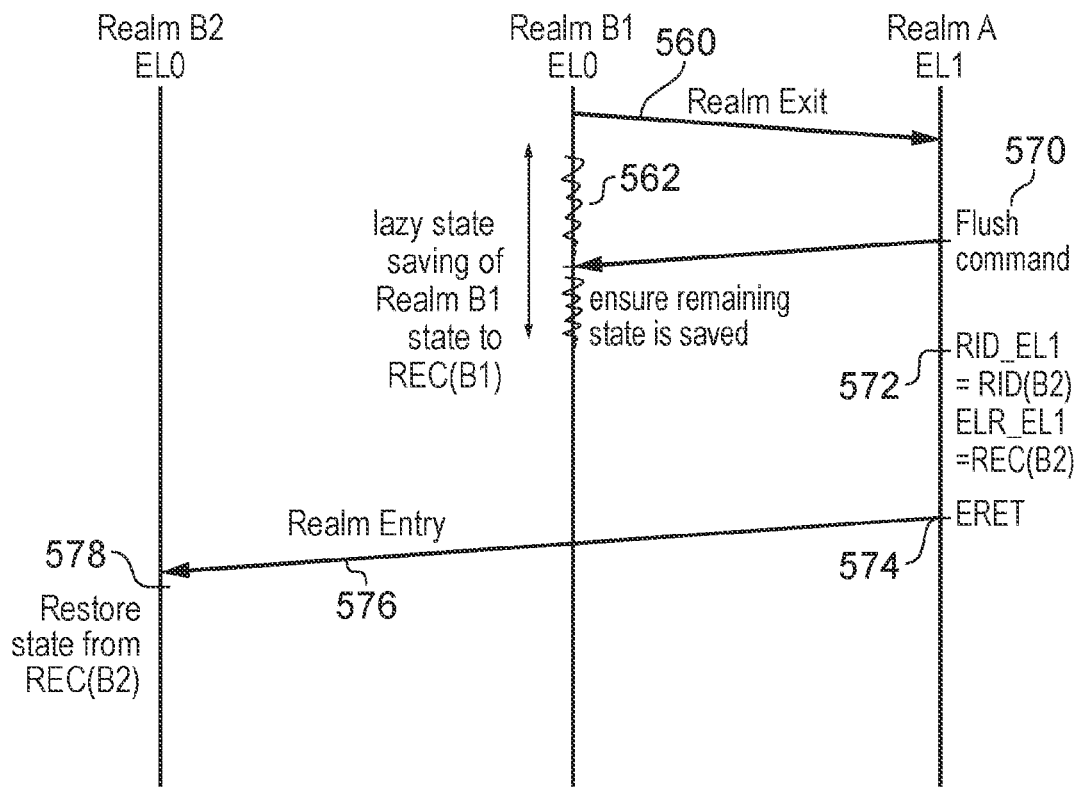
Figure 34:
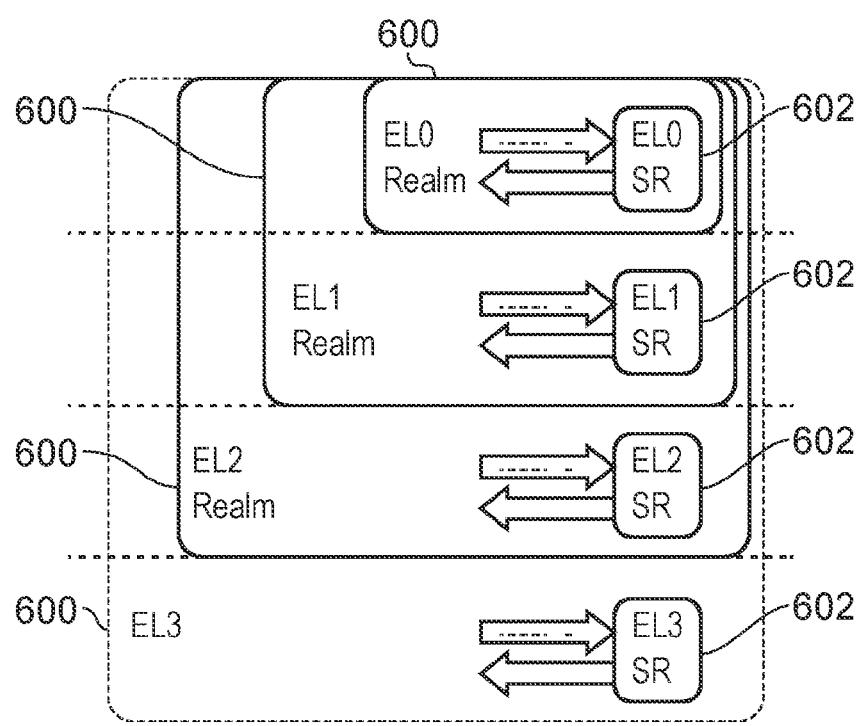
Figure 36:
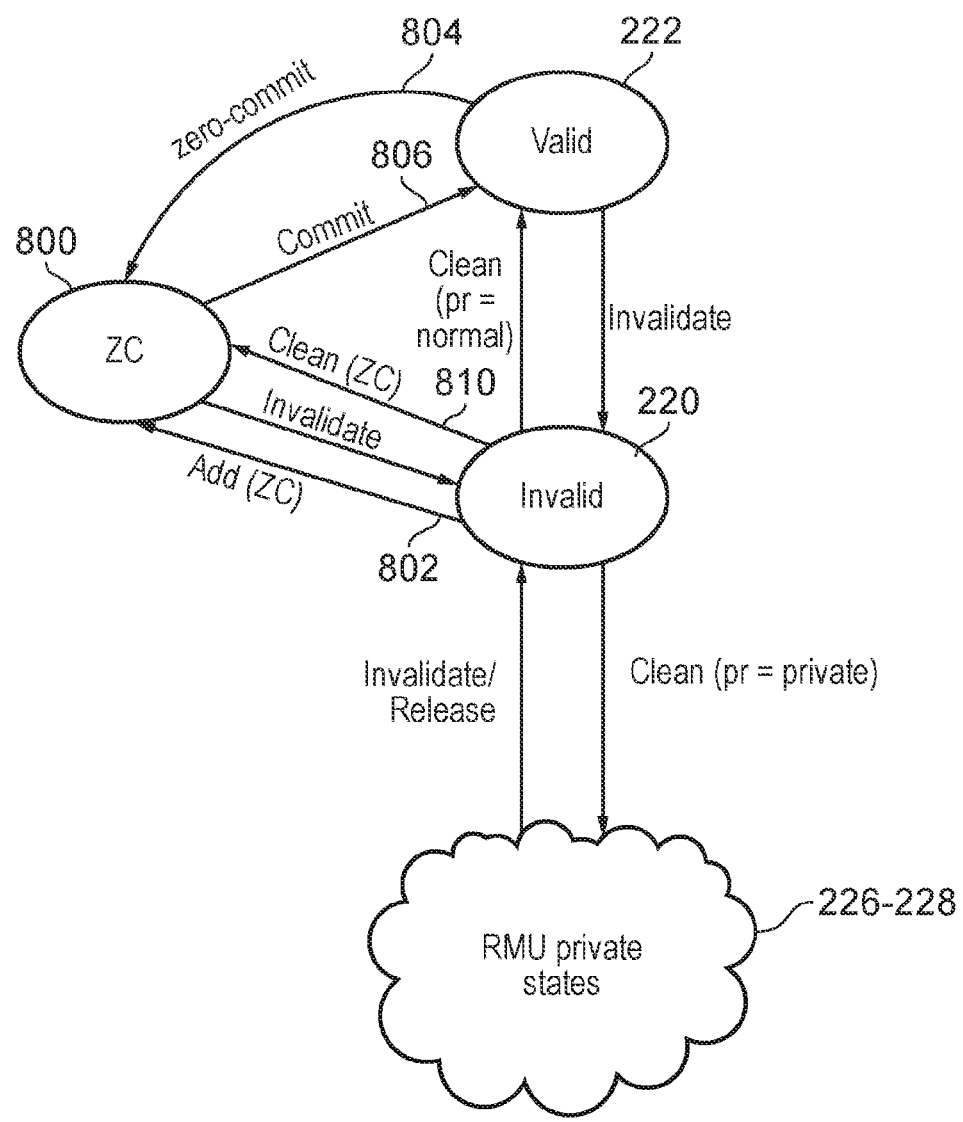
Figure 37:
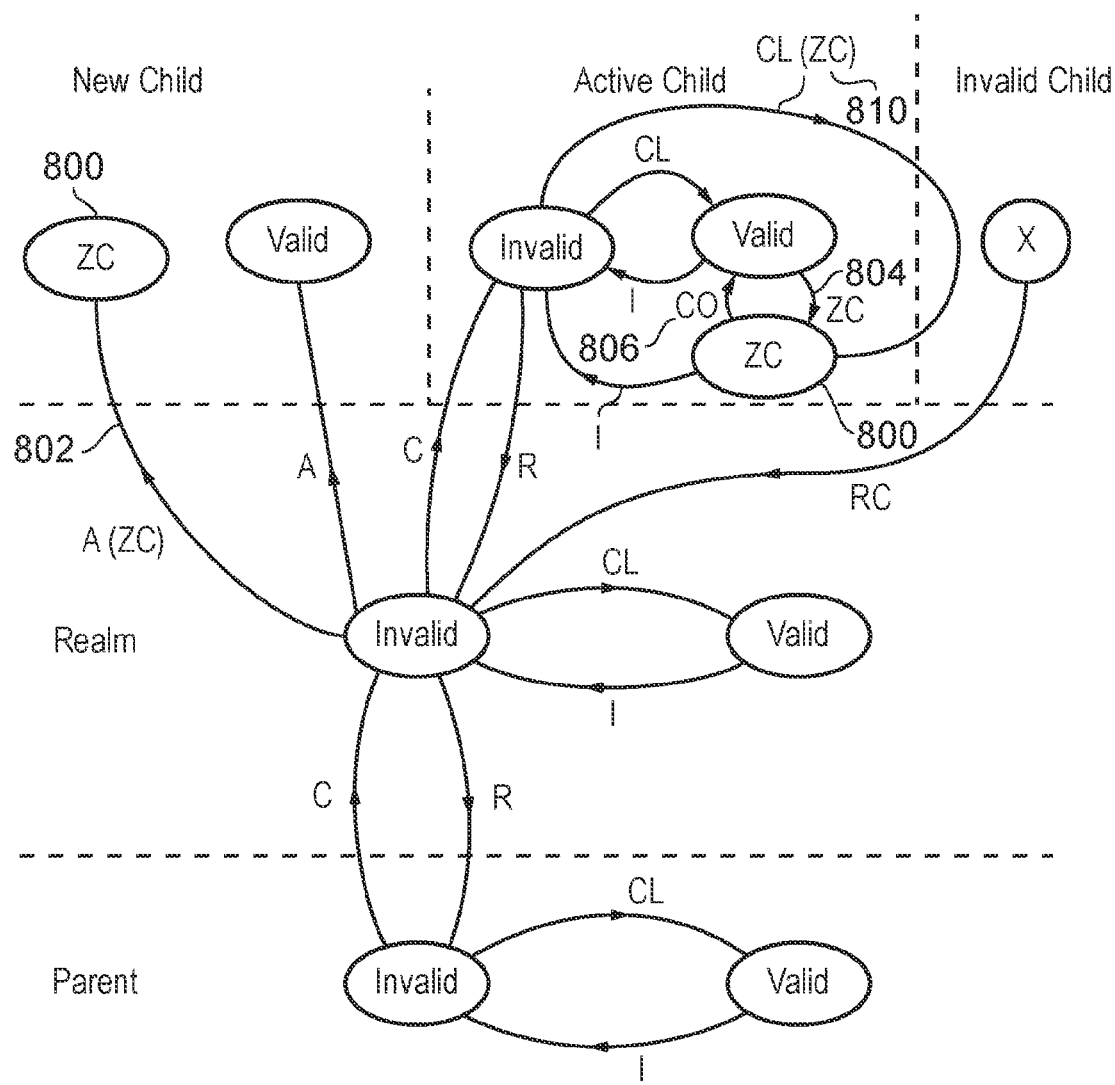
Figure 38:
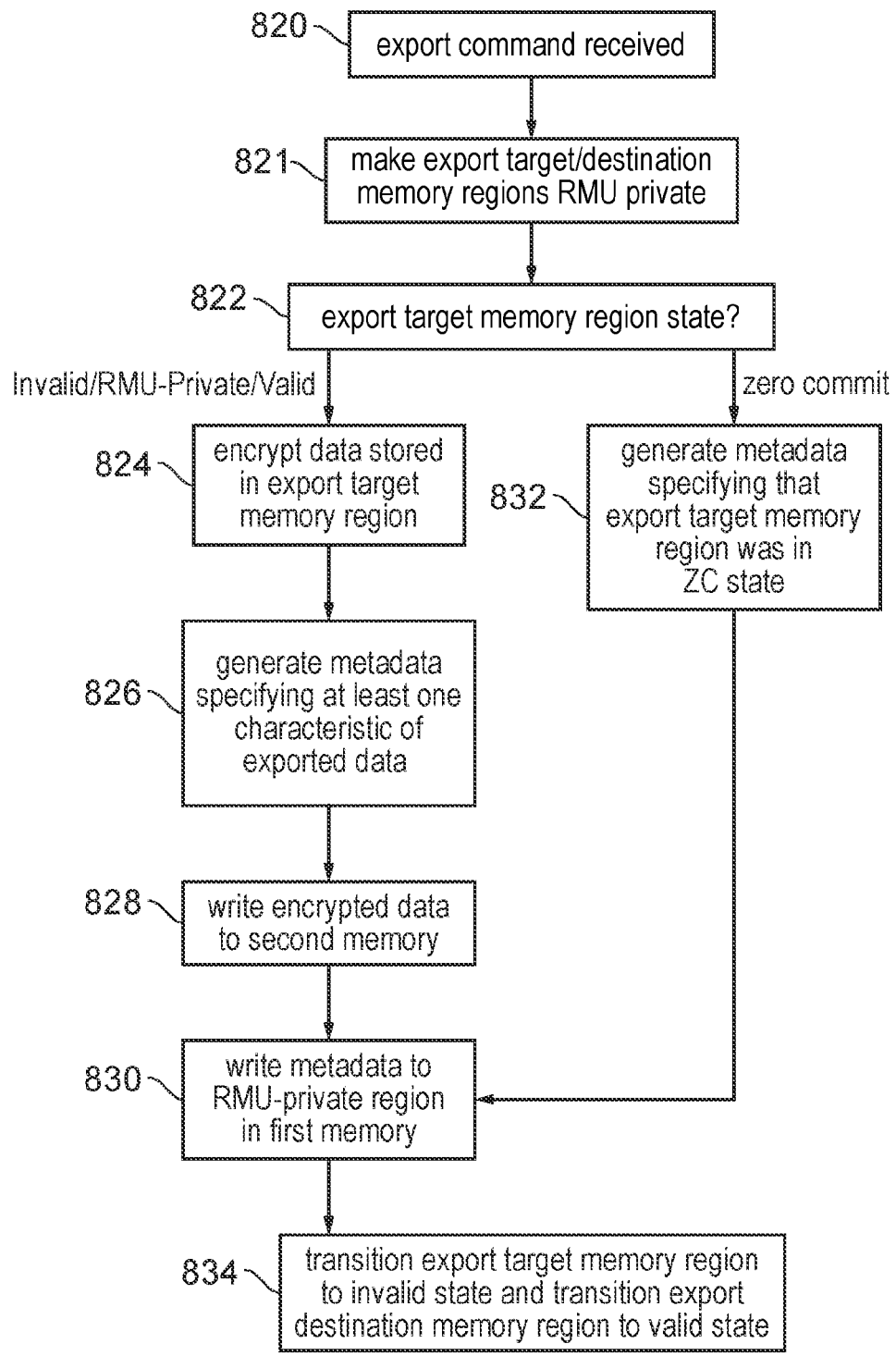
Figure 39:
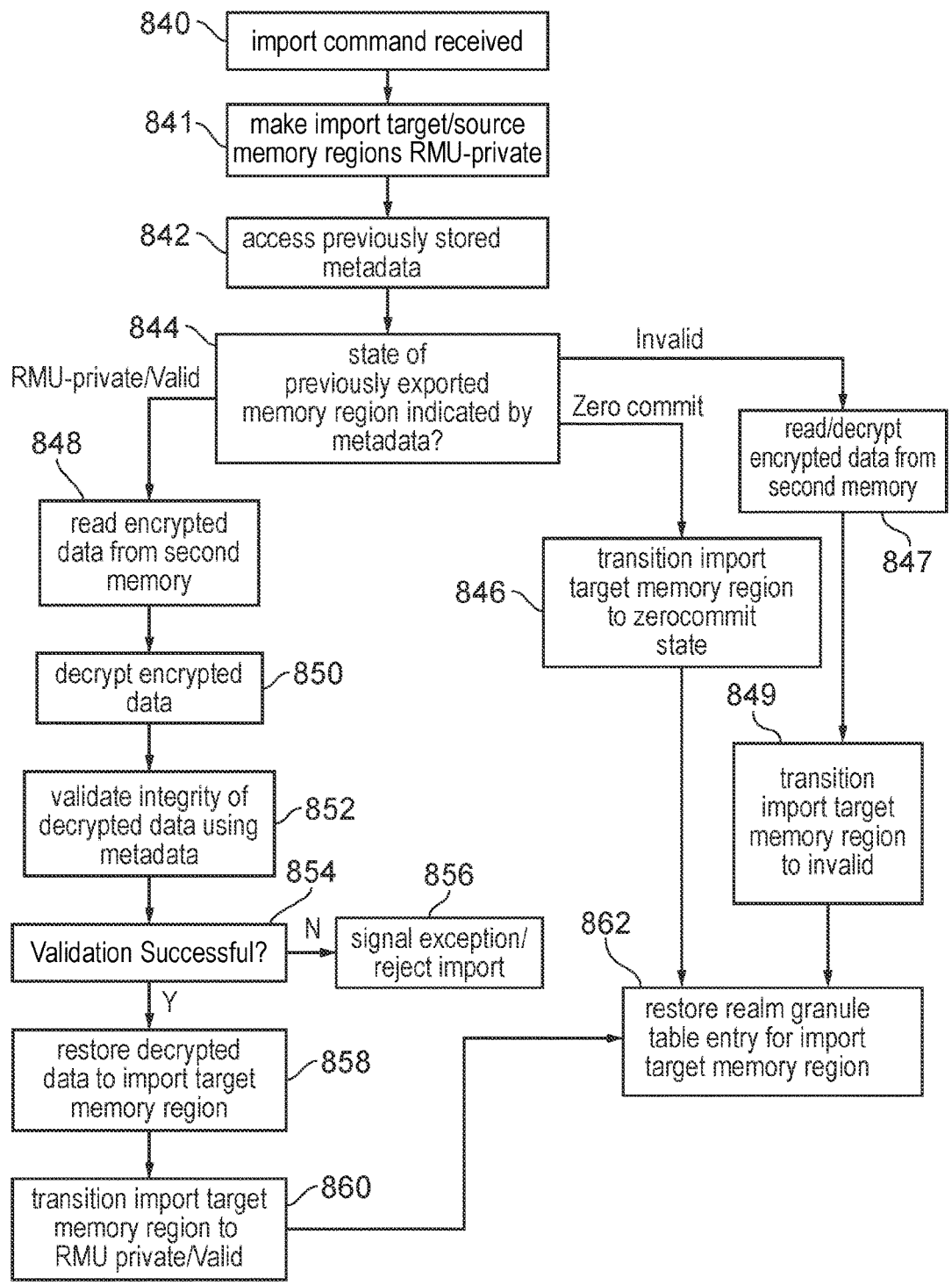
Figure 40:
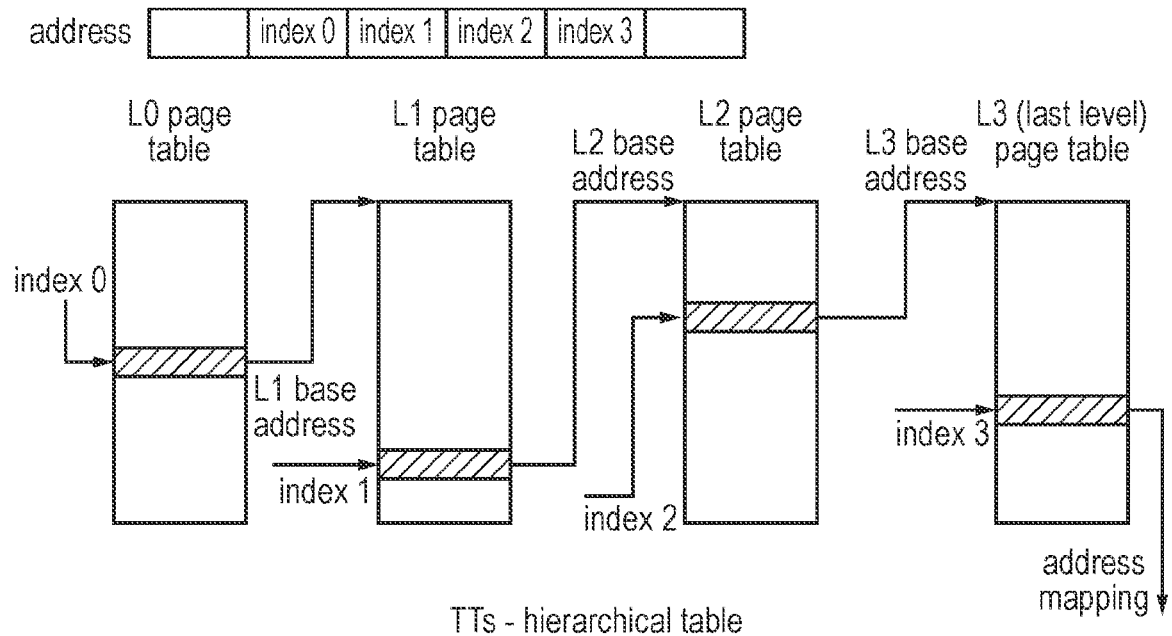
Figure 41:
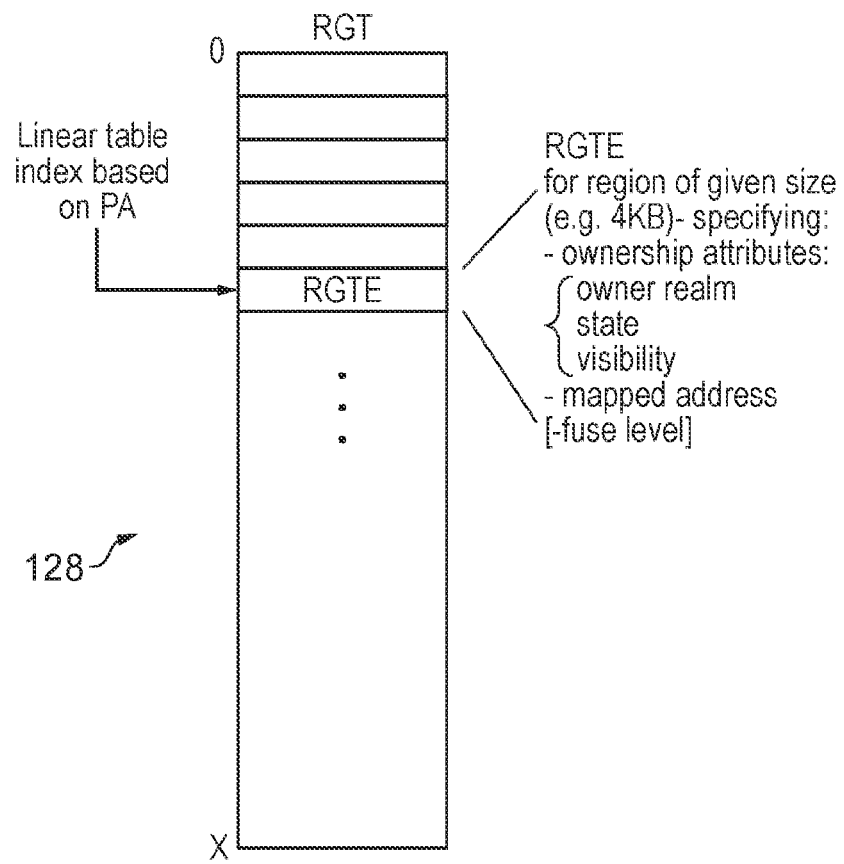
Figure 42:
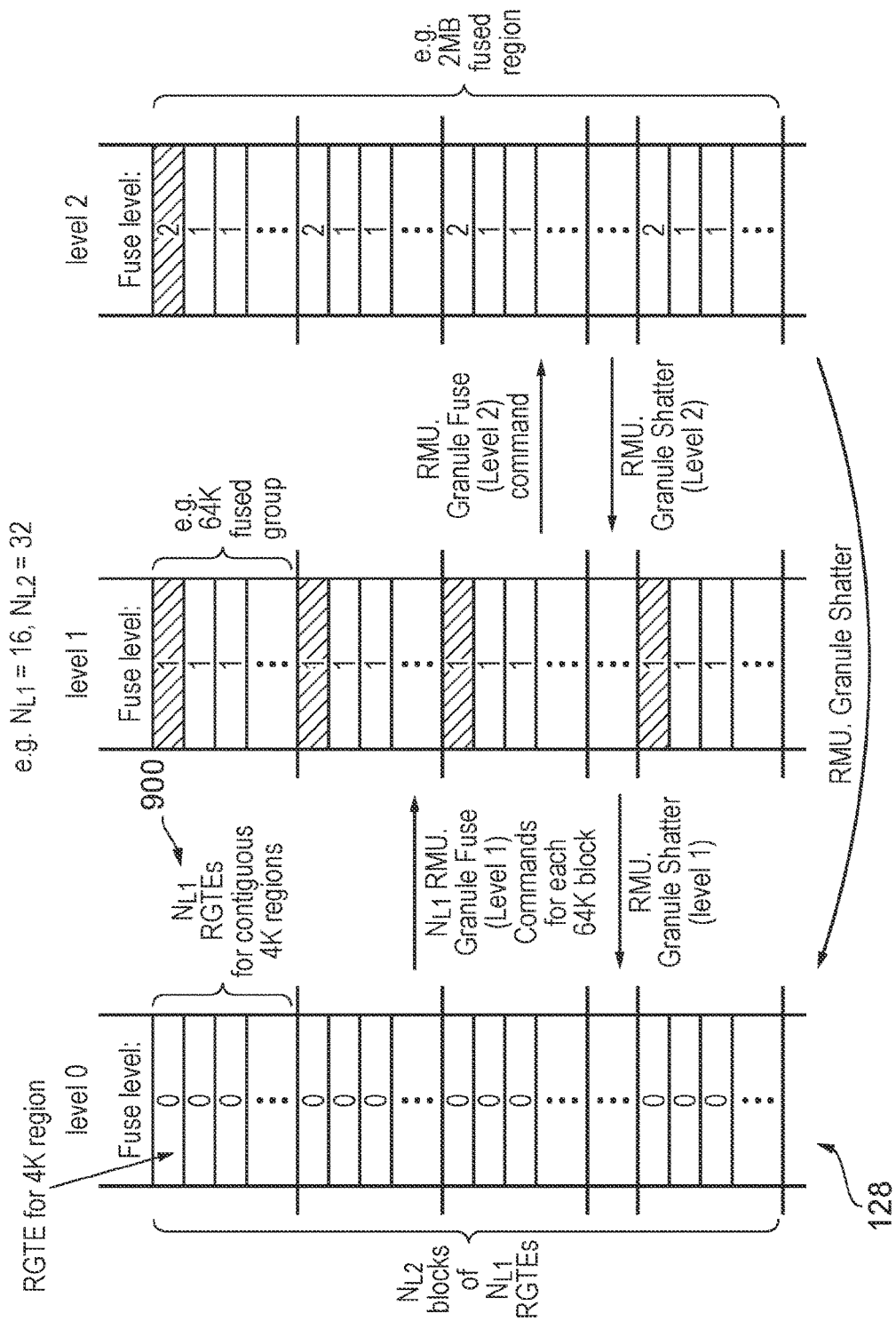
Figure 43:
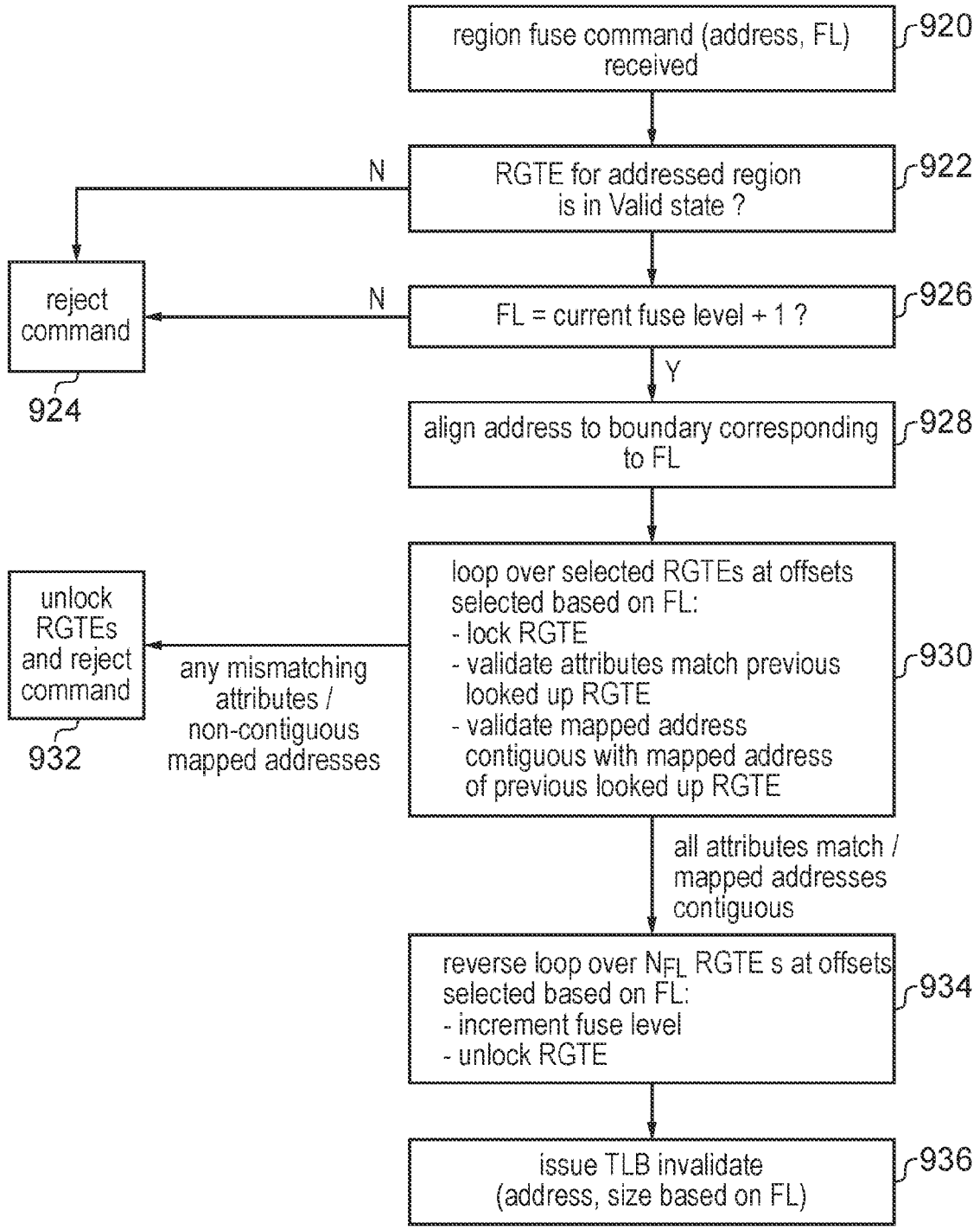
Figure 44:
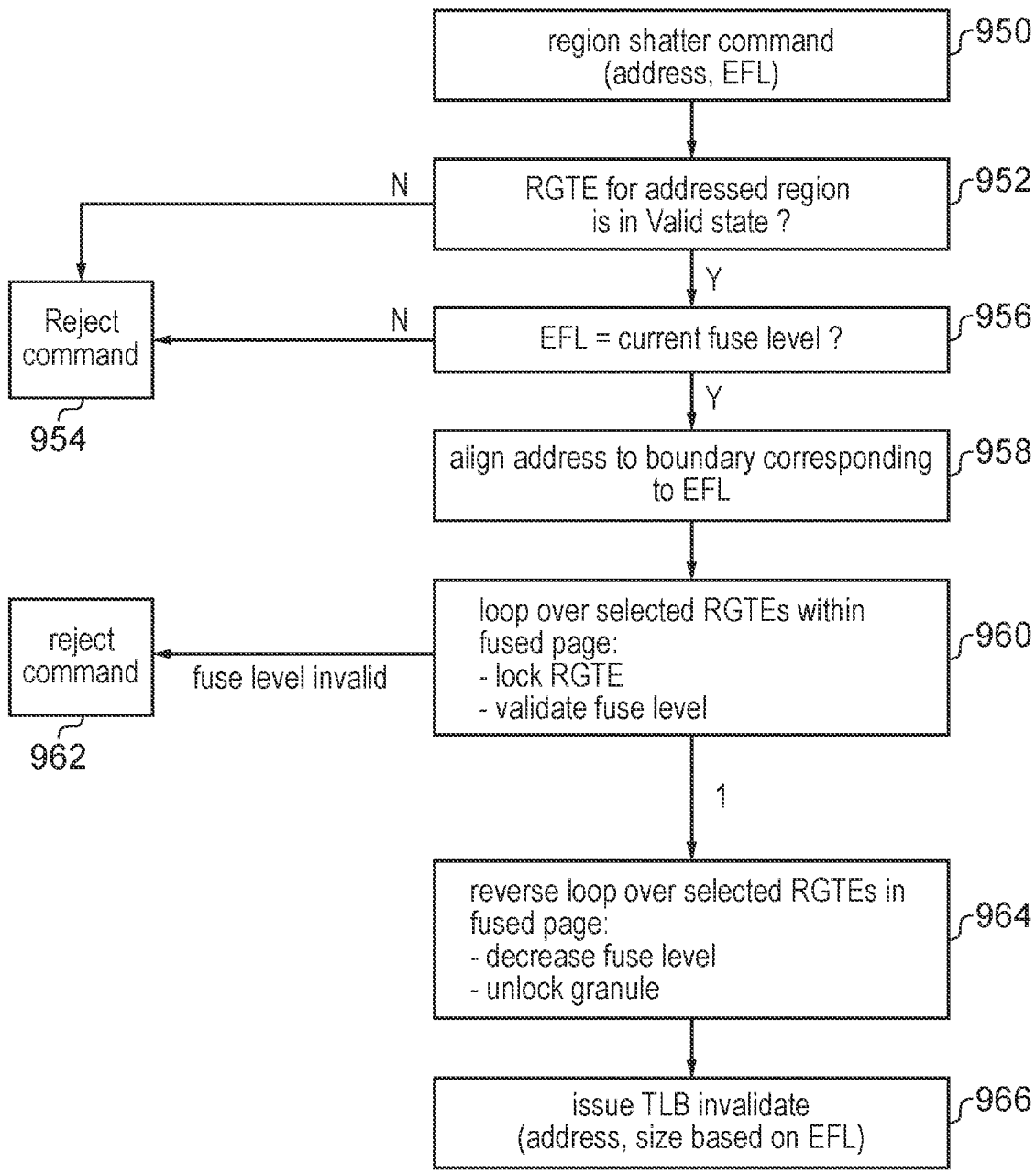
Figure 45:
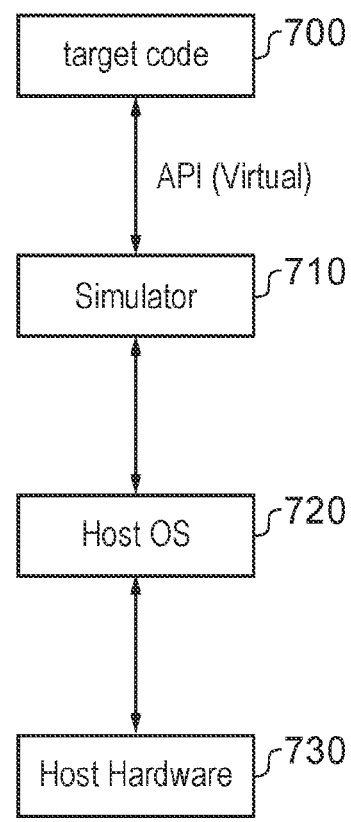

FIG. 24 schematically illustrates memory access control provided based on page tables which define memory control attributes which depend on privilege level and realm management unit levels which provide an orthogonal level of control over memory access based on the permissions set by an owner realm;

FIG. 25 illustrates an example of a translation lookaside buffer;

FIG. 26 is a flow diagram illustrating a method of controlling access to memory based on the page tables and RMU tables;

FIG. 27 illustrates state accessible to a process executing at different exception levels;

FIG. 28 is a flow diagram illustrating a method of entering a realm or returning from an exception;

FIG. 29 is a flow diagram illustrating a method of exiting a realm or taking an exception;

FIG. 30 illustrates an example of entry to a child realm and exit back to the parent realm;

FIG. 31 shows an example of nested realm exit and nested realm entry;

FIG. 32 shows an example of using lazy saving of realm execution context on exit from a realm;

FIG. 33 shows an example of use of a flush command to ensure that a subset of state associated with a previously exited child realm is saved to memory before a different child realm is entered;

FIG. 34 illustrates the use of sub-realms which correspond to a specific address range within a process associated with the parent realm of the sub-realm;

FIG. 35 shows a second example of a set of region states associated with memory regions;

FIG. 36 is a state machine showing transitions between the different region states according to example of FIG. 35;

FIG. 37 illustrates changes of region state when regions change ownership between a parent realm and a child realm;

FIG. 38 is a flow diagram showing an example of processing of an export command;

FIG. 39 is a flow diagram showing an example of processing of an import command;

FIG. 40 illustrates a hierarchical structure for translation tables;

FIG. 41 illustrates an example of a linear table structure used for the ownership table;

FIG. 42 schematically illustrates examples of fusing and shattering regions of the ownership table;

FIG. 43 is a flow diagram illustrating a method of processing a region fuse command;

FIG. 44 is a flow diagram illustrating a method of processing a region shatter command; and FIG. 45 shows a simulator example that may be used.

Figure 1:
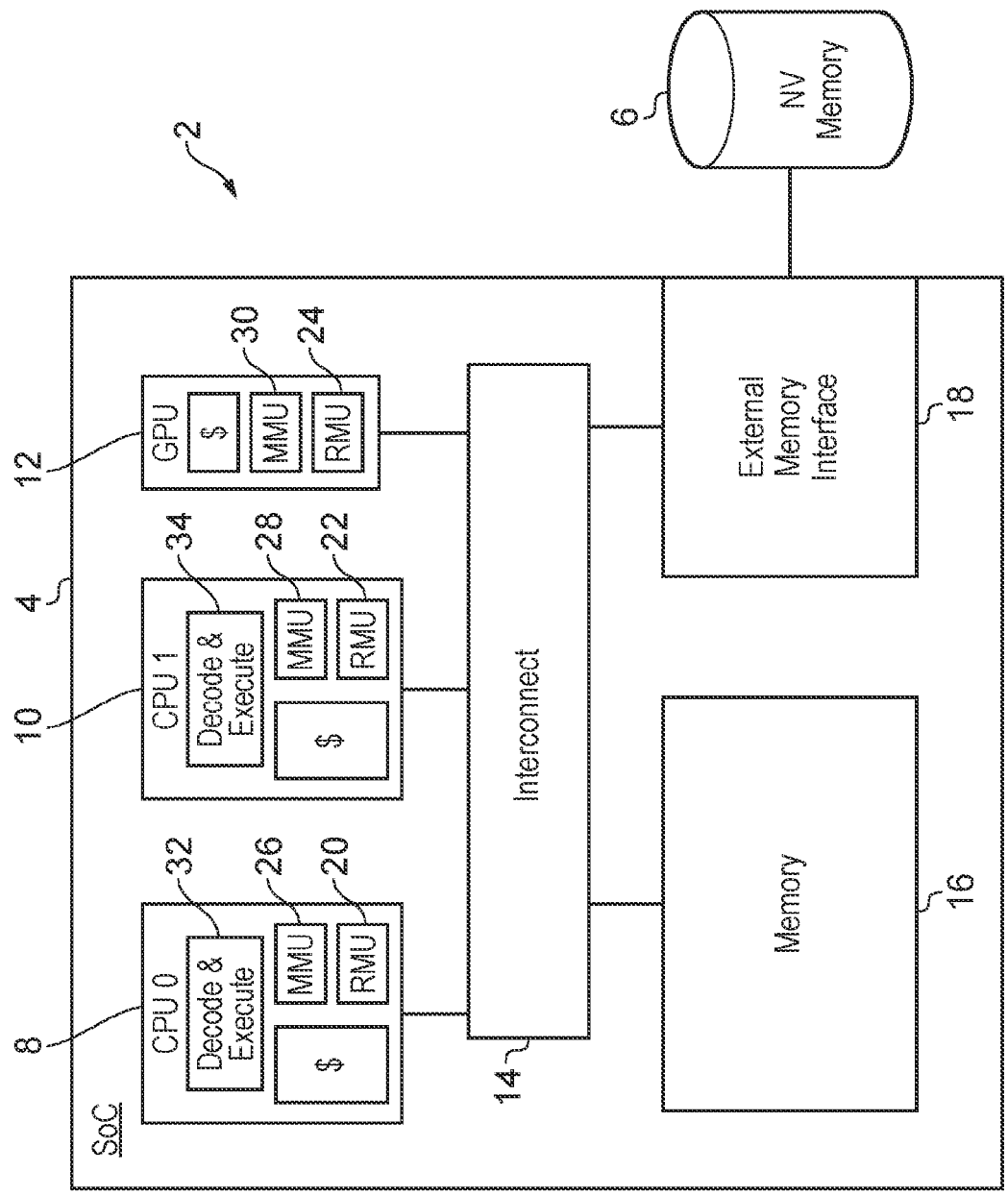

FIG. 1 schematically illustrates a data processing system 2 comprising a system-on-chip integrated circuit 4 connected to a separate non-volatile memory 6, such as an off-chip flash memory serving as a mass storage device. The system-on-chip integrated circuit 4 comprises a plurality of processing elements in the form of (in this example embodiment) two general purpose processors (CPUs) 8, 10, and a graphics processing unit (GPU) 12. It will be appreciated that in practice, many different forms of processing element may be provided, such as additional general purposes processors, graphics processing units, direct memory access (DMA) units, coprocessors and other processing elements which serve to access memory regions within a memory address space and perform data processing operations upon data stored within those memory regions.

The general purpose processors 8, 10 and the graphics processing unit 12 are coupled to interconnect circuitry 14 via which they perform memory transactions with an on-chip memory 16 and the external memory 6 (via an external memory interface 18). Although the memory 16 is on-chip in FIG. 1, in other embodiments the memory 16 could instead be implemented as an off-chip memory. The on-chip memory 16 stores data corresponding to a plurality of memory regions within an overall memory address space. These memory regions correspond to memory pages and are subject to management operations that control which memory regions (pages) are present within the on-chip memory 16 at a given time, which processes have access to the data stored within those memory regions and other parameters associated with those memory regions. More particularly, in this example embodiment, each of the processing elements 8, 10, 12 includes a realm management unit 20, 22, 24 and a general purpose memory management unit 26, 28, 30. The general purpose memory management units 26, 28, 30 serve to control aspects of the operation of the memory regions such as address mapping (e.g. mapping between virtual addresses and intermediate physical addresses, or physical addresses), privilege level constraints upon processes able to access given memory regions, storage characteristics of data within given memory regions (e.g. cacheability, device memory status, etc.) and other characteristics of regions of memory.

The realm management units 20, 22, 24 manage data serving to enforce ownership rights of the plurality of memory regions whereby a given memory region has a given owning process (or owner "realm") specified from among a plurality of processes (a process or realm being, for example, one of a monitor program, a hypervisor program, a guest operating system program, an application program, or the like, or a specific sub-portion of such a program). The given owning process (owner realm) for a given memory region has the exclusive rights to control access to the given own data stored within that given memory region. In particular, the owner process has the right to prevent access to its owned memory region by processes executed at a greater privilege level than the owner process.

Hence, a plurality of memory regions is divided amongst a plurality of owner realms. Each realm corresponds to at least a portion of at least one software process, and is allocated ownership of a number of memory regions. The owning process/realm has the exclusive rights to control access to the data stored within the memory regions of their realm. Management and control of which memory regions are memory mapped to each realm is performed by a process other than the owner realm itself. Using this arrangement it is possible for a process, such as a hypervisor, to control which memory regions (pages of memory) are contained within realms owned by respective guest virtual machines (guest operating systems) managed by that hypervisor and yet the hypervisor itself may not have the rights to actually access the data stored within the memory regions which it has allocated to a given realm. Thus, for example, a guest operating system may keep private from its managing hypervisor the data stored within the realm of that guest operating system, i.e. within the memory regions which are owned by that guest operating system.

The division of the memory address space into realms, and the control of ownership of those realms, is managed via the realm management units 20, 22, 24 associated with each of the processing elements 8, 10, 12 and is a control process which is orthogonal to the more conventional forms of control provided by the general purpose memory management units 26, 28, 30. The realm management units 20, 22, 24 accordingly provide memory access circuitry to enforce ownership rights of the memory regions of the memory address space. In some cases the memory access circuitry which enforces realm ownership rights may also include part of the MMU 26, 28, 30 (e.g. a TLB in the MMU 26, 28, 30 may include some control data for controlling accesses based on the realm controls provided by the RMU 20, 22, 24, to avoid needing to access two separate structures). In this example embodiment each of the processing elements 8, 10, 12 contains its own realm management unit 20, 22, 24; this is advantageous for performance purposes. However, more generally the memory access circuitry which enforces ownership rights may comprise a single instance of a realm management unit, the combination of all the realm management units 20, 22, 24 present, or a subset of those realm management units 20, 22, 24 present. Thus, the memory access circuitry for enforcing ownership rights may be distributed across the system-on-chip integrated circuit 4 in association with different processing elements 8, 10, 12, or collected together in a one location or in some other arrangement.

The processing elements comprising the general purpose processors 8, 10 are illustrated as including respective decoding and execution circuitry 32, 34 which decode and execute program instructions. These program instructions include commands which serve to control the management of memory regions within different ownership realms of the memory address space (realm management commands or RMU Commands). As an example, the program instructions executed may include program instructions designated as realm management unit commands and which are directed to the associated realm management unit 20, 22, 24 when they are encountered within the program instruction stream in order that they can be executed (actioned) by the relevant realm management unit 20, 22, 24. Examples of realm management unit commands include commands to initialize new realms or invalidate existing realms, commands to allocate memory regions to particular realms, remove memory regions from particular realms, export the data contained within a memory region from a first memory 16 to a second memory 6 with encryption and other processes being performed upon the exported data such that it is protected within the second memory 6. Further realm management unit commands are provided to import data back from a second memory 6 to a first memory 16 with associated decryption and validation operations performed upon the imported data.

In the context of such exports and imports of data from memory regions, it will be appreciated that a first memory, such as the on-chip memory 16, is closely managed by the realm management units 20, 22, 24 within the system-on-chip integrated circuit 4 and accordingly those realm management units 20, 22, 24 are able to enforce ownership rights and restrict access to the data within a given memory region to the process owning that memory region, or those processes which the owning process has granted access. However, when the data within that memory region is exported, such as to the external non-volatile memory 6, which is a second memory, then the control over access provided by the realm management units 20, 22, 24 is no longer effective and accordingly the data requires protection in some other way. This is achieved by encrypting the data within a memory region using before it is exported, and then decrypting that data with a secret key when it is imported back to the on-chip memory 16.

The export process may be accompanied by the generation of metadata specifying characteristics of the exported data. Such metadata may be separately stored within a metadata memory region of the first memory (on-chip memory 16) where it is held private to realm management units 20, 22, 24 (i.e. only accessible to such realm management units 20, 22, 24 and not to any of the existing processes) such that when the data is imported back to the on-chip memory 16, the metadata can be read for that imported data and the characteristics of the data represented in the metadata can be checked against the characteristics of the imported data to ensure the integrity of that imported data (e.g. checksums, data size, signatures etc.). It may be that private data of the realm management units 20, 22, 24 (including the above metadata characterising exported regions/pages) needs to be exported from the on-chip memory 16 to the off-chip non-volatile memory 6 (e.g. to make space within the on-chip memory 16) and in this circumstance the RMU-private metadata itself can be encrypted for its protection and new metadata characterising the exported metadata can be retained within the on-chip memory 16 (such retained metadata being significantly smaller in size than the exported metadata) in order that the encrypted and exported metadata can be checked and validated when it is imported back to the on-chip memory 16 for use.

Such metadata describing characteristics of memory regions and the data stored within the memory regions may be arranged as part of a hierarchical structure, such as a metadata memory region tree having a branching pattern. The form of such a metadata memory region tree may be determined under software control as different regions of the memory address space are registered to serve as metadata regions owned by the realm management units 20, 22, 24. It will be appreciated that whilst the software which controls the registering of such memory regions is able to allocate, de-allocate and control the relationships between memory regions serving to store metadata, such software does not itself own the data contained within those memory regions in the sense of being able to control which processes have access to such data. In the case of memory regions which are private to the realm management units 20, 22, 24 (i.e. the memory management circuitry), such access rights may be restricted to only the realm management units 20, 22, 24 themselves and the such RMU-Private data will not be shared with any other process(es).

When the given data stored within a given memory region is exported, then the memory region concerned is made invalid so that the contents are inaccessible. To reuse this page the page is made "Valid", by using a Clean command which overwrites the memory region with other data uncorrelated to the previous content in order that such previous content is not made accessible to another process when that given memory region is released for use by another process. For example, the content of a given memory region may be all written to zero values, or written to a fixed value, or written to random values thereby overwriting the original content of the memory region. In other examples, the overwriting of the contents of the exported memory region could be triggered by an export command itself, rather than a subsequent clean command. Either way, the given owned data being exported may be overwritten with values uncorrelated with the given owned data before the given memory region is made accessible to a process other than the given owning process. When a given memory region owned by a given process is to be exported, as part of the export process, the realm management unit 20, 22, 24 which is executing the realm command to perform the export takes ownership of the memory region concerned from the given process (i.e. makes the region RMU-Private), locks access of that memory region against all other processes (and other realm management units), performs the export operation (including encryption, metadata generation and overwriting), and then unlocks the access to that memory region and releases ownership of that memory region. Thus, a memory region which is in the process of being exported, or imported, may be held private to the realm management unit concerned whilst that command is being performed.

Figure 2:
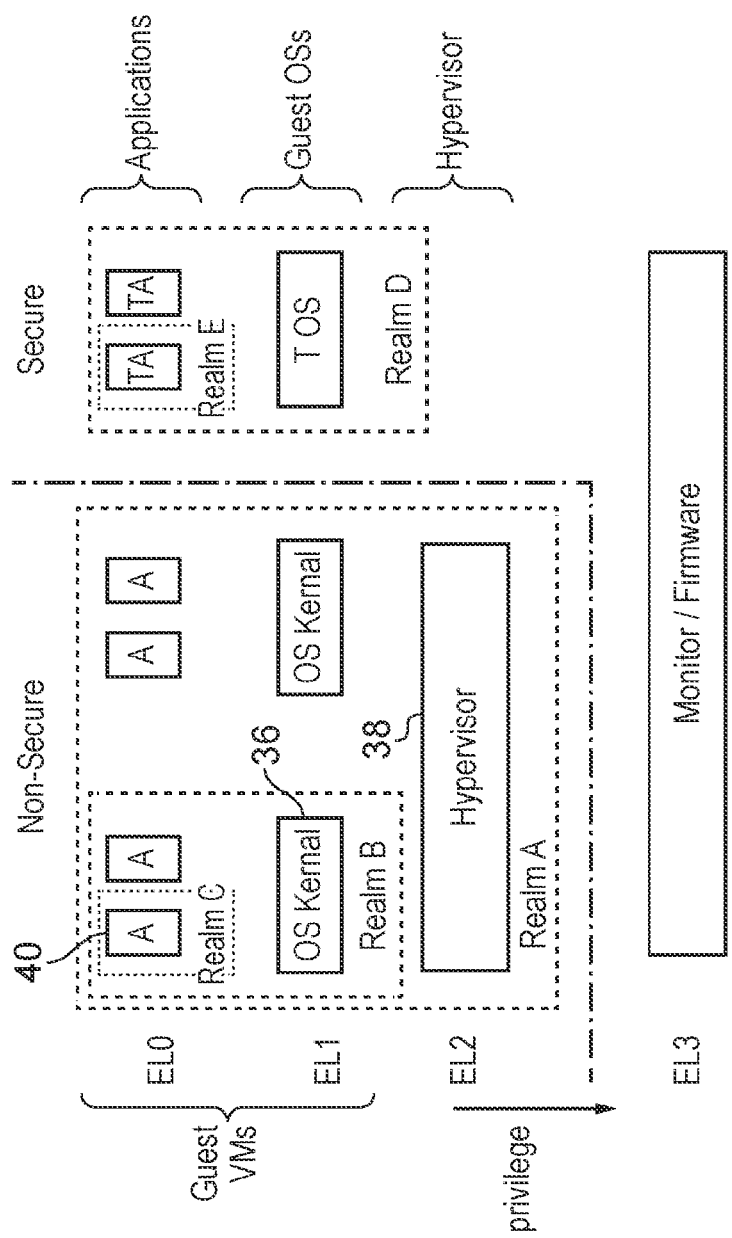

FIG. 2 schematically illustrates the relationship between a plurality of processes (programs/threads), a plurality of exception levels (privilege levels), a secure and a non-secure processor domain, and a plurality of realms representing ownership of given memory regions. As illustrated, a hierarchy of privilege levels extends from exception level EL0 to exception level EL3 (with exception level EL3 having the highest level of privilege). The operating state of the system may be divided between a secure operating state and a non-secure operating state as represented by the secure domain and the non-secure domain in, for example, processors using the TrustZone® architecture provided by ARM® Limited of Cambridge, UK.

As illustrated in FIG. 2, the memory access circuitry (realm management units 20, 22, 24 and associated controlling software (e.g. millicode running one the realm management units)) manage a plurality of realms within the execution environment. A given memory region (memory page) is owned by a particular realm. A realm may have child realms within it, and grandchild realms within those child realms (e.g. see realm A (parent), realm B (child), and realm C (grandchild)). Memory regions for which ownership is given to realm A may have their ownership in turn passed from realm A to realm B under control of processes owned by realm A. Thus, a parent realm is able to give ownership of regions to its own child realm(s). Those child realms in turn may pass ownership of memory regions which they have received from their parent realm to then be owned by their own child realms (e.g. realm C) which is a grandchild realm of the original realm, namely realm A. The processes within a given realm may execute at the same privilege level or at different privilege level. The realm to which a process belongs is accordingly an orthogonal parameter to the privilege level of a process, although in many practical cases the realm and the privilege level may correspond as a convenient mechanism for moving between realms may involve the use of exceptions which themselves move the system between different privilege levels (exception levels).

The relationship between the realms illustrated in FIG. 2 shows the child/parent relationship between different realms and this may be used to give rise to a control hierarchy for controlling operation of the system when multiple different sources of commands for memory region management compete with each other. Thus, for example, in the case of export commands for exporting memory regions as discussed above, a first export command may be received by a given realm management unit (memory access circuitry) from a first export command source, such as the operating system kernel 36 within realm B. A second export command may then be received by the given realm management unit from a second command source, such as the hypervisor program 38 executing in realm A. In this example, the hypervisor program 38, which is the second export command source, has a higher priority within the control hierarchy established by the relationship between parent and child realms such that the second export command issued by the hypervisor program 38 interrupts processing of the first export command issued by the operating system kernel 36. When the second export command, as issued by the hypervisor 38, has completed, the first export command, as issued by the operating system kernel 36, may be resumed.

In this example the second export command has a higher priority and so interrupts operation of the first export command. However, if the second export command had, for example, originated from the application program 40 within realm C, then this has a lower priority position within the control hierarchy established by the relationship between realms and accordingly such a second export command from the application program 40 would not interrupt the operation of the first export command from the operating system kernel 36 and would rather itself be blocked from being performed until the first export command had completed. Thus, paging operations (export and import operations) may be protected from one another in the sense they may or may not interrupt one another in dependence upon a control hierarchy, which may be associated with the realm hierarchy. In other example embodiments the control hierarchy may correspond to the privilege level.

Figure 3:
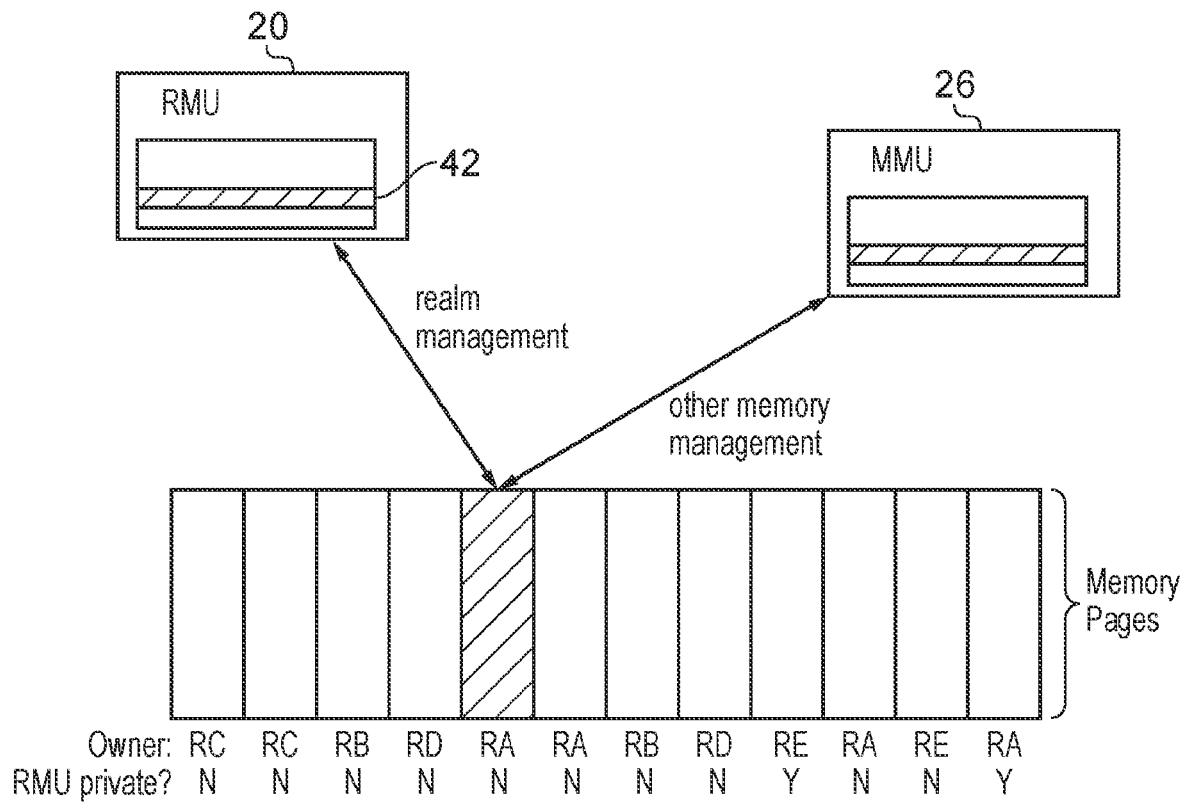

FIG. 3 schematically illustrates a realm management unit 20 and a general purpose memory management unit 26 which respectively perform different management operations upon a plurality of memory pages (memory regions) stored within the on-chip memory 16. As illustrated, the realm management unit 24 uses a plurality of realm descriptors 42 with each descriptor specifying properties of a realm. The realm management unit 24 may also maintain a realm granule table (or ownership table) comprising entries indexed by physical address, each entry including information for a corresponding memory region, including an indication of which realm that memory region belongs to, i.e. which realm has the exclusive rights to control access to control data within that memory region even if it does not control whether or not it itself actually owns that memory region. The realm descriptors and realm granule table entries may be stored in memory 16, but could also be cached in the RMU itself. Thus, as illustrated in FIG. 3, the different memory regions have different owning realms as indicated by the realm designations RA, RB, RC, RD and RE. Some of the memory regions are also owned by (private to) the realm management unit 20 and are marked as RMU-Private. Such RMU-Private regions may be used to store metadata describing characteristics of other memory regions, temporarily store memory regions being exported or imported, or for other purposes of the realm management unit 20 itself. The RMU-private regions may still be owned by a corresponding owner realm, but may not be accessible to general purpose read/write accesses issued by the owner realm (instead RMU commands issued to the RMU 20 may be required to trigger the RMU 20 to make any changes to RMU-private regions).

The addressing of memory regions may be by virtual, intermediate physical or physical addresses depending upon the particular system concerned. The realm management unit 20, and the general purpose memory management unit 26, may accordingly store translation data enabling received addresses (whether they be virtual memory addresses or intermediate memory addresses), to be translated to an address, such as a physical address, more directly representing the memory region within the on-chip memory 16 concerned. Such address translation data may be managed and distributed within the system on-chip integrated circuit 4 using translation look aside buffers and other distributed control mechanisms.

Figure 4:
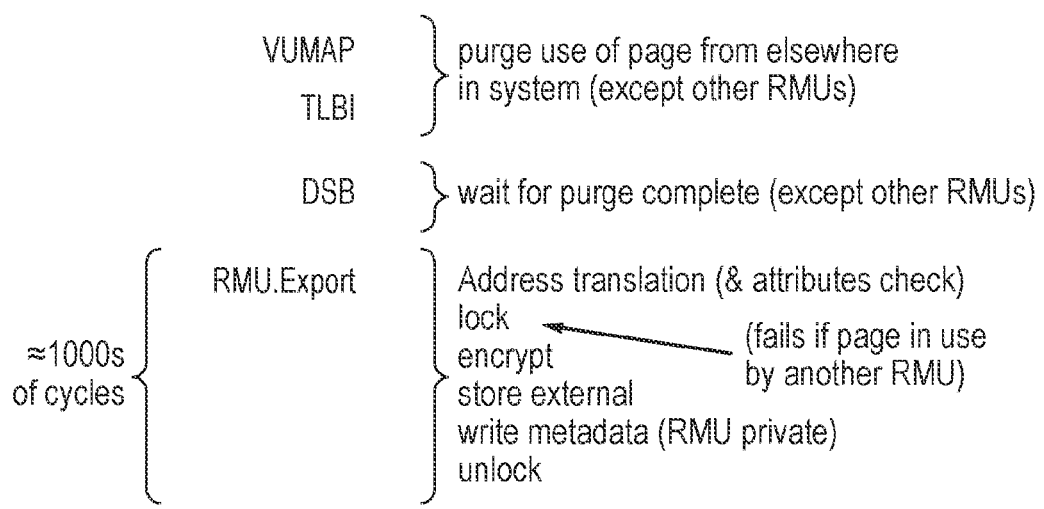

FIG. 4 schematically illustrates program instructions associated with an export operation of a memory region. These program instructions appear within a program instruction stream and may be executed (actioned) by different elements within the overall circuitry. For example, realm management unit commands are executed by respective realm management units 12, 22, 24. Instructions such as virtual address unmapping instructions (VUMAP) and translation look aside buffer invalidate instructions (TLBI) are broadcast within the system-on-chip integrated circuit 4 and serve to purge the use of translation data as specified by those commands from locations within the system as a whole (although in some examples, a dedicated virtual address unmapping instruction may not be provided, and instead unmapping of a virtual address can be performed by modifying a translation table entry by performing a store to memory, rather than using a special unmapping instruction). A barrier instruction DSB is inserted within the instruction sequence illustrated in FIG. 4 and serves to halt processing of that sequence until an acknowledgement has been received that the preceding virtual address unmapping instruction (or equivalent store instruction) and translation look aside buffer invalidate instruction have been completed by all portions of the system. Thus, the purge of the virtual addresses translations for a given memory region within the system other than in realm management systems themselves may be achieved by the sequence of the virtual address unmapping instruction (or equivalent store instruction), the translation look aside buffer invalidate instruction and a corresponding barrier instruction. By unmapping (and thus effectively removing) the virtual address translation data for a given memory region (page), it can be ensured that such a memory region will not be in use elsewhere within the system when an export operation of the data stored in that memory region is to be performed.

Once the barrier instruction DSB has received an acknowledgement confirming that the purging of the virtual address translation data from within the system has completed, then the export command for the realm management unit is executed by the realm management unit. The executing of such an export instruction received from a given process by the realm management unit triggers performance of a command sequence (corresponding to millicode embedded within the realm management units) comprising a plurality of command actions in respect of the specified given memory region. These command aims may include, for example as illustrated in FIG. 4, the steps of gathering address translation data, locking the memory region, encrypting the data, storing the data externally, writing the metadata associated with the memory region and then unlocking the memory region.

The address translation gathering step performed as part of the command sequence by the realm management unit gathers to that realm management unit access control data required to complete the access operation concerned. This ensures that once the export operation is underway then there is a reduced likelihood of that export operation being halted, such as may be due to the non availability of parameters or data required to complete that export operation, e.g. address translation data, attribute data or other data required by the export process. As an example of the retrieving to and storing within the memory access circuitry (realm management unit) of access control data, the address translation step serves to retrieve all required address translation data (e.g. virtual to intermediate physical address (or physical address) mapping data) which may be required to complete the export operation.

Once the address translation data has been retrieved, then the realm management unit serves to set a lock flag associated with the region concerned into a locked state. This lock flag may be stored within the region attribute data 42 for the region concerned. Alternatively, the lock flag may be stored within a memory region private to the realm management unit which is performing the export operation such that it cannot be overwritten by any other process or realm management unit. In order to set the lock flag to the lock state, the realm management unit must determine that no other realm management unit is currently holding the memory region concerned in a locked state itself. Thus, a polling of the locked flag values of any region controlling data stored elsewhere is performed and the lock flag is set to a lock state if a result is returned indicating that the region is not locked elsewhere. If the region is locked elsewhere, then the export operation fails and an error is reported to the process which instructed that export operation. Once the lock has been obtained, then the data within the given memory region is encrypted and stored externally of the system-on-chip integrated circuit, such as to the external non-volatile memory 6. As previously discussed, metadata characterising the encrypted data (or the given data before encryption) is then generated and stored within a realm management unit private region such that it can be used to validate the exported data at a later time. Finally the memory region concerned is unlocked by the realm management unit performing the export command by switching the locked flag from a locked state to an unlocked state. The use of a lock enforced by the hardware mechanism of the memory access circuitry (realm management unit) serves to block the progress of any other (second) access command from a further processing element which might be received when the locked flag is in the locked state.

Figure 5:
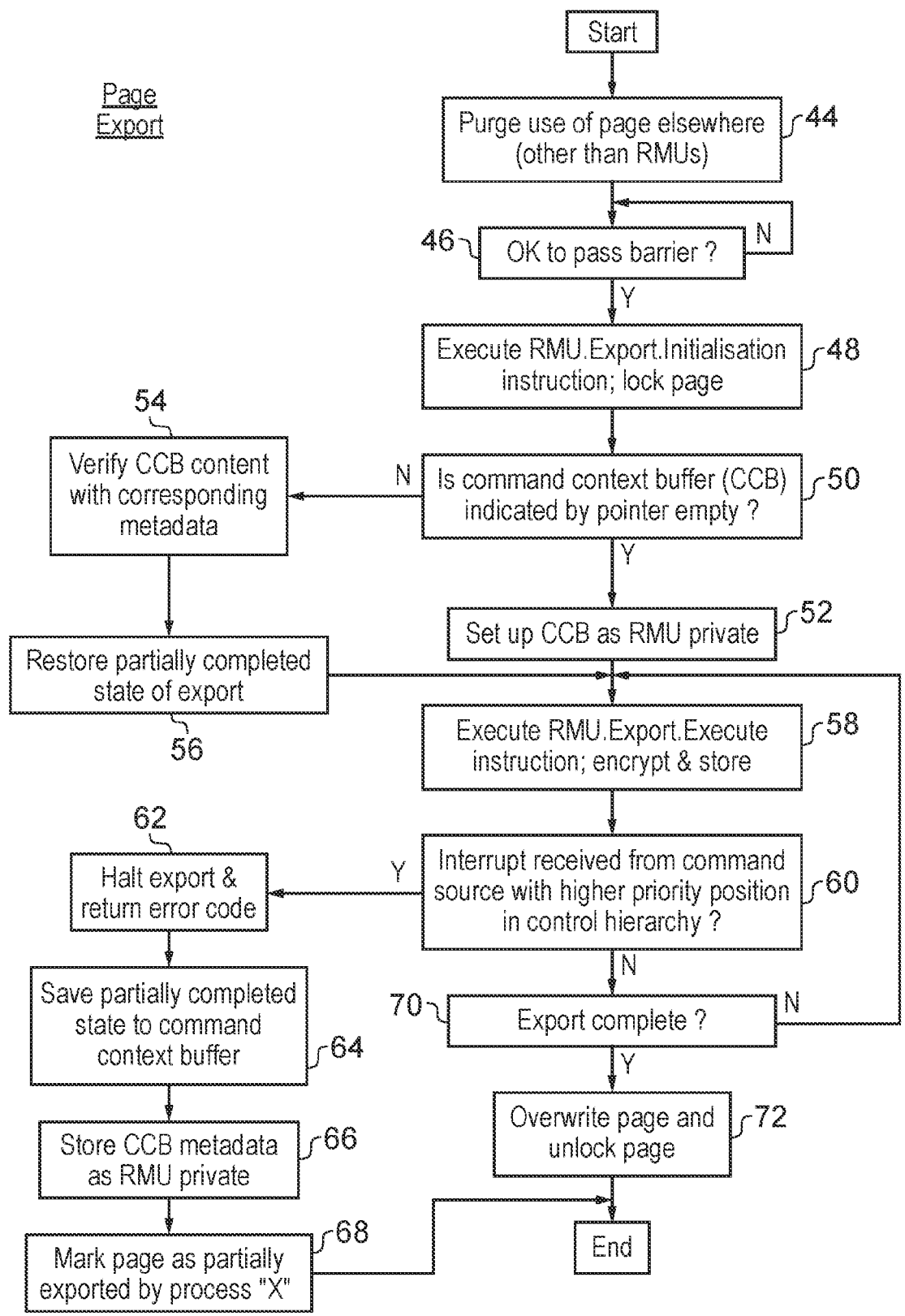

FIG. 5 is a flow diagram schematically illustrating page (memory region) export. At step 44 program instructions are executed (VUMAP, TLBI, DSB) which serve to purge use of the page elsewhere in the system other than within the region management units 20, 22, 24. This may be achieved by invalidating and purging translation data pointing to the region which is to be exported. Once this translation data is purged, should another process or processing element wish to access that region, then it will attempt to refetch the translation data. Upon the attempted refetching of the translation data, the process or processing elements seeking to reuse the region will fail to obtain the relevant translation data as the region concerned will have been placed into an RMU private state in which only the region management unit 20, 22, 24 seeking to perform the page export has rights to access that data.

When the purge requests have been issued at step 44, processing waits at step 46 until responses are received from those purge requests which indicate that the address data has been invalidated elsewhere (other than in realm management units) at which point it is safe to continue beyond the barrier instruction DSB within the program sequence (the barrier instruction DSB halts the processing element 8, 10, 12 until the responses have been received). At step 48 a realm management unit export initialisation instruction is executed. This export initialization instruction includes a pointer to a memory region established as RMU private in which a command context buffer (CCB) is established to store context data representing a current partially completed state of the command sequence corresponding to the export operation should that command sequence be interrupted. In alternative example embodiments the realm management unit itself may be responsible for generating a pointer to the command context buffer (CCB). Step 50 determines whether the command context buffer indicated by the pointer within the export command step 48 is empty. If the command context buffer is empty, then step 52 sets this up as an RMU-Private region. If the command context buffer at step 50 is not empty, then this indicates that the export initialisation command being executed at step 48 is attempting to restart a previously interrupted export operation. In this case, processing proceeds to step 54 at which the contents of the command context buffer pointed to by the pointer is validated using associated metadata which was stored when that partially completed state data was stored to the CCB. If the validation is passed, then step 56 serves to use the content of the command context buffer to restore a partially completed state of the export command, e.g. any partially encrypted data, a pointer to the position within the original data to which encryption had progressed, further attributes of the partially completed command etc. After the initialisation of the export operation instructed by the command at step 48, the processing proceeds either via a path including step 52 or a path including steps 54 and 56 to reach step 58 at which the command to execute the realm management unit export command is reached. When this command is reached, then the region management unit 20, 22, 24 performs encryption upon a portion of the data within the memory region and stores this within the destination (which is also a pointer specified within the RMU export initialisation instruction at step 48). Step 60 determines whether an interrupt from a command source with a higher priority than the command source which issued the instructions being executed at step 48 and 58 has been received. Such a higher priority command would come from a source with a higher priority position within the control hierarchy (e.g. realm hierarchy, priority hierarchy, etc.) as previously discussed. If such a higher priority interrupt is received, then processing proceeds to step 62 at which the export instruction is halted and an error code is returned to the command source which issued the instructions executed at steps 48 and 58. Step 64 serves to save the partially completed state of the command to the command context buffer. Step 66 stores the command context buffer metadata to an RMU-Private memory region for use in validating the partially completed state stored within the command context buffer when this is subsequently retrieved. Step 68 serves to mark the memory region which has been subject to the partially completed export command as in a state of "partially exported" and indicating the process which performs such a partial export. This assists in restarting that export at a later time.

If the determination at step 60 is that there is no interrupt, then processing proceeds to step 70 at which a determination is made as to whether the export of the memory region has been completed. If the export has not been completed, then processing returns to step 58. If export has been completed, then processing proceeds to step 72 at which the memory region which has been emptied (had its stored data exported therefrom) is overwritten with data uncorrelated with the originally stored data (e.g. zeroed, set to some other fixed number, filled with random data etc.). The processing then terminates.

In the above discussed example embodiment the CCB is provided as a separate private memory region specified by an associated pointer, for example, within an initialisation instruction. However, in other example embodiments the CCB may be provided not as a separate memory region, but as part of a memory region already used by the command that may be interrupted, for example a destination memory region into which result data generated by a command is stored. In the case of an export command which may be interrupted, the exported encrypted data is stored within a destination memory region that is an RMU private memory region while the export is being performed. The CCB may be provided, for example, as the end portion of such a destination region while it is being filled with encrypted data. The integrity of the context data stored within the CCB is ensured by the destination region being RMU private while the export operation is being performed.

In another example embodiment the CCB may be provided as a portion of the realm descriptor (RD); in this case the storage space available for the context data may be constrained by the space available in the RD and so the number of interruptible parallel commands that are supported may be constrained by the storage space available with the RD to serve as respective CCBs. The CCB can be provided separately or as part of a memory region or resource also used for another purpose.

FIG. 6 schematically illustrates a relationship between realms and the control hierarchy that determines which commands from differing command sources are permitted to interrupt/block partially completed commands from other sources. The example illustrated includes three levels of nested realms. A parent realm M corresponds to exception level EL3. A child realm N corresponds to exception level EL2. Two grandchild realms within realm N comprise realm O and realm P and are both at exception level EL1. In this example, both the exception level priority and the relative position within the nested hierarchy of realms, give an ordering in the control hierarchy in which realm M has a higher priority that realm N, and realm N has a higher priority than both realm O and realm P. Realm O and realm P are of an equal priority.

Figure 7:
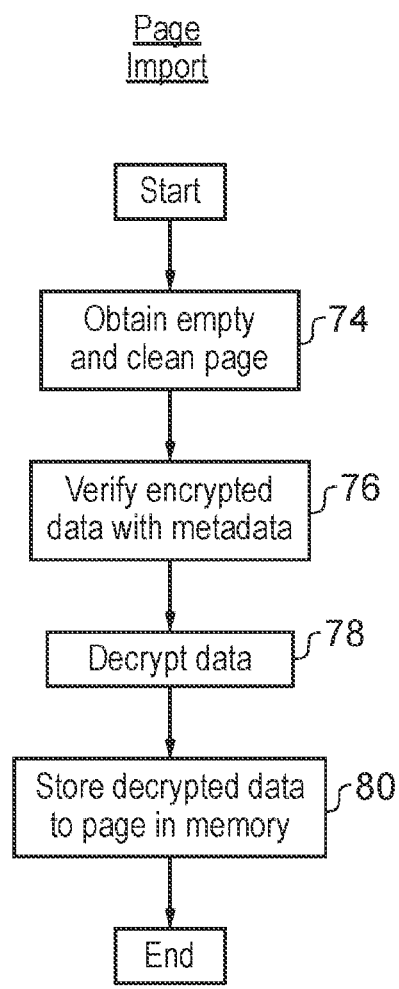

FIG. 7 is a flow diagram schematically illustrating a page (memory region) import operation subsequent to an RMU import command. Step 74 serves to obtain and clean an empty page (memory region) into which the data can be imported. Step 76 then verifies the encrypted data which is to be imported using its associated stored metadata (stored in an RMU-Private region). If this verification is not successful, then an error is generated. Subsequent to successful verification, step 78 serves to decrypt the encrypted data and step 80 serves to store that decrypted data into the memory page which his obtained at step 74. Once the memory page has been filled with the decrypted data, it can be released to the owning realm (process). The page which was obtained and then filled is locked so as to be exclusively available to the memory management circuitry (realm management unit 20, 22, 24) during the page importation process.

Figure 8:
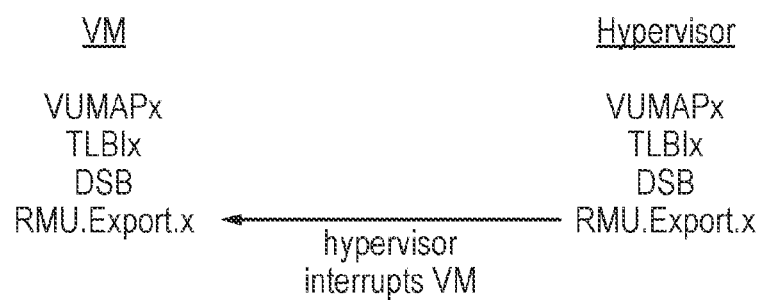

FIG. 8 schematically illustrates two export commands which may arise in parallel from different command sources. One of the sequences of instructions originates from a process corresponding to a virtual machine (e.g. a guest operating system). The other command source is a hypervisor at a higher level of privilege (or potentially higher level within the realm hierarchy) compared with the virtual machine. Accordingly, the export command from the hypervisor is able to interrupt a partially completed export command being performed by the realm management unit 20, 22, 24, on behalf of the virtual machine. When the export on behalf of the hypervisor is completed, then the export on behalf of the virtual machine may be restarted.

In this example, the command to the realm management unit 20, 22, 24 may be a combined initialisation and execute command which is executed repeatedly until the memory access circuitry reports that the command sequence corresponding to the export operation has been completed. In the previously discussed example the export command may be formed of an export initialisation command which specifies a pointer to the command context buffer and other pointers followed by a subsequent export execute command which is repeatedly executed until the memory access circuitry reports that the command sequence has completed. In other example embodiments the export operation may be controlled by a combined initialization and execute command (which is interruptible) and an execute continue command which is issued if the combined initialization and execute command is interrupted.

The command context buffer is used to store partially completed state representing the partially completed command sequence so that this data can be restored at a later time. In this way, the system does not need to wait until a full export operation has been completed before an interrupt can be serviced. Furthermore, as the partially completed state is retained, forward progress through the export operation is ensured even if it is repeatedly interrupted as the export operation will not need to be restarted from its initial point.

Figure 9:
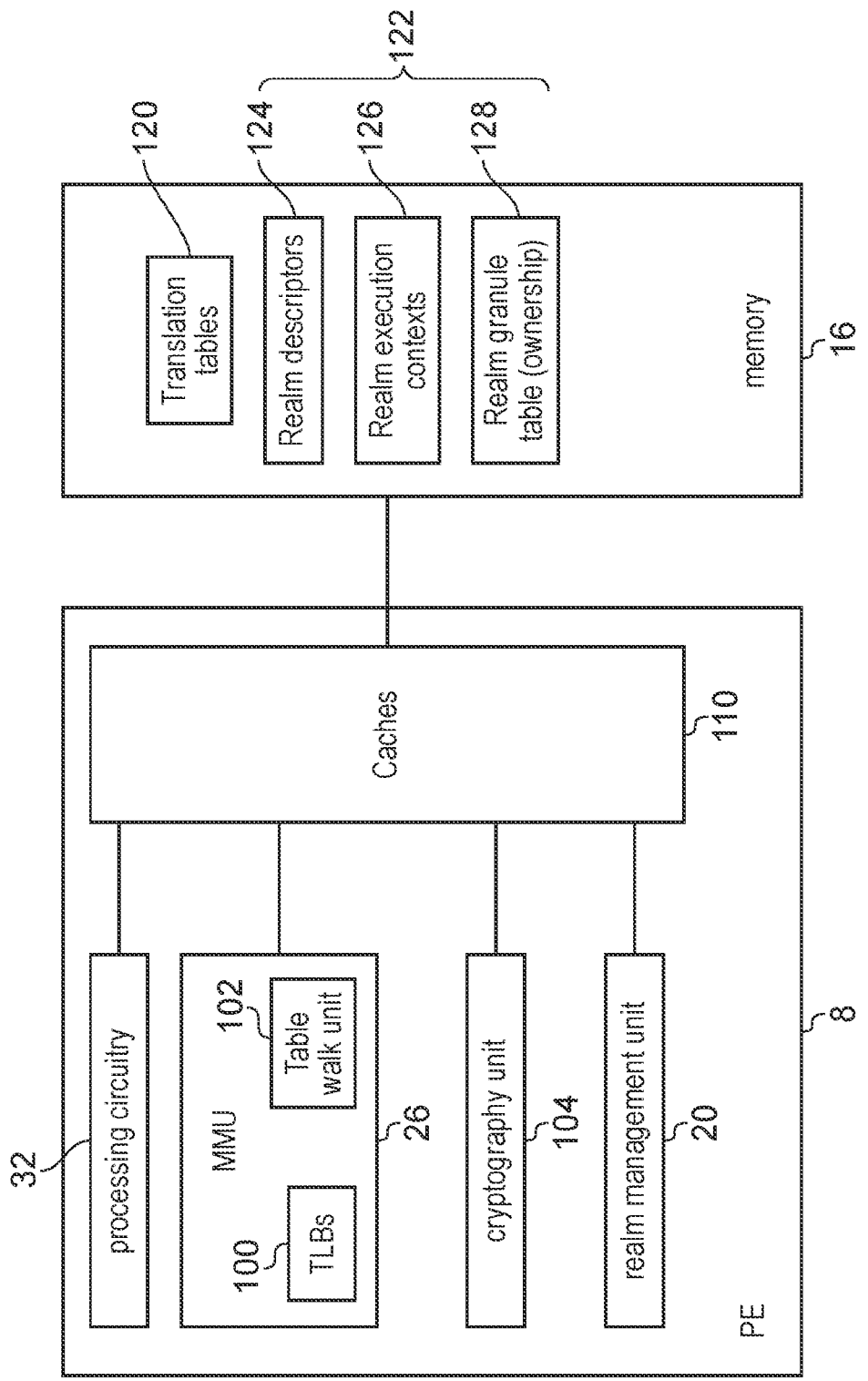
FIG. 9 illustrates a more detailed example of a processing element and realm management control data stored in memory.

FIG. 9 illustrates a more detailed example of one of the processing elements 8, 10, 12 of FIG. 1 and of the control data stored in the memory 16 for controlling memory accesses. For ease of explanation, FIG. 9 shows the CPU 0 as the processing element 8, but it will be appreciated that the processing element could also be CPU 1 10 of the GPU 12 or any other processing elements within a data processing apparatus 2. As shown in FIG. 9, the processing element 8 includes processing circuitry 32 (which may comprise the decode and execute logic described above), a memory management unit 26, which may include one or more translation lookaside buffers 100 for caching entries of the translation tables (which may also be appended with realm-based control data from the RMU 20 if shared MMU-RMU TLB structures are used), and a table walk unit 102 for controlling allocation of data to the TLBs 100 and triggering walk accesses to memory to locate the required data used to control whether a given memory access is allowed to be performed. The processing element 8 may also include a cryptographic unit 104 which may perform cryptographic operations for encrypting or decrypting data, for example for use in the paging (export/import) operations discussed above. The processing element 8 also includes a number of caches 110 which may cache data or instructions read from the memory 16. If accesses to memory triggered by the processing circuitry 32 or by the table walk unit 102 miss in the caches, the data can be located from main memory 16.

The processing element 8 also includes a realm management unit 20 as discussed above. In some embodiments the realm management unit (RMU) 20 may be provided as a hardware circuit. However, some of the RMU operations discussed below may be relatively complex to implement purely in hardware, for example if they require multiple accesses to different memory regions to be performed. Therefore, in some examples the RMU 20 may be implemented using program code which may be stored within the data processing apparatus 2 and may be executed using the general purpose processing circuitry 32. Unlike general purpose software which may be written to memory 16 and may be rewritable, the RMU software (millicode) could be installed in a relatively permanent manner on the data processing apparatus so that it cannot be removed, and may be regarded as part of the platform provided by the processing system. For example the RMU program code could be stored within a read only memory (ROM). Hence, the RMU may comprise a hardware unit, or may comprise the processing circuitry 32 executing realm management software, which is triggered to execute by RMU commands included in the general purpose software executed by the processing circuitry 32. In some examples, the RMU 20 may be implemented using a combination of hardware and software, e.g. some simpler functionality may be implemented using hardware circuits for faster processing, but more complex functions may be implemented using the millicode. Hence, it will be appreciated that subsequent references to the RMU may refer to either hardware or software or a combination of both.

As shown in FIG. 9, the memory 16 may store a number of pieces of control information used by the MMU 26 and RMU 20 for controlling access to memory. These include translation tables (also known as page tables) 120, which define memory access attributes for controlling which processes are allowed to access a given memory region, as well as address mapping information for translating virtual addresses to physical addresses. The translation tables 120 may be defined based on the exception levels discussed above with respect to FIG. 2, so that a process executing at a more privileged exception level may set permissions which govern whether processes executing at less privileged exception levels are allowed to access the corresponding memory regions.

Also, a number of realm management tables or realm control information 122 are provided for controlling memory access in an orthogonal manner to the MMU page tables 120, to allow a less privileged process to control whether a more privileged process is accessed (the realm control is orthogonal to the MMU control in the sense that, for a memory access request to be serviced, it may need to pass both types of access control checking). With the realm management table, an owner process (realm) which owns a given memory region has the right to exclude processes executing at a more privileged exception level from accessing that memory region. The realm management data includes realm descriptors 124 which describe properties of a given realm. Each realm corresponds to at least a portion of at least one software process executed by the processing circuitry 32. Some realms may correspond to two or more processes, while other realms may correspond to only a sub portion of a given software process. A realm can also be viewed as mapping to a given region of the memory address space (with the processing circuitry 32 executing within a given realm when it is executing program instructions which lie within the corresponding region of the memory address space). Hence, a realm can be seen either as a set of software processes or a portion of a software process, or as an area of the memory address space. These two views are equivalent. For ease of explanation the subsequent description will refer to a realm as at least a portion of at least one software process, but the corresponding view of a realm as a collection of memory regions is equally valid (in this case, "entry" and "exit" to/from a realm may corresponding to program execution reaching/leaving the part of the memory address corresponding to the realm).

The realm management data 122 also includes realm execution context regions 126 which can be used for saving and restoring architectural state associated with a given realm upon realm exit or entry. The realm management data also includes a realm granule table (or ownership table) 128 which defines, for each region of the memory address space which realm is the owner realm for that memory region. The owner realm for a given memory region has the right to exclude other realms (including more privileged processes) from accessing data stored within that memory region. Use of this realm management data is discussed in more detail below. In general, the realm management unit 20 and MMU 26 can be seen as memory access circuitry which enforces the ownership rights defined by an owner realm for the memory regions owned by that realm. This can be particularly useful, for example, for a cloud platform in which a number of virtual machines 36 provided by different parties may be executing under control of a hypervisor 38 provided by the cloud server operator. A party providing one of the virtual machines may not wish their data and code to be accessible to the hypervisor. By introducing the concept of realms where a realm executing at a less privileged exception level can exclude a more privileged exception level from accessing its data or instructions, this enables a blind hypervisor to be provided which can increase the confidence of code developers to install their software on a cloud service where the physical hardware may be shared with code provided by other parties.

Figure 10:
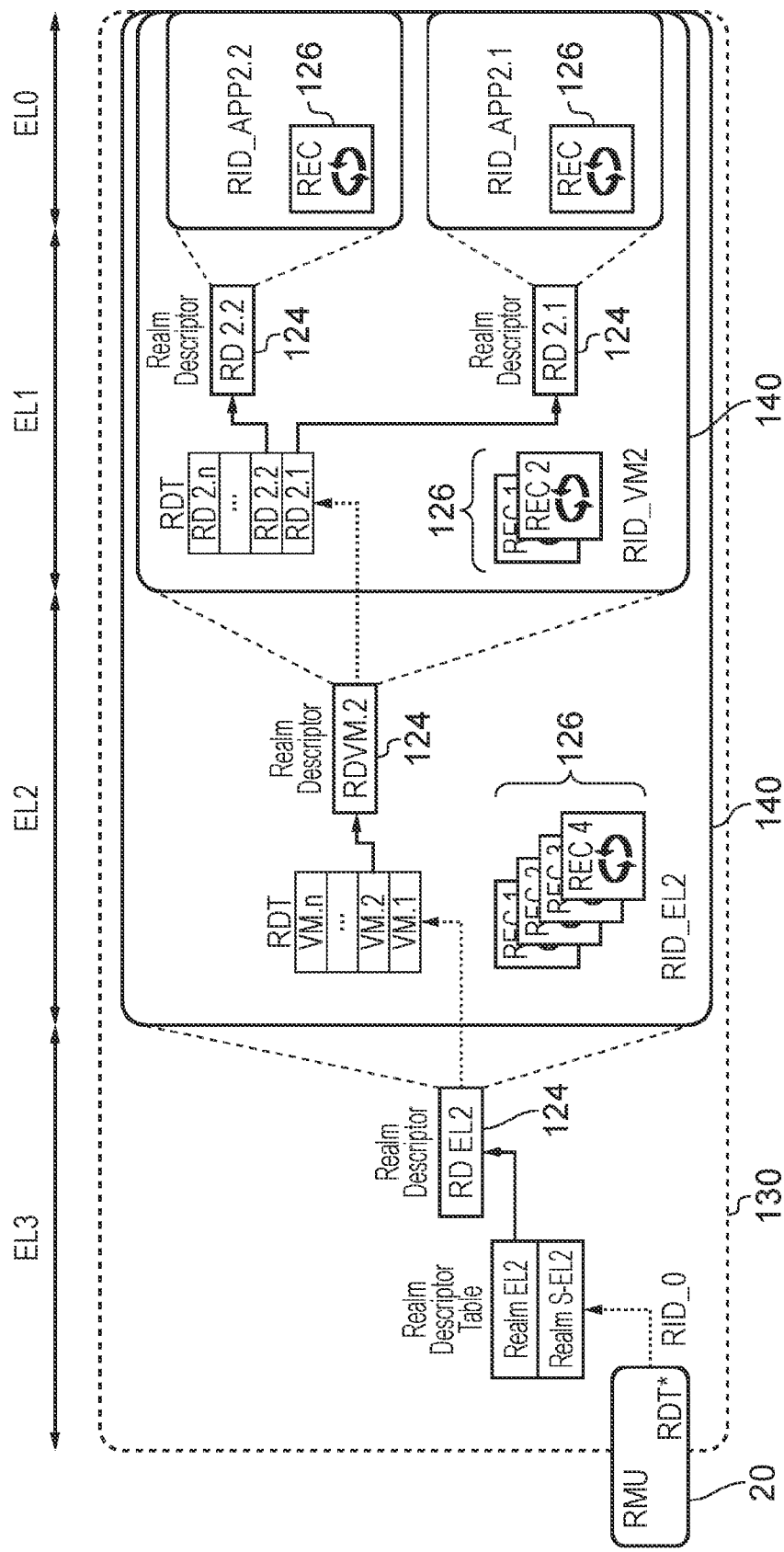
FIG. 10 shows an example of a hierarchy of realms in which a parent realm can define realm descriptors describing properties of various child realms.

As shown in FIG. 10, the realms are managed by the RMU 20 according to a realm hierarchy in which each realm other than a root realm 130 is a child realm which has a corresponding parent realm which initialized the child realm by executing an initialization command. The root realm 130 may for example be a realm associated with the monitor code or system firmware executing at the most privileged exception level EL3. For ease of explanation, the example of FIG. 10 and the initial examples discussed afterwards show cases where each child realm executes at a lower privileged level than its parent realm. However, as will be discussed below it is also possible to establish a sub-realm which executes at the same exception level as its parent.

In general, for the realm management part of the memory access control provided by the MMU 26, a child realm has default access to any memory regions owned by its parent realm. Similarly, any descendants of a given realm are assumed to have access to the given realm's owned memory regions. However, as the realm management control is orthogonal to the control provided by the translation tables 120 based on exception level, a process executing at a higher privilege level can still exclude less privileged code from accessing its data, by setting parameters of the translation tables 120 accordingly. Hence, in general a given child realm has a right to exclude its parent realm from accessing data stored in a given memory region owned by the given child realm. Whether the child realm actually excludes the parent realm from accessing a given memory region may be set based on control attributes set in the ownership table 128 (the default may be that the parent realm has no access to the child realm's owned regions, but the child realm may choose to grant access to the parent realm by setting the visibility attributes accordingly). When there are multiple sibling realms (different child realms sharing the same parent realm) then a given child realm may exclude a sibling realm from accessing the data stored in a given memory region owned by the given child realm. Again, visibility attributes set in the ownership table 128 may control the extent to which sibling realms can access each other's data. Alternatively, access by sibling realms may be controlled based on the parent visibility attribute, so that if a child real makes a page visible to its parent realm, the same page also becomes visible to its sibling realms and further descendants of the sibling realms. In some cases the ownership table 128 may have a global visibility attribute which may allow a given owner process to enable any process executing under any realm to access the data within its owned memory region.

As shown in FIG. 10, each realm 140 is associated with one or more realm execution context (REC) memory regions 126 which can be used for storing architectural state of the realm, such as register values, when exiting from a given realm. The number of RECs 126 provided for a given realm may depend on how many threads of execution are operating under a given realm. For example a realm when first initialized may be established with a single primary REC region 126, but then the realm may configure other memory regions owned by that realm to act as further RECs as necessary. The REC memory regions are owned by the corresponding realm whose execution state is stored to that REC.

Each realm is associated with a realm descriptor 124 which is stored in a memory region which is owned by the parent realm of the realm whose properties are described in the realm descriptor 124. For flexibility in the number of child realms which can be defined at a given generation of realm, the realm descriptors are managed using a tree structure called the realm descriptor tree (RDT) which will be discussed in more detail later. A realm descriptor 124 can be used to define properties of the realm which can be checked by the RMU 20 on entry or exit from a realm to ensure security. The realm descriptor may also track progression of a realm through various lifecycle states so that execution of certain RMU commands for a realm may be restricted to particular lifecycle states, to ensure that realms are created and invalidated in a secure manner.

Figure 11:
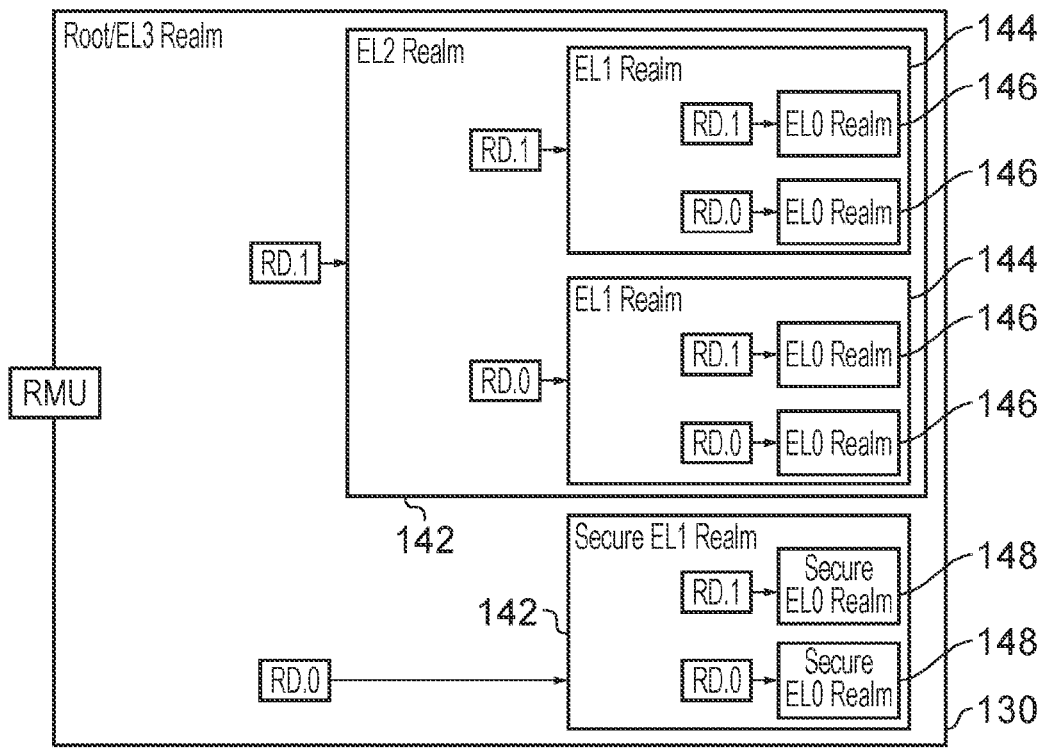
FIGS. 11 and 12 illustrate two different examples of a realm hierarchy.
Figure 12:
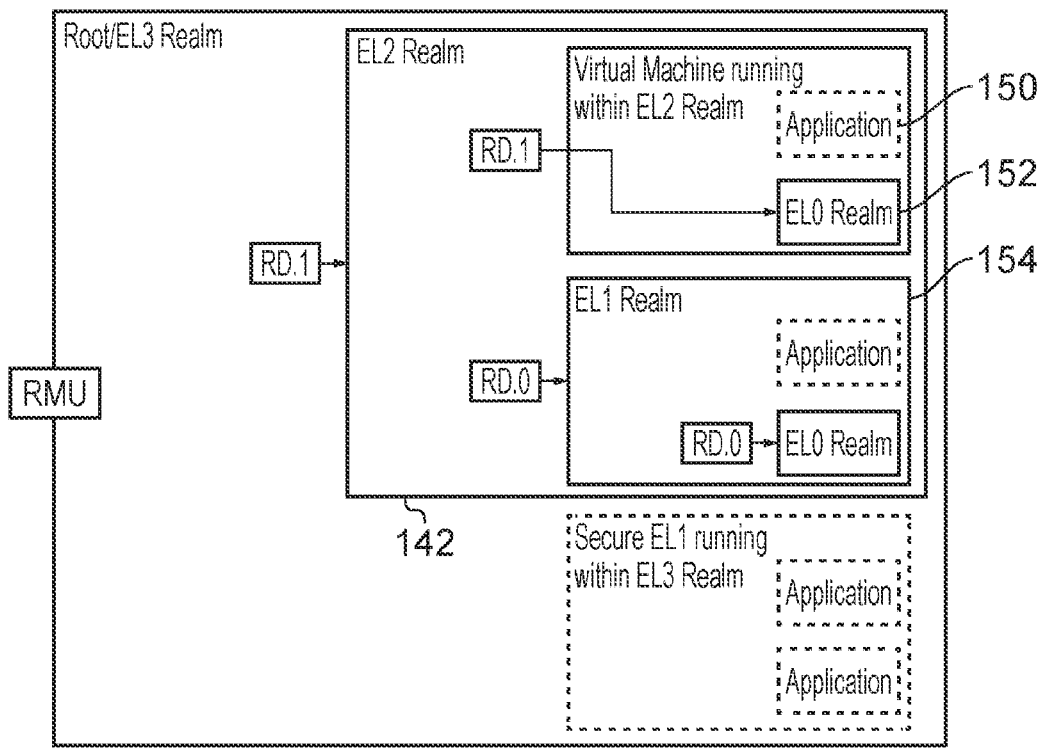

FIGS. 11 and 12 show two different examples of possible realm hierarchies. In the example of FIG. 11, each of the processes shown in FIG. 2 has its own realm defined. Hence, the root realm 130 corresponds to the monitor software or firmware operating at exception level EL3. The root realm defines two child realms 142, one corresponding to the secure operating system operating at secure EL1 and another corresponding to the hypervisor at EL2. The hypervisor defines grandchild realms 144 corresponding to different guest operating systems at EL1 and each of those guest operating systems define further great-grandchild realms 146 corresponding to applications executing at the least privileged exception level EL0. Similarly the secure operating system in realm 142 can define grandchild realms 148 corresponding to different secure applications. A parent realm in the hierarchy can transfer ownership of a memory page that it currently owns to a new child realm (by using a Granule.Add command as discussed below), or can make one of its pages invalid, map it into a child's virtual address space, and allow the child realm to claim ownership of the page by executing a page ownership (Claim) command. A page ownership command may be rejected if the specified page of the memory address space is not already owned by the parent realm which issued the command.

As shown in FIG. 12, it is not essential for processes at every level of privilege to have separate realms, and so some of the privilege level boundaries shown in dotted lines in FIG. 12 may not correspond to a realm boundary. For example in FIG. 12 the application 150 and its operating system execute within the same realm as the hypervisor realm 142 operating at exception level EL2, and so a single realm spans both the EL2 hypervisor code, an operating system operating at EL1 and the application at EL0. On the other hand a different application 152 under the same hypervisor may have its own separate realm defined. In this case the realm boundary is between EL1 and EL0 and there is no EL2-EL1 realm boundary (both the hypervisor and operating system may execute in the same realm). For another operating system, a separate EL1 realm 154 may be defined, which again may have some applications which execute within the same realm as the operating system, and other applications which have their own dedicated realm. Similarly, on the secure side, the secure OS and applications in FIG. 12 execute entirely within the EL3 root realm, and so there is no realm boundary when operating on the secure side. Hence, the precise configuration of realms may be determined at run time for a given system depending on the needs of the processes being executed. Software can decide at runtime whether it requires only a small and fixed number of child realms (which might be the case for low-level firmware) or needs many realms or a varying number of realms (which might be useful for a hypervisor on a cloud platform for example, which may manage an unknown number of guest virtual machines).

Figure 13:
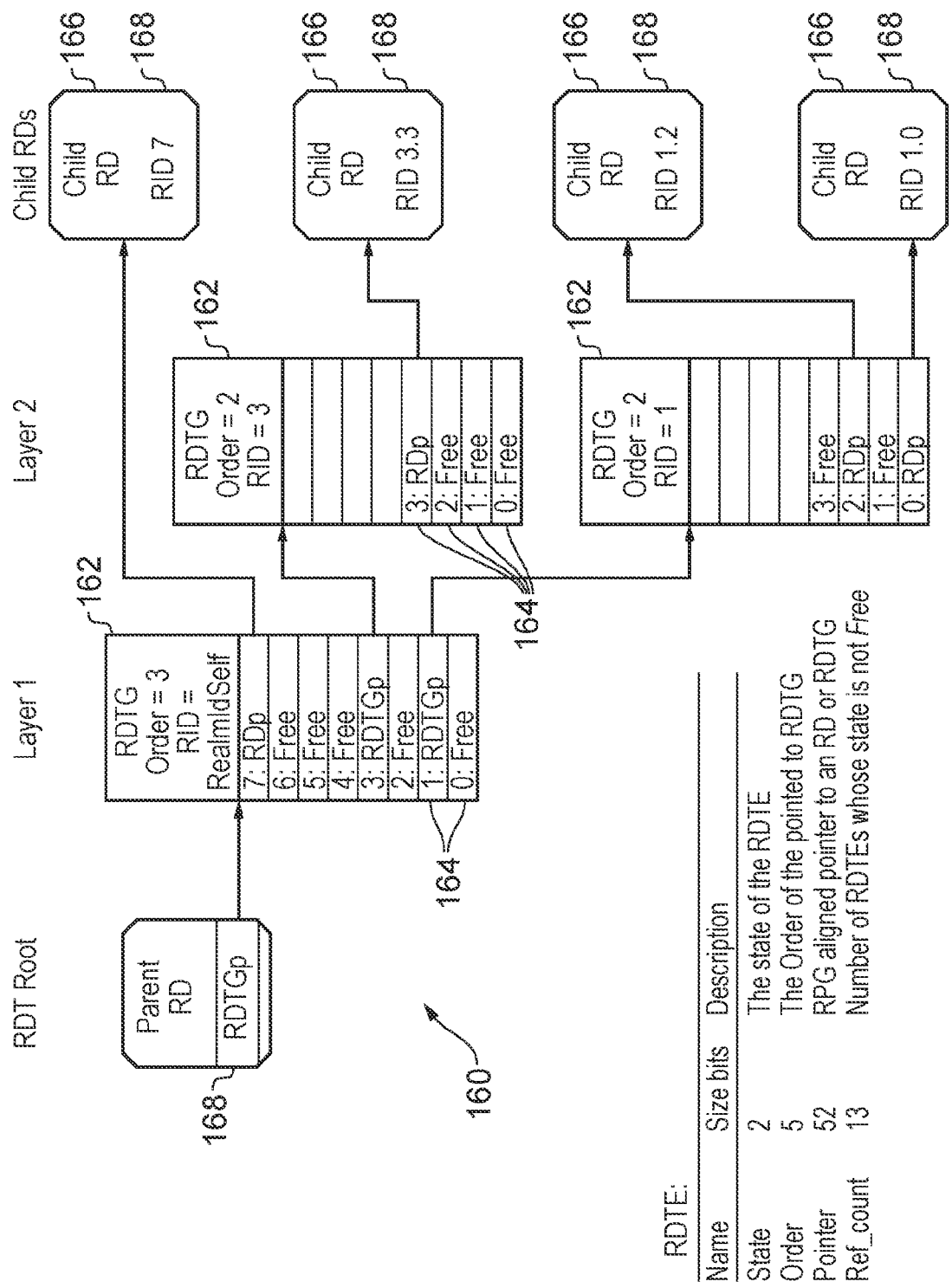
FIG. 13 shows an example of a realm descriptor tree maintained by a parent realm to record the realm descriptors of its child realms.

The realm descriptors 124 for a given parent realm are managed according to a realm descriptor tree (which is an example of a realm management tree which defines the realm management data for a number of child realms of that parent realm). The tree has a variable number of levels. FIG. 13 shows an example of such a realm descriptor tree 160 managed by a particular parent realm. The tree 160 comprises a number of realm descriptor tree granules (RDTG) 162 which each comprise a number of realm descriptor tree entries (RDTE) 164. Each RDTE 164 provides a pointer to either a realm descriptor 166 for a given child realm of the parent realm, or a further RDTG 162 for the next level of the realm descriptor tree. The RDTG 162 for the first level of the tree may be identified by a realm descriptor tree pointer 168 which may be stored as part of the data associated with the parent realm (e.g. with the parent realm's realm descriptor). Hence, when the parent realm issues an RMU command associated with a given child realm it can trigger the RMU to traverse the realm descriptor tree in order to locate the required child realm's realm descriptor 166 (if that realm descriptor is not already cached within the RMU 20). Each RDTG 162 may have a variable number of entries 164.

As shown in the table in FIG. 13, a given RDTE 164 which provides a pointer to an RDTG 162 at a subsequent level of the tree may include an order value which indicates the maximum number of entries in the pointed to RDTG. For example, the order value may indicate a power of two corresponding to the total number of entries in the pointed to RDTG. Other information which can be included in the RDTE 164 may include a state value indicating the state of the RDTE (e.g. whether the RDTE is free for allocation of realm descriptor tree data, and whether the RDTE provides a pointer to a further RDTG 162 or to a child realm descriptor 166). In addition to the pointer, the RDTE may also include a reference count which may track the number of RDTEs in the pointer to RDTG which are not free, which can be useful for determining whether further RDTEs can be allocated to that RDTG 162. RMU commands triggered by the parent realm may control the RMU 20 to establish further RDTGs of the tree and/or edit the contents of RDTEs within existing RDTGs.

Note that the tree shown in FIG. 13 shows the child realms of one particular parent realm. Each other parent realm may have a separate realm descriptor tree tracking its own child realms. The data associated with the tree, including the RDTGs 162 and the child realm descriptors 166, are stored within pages owned by the parent realm and so other realms can be excluded from accessing this data. Therefore, only the parent realm may have visibility of which particular child realms it configured, so that processes executing at higher privilege levels may have no visibility of what realms have been created below any child realms which it has directly created itself.

As shown in FIG. 13, each of the child realms of a given parent realm may have a corresponding realm identifier (RID) 168, which is used by that parent realm to identify a particular child realm. The RID is a local realm identifier in that it is specific to a particular parent realm. Child realms of different parent realms may have the same local RID. Although it is possible to use local RIDs which have arbitrary values selected by the parent realm for a given child realm, in the approach shown in FIGS. 13 and 14, the local RID for a given child realm has a variable number of variable length bit portions and each of the variable length portions is used by the RMU 20 to index into a given level of the realm descriptor tree 160. For example, the realm descriptor of the child realm having local RID=7 in FIG. 13 is accessed by following the realm descriptor pointer in entry 7 of the first level RDTG 162. The realm descriptor of child realm with local RID=3.3 is accessed by following entry 3 in the first level of the tree and then entry 3 in the second level of the tree. Similarly the realm descriptor for child realm with local RID=1.2 is accessed by following entry 1 in the first layer and entry 2 in the second layer.

Figure 14:
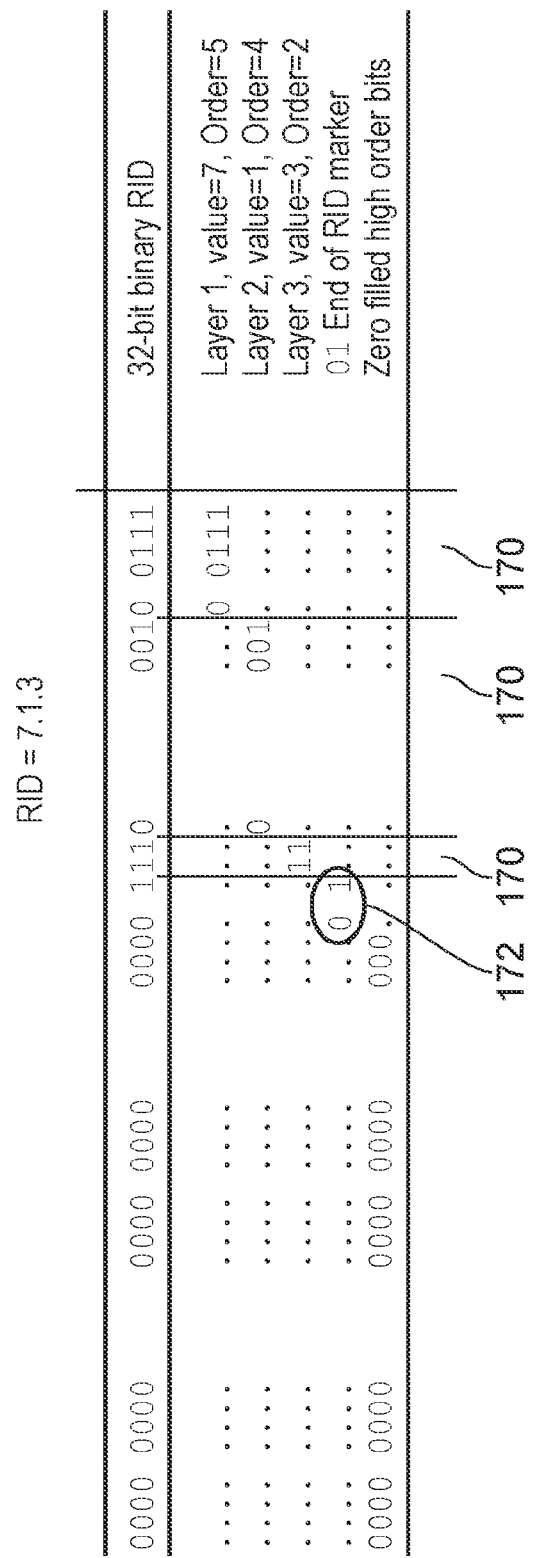
FIG. 14 shows an example of a local realm identifier constructed from a number of variable length bit portions which each provide an index to a corresponding level of the realm descriptor tree.

In FIG. 13 the local RIDs are illustrated in decimal form but FIG. 14 shows how these can be represented using a binary identifier. The binary identifier may have a number of variable length bit portions 170 and each of those bit portions may specify the index to use at a corresponding level of the RDT. In this example the binary local RID is filled up from the least significant end first, so that the lowest 5 bits correspond to the entry in the first level of the tree, the next 4 bits correspond to the entry in the second level, and so on. In this example the full local RID corresponds to 7.1.3 as the least significant portion provides value 7, the next least significant bit portion provides value 1, and so on.

The number of bits to be used within each of the variable length bit portions 170 can be determined by using the order values in the RDTEs which are traversed as the RMU 20 steps through the realm descriptor tree. The order value for the first bit portion of the local RID may be defined within the parent realm's realm descriptor (along with the first level RDTG pointer). In the example of FIG. 14, for instance, the order values for the 3 levels are 5, 4 and 2 respectively, indicating that the first 5 bits indicate the index for level 1, the next 4 bits indicate the index for level 2, and the next 2 bits indicate the index for level 3 of the RDT. Eventually an end of RID (termination) marker 172 is reached, which has a predetermined pattern indicating that there are no further levels of the tree to traverse, and so the next memory region accessed from the pointer in the last level RDTG will provide the realm descriptor for the required child realm. Any unused bits are filled with zeroes. Although FIG. 14 shows an example where the RID is filled up from the least significant end, it would also be possible to construct a RID by concatenating the indices required for stepping through the tree starting from the most significant end of the binary value.

This approach provides a flexible infrastructure for allowing different numbers of child realms to be established by a given parent realm, and for allowing the realm descriptors for those child realms to be accessed efficiently. As the realm identifier explicitly provides the indices required for stepping through the realm descriptor tree, there is no need to maintain a mapping table mapping arbitrary realm numbers to particular routes through the tree. As a tree structure is used, then in comparison to a table structure which would provide a certain fixed number of entries, the tree can be extended as required for the number of child realms by adding additional RDTGs or adding additional RDTEs to a given level of the tree as appropriate. Hence, the structure is scalable to the needs of different software processes. As it is not specified in advance exactly which portions of the RID should map to a given level of the tree, then this enables the available bits of the RID to be allocated flexibly to accommodate different depths/breadths of tree.

The realm management unit 20 may be responsible for accessing the realm descriptor tree when required, e.g. when entering or exiting a realm in order to identify the properties of the new realm and determining whether or not entry to the new realm is permitted, or when deciding whether it is appropriate to execute certain RMU commands. In general the ream management circuitry may index the realm descriptor tree using a realm identifier of a given realm which comprises a variable number of variable length bit portions with a given one of the variable length bit portions providing the index into a given level of the realm descriptor tree. This enables flexible dimensioning of the realm descriptor tree in order to support a wide variety of requirements for different software processes to establish child realms.

The realm management circuitry 20 may determine how many bits are comprised by the variable length bit portion to be used for indexing into a given level of the realm descriptor tree, based on an order value specified by an entry index at a previous level of the realm descriptor tree. By storing the order values within entries of the tree then it is not necessary to predefine which bits of the RID are to be used to be mapped to a given level of the tree and this provides further flexibility.

The RMU may permit variable length bit portions for indexing into different branches at the same level of the realm descriptor tree to have different numbers of bits. That is, although in FIG. 13 both of the RDTGs 162 shown in layer 2 have the same order value (and hence the same number of entries), this is not essential and some implementations may have different RDTGs 162 at the same level of the tree having different numbers of entries. Therefore, the corresponding portions of the respective realm's RIDs may have different numbers of bits for the same level of the tree. Hence, the variation in the length of the bit portions used for indexing into given length of the tree may not only vary from parent to parent, but could also vary within different branches of the tree managed by one parent, providing further flexibility in the way in which child realms can be defined.

In general the RID for a given realm may comprise a concatenation of the indices to be used at respective levels of the realm descriptor tree to access the realm management data for the given realm. Although it is not essential for the indices to be concatenated in the same order as the order in which they would be used for stepping through the tree, this can be preferred as it makes management of the tree accesses simpler. It is not important whether the concatenation goes from low to high or from high to low. The concatenation of indices may be followed by a predetermined termination pattern which can allow the RMU 20 to determine when there are no further levels of the tree to be stepped through.

Some implementations could apply this RID construction technique to a global realm descriptor tree which may store realm descriptors for all the realms within the system in a similar tree structure (with each of the RIDs being a globally unique value). However, software development can be made simpler by defining the child realms of a given parent within one tree and then having separate trees for each other parent realm to track its child realms. Hence the realm descriptor tree may be a local realm descriptor tree associated with a given parent realm for storing the realm management data of the child realms which have been initialized by the given parent realm. The realm identifier may therefore be a local realm identifier which identifies a particular child realm used by a given parent realm. Child realms initialized by different parent realms may be permitted to have the same value of the local realm identifier. In this way, a parent realm can select which RIDs are used for its child realms without being aware of what other realms have been established by other parent realms, with the RIDs for the child realms being constructed depending on the way in which the parent realm has configured its realm descriptor tree.

The local realm identifier can be used by realm entry instructions or RMU commands issued by software processes. However, the hardware infrastructure may use an absolute identification of a given child realm to distinguish realms created by different parents. Hence, in addition to the local realm identifiers shown in FIGS. 13 and 14, a given realm may also have a global realm identifier (or "internal" realm identifier) which is unique to the given realm. At least one hardware structure may identify a given realm using a global realm identifier (GRID) instead of a local realm identifier (LRID). For example, the realm granule table 128 and/or TLBs 100 may identify realms using the global realm identifier.

In some examples an arbitrary binary value could be allocated as the GRID for a given realm, which can be completely unrelated to the LRID used by the parent realm to refer to that child realm. Different micro-architectural implementations of the same realm architecture could use different approaches for allocating the GRID.

However, in one example as shown in FIG. 15 the GRID for a given realm may be constructed based on the LRIDs of its ancestor realms. This can be useful because it can be enable simpler determination of whether a given realm is a descendant of another realm or an ancestor of another realm which may be useful for the access control by the MMU 26 and RMU 20. In particular, the realms which share a common ancestor realm may share a common prefix or suffix portion of the GRID. For example, the GRID for a child realm may comprise a concatenation of the GRID of its parent realm and the LRID of that child realm. For example, as shown in FIG. 15, if a given realm 180 has a certain local realm identifier X, then its child realms 182 may each have a GRID which is formed by concatenating X with the specific LRIDs formed based on the indices in realm X's realm descriptor tree. For example, the child realm with LRID 1.2 may have a GRID X.1.2. Similarly, a grandchild realm of realm X.1.2 having LRID 7 may have a GRID X.1.2.7.

In some cases, in the GRID, the LRIDs could be concatenated including the termination marker and zero-filled bits shown in FIG. 14. Alternatively, the binary representation of the GRID may exclude such termination markers and zero-filled bits, and instead the meaningful parts of the LRIDs which contain RDT indices could be concatenated directly. As each of the LRIDs may themselves have a variable number of bits depending on the depth and breadth of the RDT for the relevant parent realm, then the number of bits of the global RID which are allocated to representing the local RID of the given generation of realm may be variable. Again, this variation in which parts of the global RID are allocated to a given generation of realm may vary at runtime based on the particular software that is running, but may also vary between different branches of the "family tree" of realms so that one branch of the family tree may use a greater portion of the realm identifier than others. As the common prefix or suffix of the GRID is the same for realms sharing a common ancestor, any subsequent generations can still be distinguished by the remaining portion which is specific to the subsequent generations, regardless of how that remaining portion is divided up among further generations.

By constructing the GRID as a concatenation of LRIDs for a number of ancestor realms, this enables more efficient determination of whether a first realm is an ancestor or descendant of a second realm. Circuitry may be provided (for example within the TLB 100 or RMU 20) to determine whether a global RID of one of the first and second realms matches a prefix or suffix portion of the global RID of the other realm, for example by using bit masking to mask out portions of the global RID corresponding to later generations in order to allow a comparison between the global RIDs of earlier and later realms within the same family to be matched.

It is not essential for all local RIDs to be constructed using the concatenation of tree indices approach shown in FIG. 13. In some cases it may be useful for particular values of the local RID to be reserved for referring to certain default realms. RMU commands specifying the current realm or the parent realm of the current realm may be relatively common. Hence, a predetermined RID value may be reserved for referring to the parent realm of the current realm. For example an LRID with all bits set to 1 (indicating a value of 1) could be reserved for referring to the parent realm of the current realm. Similarly, a predetermined realm identifier value may be reserved for referring to the current realm itself. For example a LRID value of 0 could be used to refer to the current realm. Note that the use of the RID termination marker 172 in the LRID helps to support a value of zero being used as a predetermined realm ID value for the current realm, as it means that even if a child realm descriptor is identified using RDTE 0 in each level of the RDT, the resulting RID value is still not equal to zero as it may include this termination marker 172 which may have at least one bit set to 1. Hence, in addition to indicating the end of the RID, the termination marker 172 can also support other functions.

The RMU may support certain query commands which may be triggered by a given realm in order to query constraints which it must satisfy when it is establishing its realm descriptor tree. For example, in response to the query command, the RMU 20 (or the processing circuitry 32) may return a constraint value which indicates at least one of a maximum number of levels of the realm descriptor tree 160 permitted to be defined by the given realm, a maximum number of tree entries permitted at a given level of the tree structure for the given realm, and/or a maximum number of child realms that may be initialized by the given realm. For example, the system may include registers which may indicate properties such as the number of bits available in the LRID or GRIDs used for a particular hardware implementation. The RMU or processing circuitry may, in response to the query command, check the number of bits available for the realm identifiers (or the appropriate response may be hardwired for the particular processor implementation), and could also check information specifying how many bits of the identifiers have been already used up by ancestor realms in the global realm identifier, in order to determine how many bits are available remaining for the current realm to define further children. The parent realm can use the response to a query command to decide how to construct its RDT.

FIG. 16 shows an example of contents of a realm descriptor 166 for a given realm. It will be appreciated that this is just one example and other implementations may not include all of the listed information, or could it include additional information. In this example the realm descriptor includes the following:

The global RID of the realm. Hence, by traversing the realm descriptor tree based on the local RID, the corresponding global RID can be identified and this can be used to index hardware structures such as the TLB by the given realm, or check ownership tables or other information defined based on the GRID.

A lifecycle state of the given realm, which can be used by the RMU 20 to determine whether to accept a given command triggered by the given realm.

A type of the given realm. For example, the realm type could indicate whether the realm is a full realm or a sub-realm as discussed later.

A boundary exception level (BEL) value, which identifies a boundary exception level for the corresponding realm. The BEL indicates a maximum privilege level at which the realm is permitted to execute. For example, realm 142 in FIG. 12 may have a BEL of EL2, realm 152 may have a BEL of EL0, and realm 154 may have a BEL of EL1. By providing an explicit parameter identifying the BEL in the realm descriptor, this provides flexibility for realms to span multiple exception levels, as the BEL can be used on occurrence of an exception to determine whether the exception can be taken within the current realm or whether a realm exit to a parent realm is required to handle the exception.

A resource count indicating the total number of memory regions (realm protection granules or RPGs) owned by the realm and its descendants. This is used to ensure that all memory pages owned by the realm and its descendants are invalidated (and ultimately wiped of data), before those memory regions can be allocated to a different realm. For example the resource count can be used to track how many regions still need to be scrubbed.

Start and end addresses of a protected address range for the realm. For example the protected address range may define the range of memory address space within which pages can be owned by the corresponding realm.

This can be useful for protecting against malicious parent realms reclaiming ownership of a region previously allocated to a child realm in an attempt to access the child realms data, since by comparing the protected address range defined in the realm descriptor with subsequent addresses of memory accesses, cases where a memory region previously owned by the realm is no longer owned by the realm can be identified.

One or more encryption keys used by the cryptographic circuitry 104 to encrypt or decrypt data associated with a given realm. In this example two separate encryption keys are provided: a memory key for encrypting/decrypting contents and memory owned by the realm and a paging key for encrypting/decrypting data which is exported/imported between memory 16 to persistent storage 6 as discussed above. However in other examples the same key could be used for both purposes, or further keys could be provided for other specific purposes.

A realm description tree entry (RDTE) which identifies the root of the realm descriptor tree. The RDTE in the realm descriptor provides a pointer for accessing the root RDTG (and the order value defining how many bits to use as the index for that RDTG).

A pointer to a primary REC (realm execution context) memory region for saving or restoring architectural state associated with execution of the realm.

FIG. 17 shows a set of lifecycle states in which a given realm can exist, which in this example include a Clean state, a New state, an Active state and an Invalid state. FIG. 17 summarizes the properties of each state, indicating for each state: whether a realm in the corresponding state can have the parameters of its realm descriptor 166 modified by its parent realm, whether the encryption key specified for that realm can be validly used, whether the realm can own any memory regions (RPGs) and whether or not code associated with that realm is executable. Note that the parameters of the realm descriptor are modifiable in the Clean state but cannot be modified in any of the other states. This prevents a malicious parent realm updating the properties of a given realm after it has become active. Also the realm is executable only in the Active state.

Figure 18:
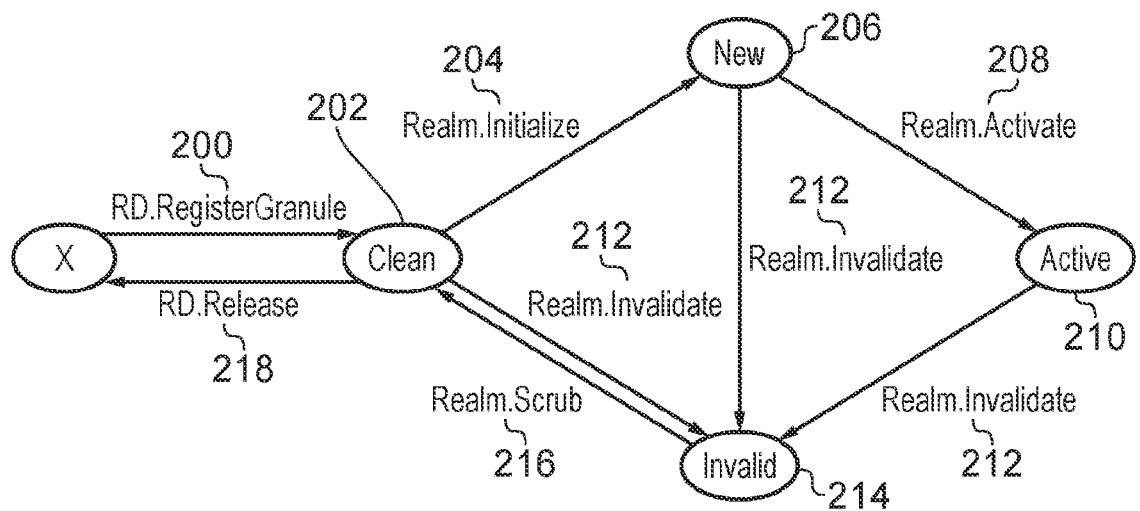
FIG. 18 is a state machine diagram indicating changes of lifecycle states of a realm.

FIG. 18 is a state machine diagram showing allowed transitions of lifecycle states of the realm. Each state transition shown in FIG. 18 is triggered by the parent realm issuing, to the RMU 20, a realm management command which specifies the local RID of the child target realm (the Realm.Invalidate command 212 can also be issued by the target realm itself). When no previous realm has been defined for that local RID and a realm descriptor register granule command 200 is executed by the parent realm, this triggers the configuration of a given memory region owned by the parent realm as a realm descriptor for the child realm having the specified local RID. The global RID for the child realm may be set based on the concatenation of the parent realm's global RID and the new local RID specified in the realm descriptor register granule command 200. The specified child realm then enters the Clean state 202. In the Clean state, the parent realm can set the properties of the child realm by updating the various parameters of the child realm's realm descriptor. These properties can be modified using further RMU commands issued by the parent realm (such realm descriptor modifying commands may be rejected if the specified child realm is not in the Clean state). When the parent realm has finished setting the parameters of the child realm's realm descriptor, it executes a realm initialize command 204 specifying the child realm's LRID and this triggers a transition of the child realm from the clean state 202 to the New state 206, and at this point the parameters of the realm descriptor are no longer modifiable by the parent realm. A realm initialization command 204 will fail if the specified realm is not currently in the Clean state.

When a realm is in the New state 206, execution of the realm activate command 208 specifying that realm's local RID triggers a transition from the New state 206 to the Active state 210 in which the realm is now executable, and after this point a realm entry into the corresponding realm will no longer trigger a fault. The realm is now fully operational. A subsequent realm invalidation command 212 triggered by the parent realm for a child realm in any of the Clean, New and Active states 202, 206, 210 results in a transition to the Invalid state 214. To leave the invalid state 214 and return to the Clean state 202, the parent realm has to execute a realm scrubbing command 216. The realm scrubbing command 216 is rejected if the resource count tracking the number of pages owned by the realm has a value other than zero. Hence, in order for the realm scrubbing command 216 to be successful, the parent realm first has to issue a Granule.Reclaim command for every page owned by the invalid realm. The Granule.Reclaim command specifies a target memory page and triggers invalidation of the target page to make the page inaccessible, and also reduces the reference count for the page's owner realm by one. It is not necessary to actually overwrite the data in the invalid regions when executing a Granule.Reclaim or realm scrubbing command 216, as the overwriting can be done when a Clean command is subsequently issued to transition the memory page from Invalid to Valid (see FIG. 22 discussed below). Also in response to the realm scrubbing command any cached data associated with the invalidated realm may also be invalidated, for example within the TLBs 100 or caches 110 of any of the processing elements 8, 10, 12 (not just the processing element executing the RMU command). The global RID may be used to trigger such invalidations of cached data.

Hence, by providing a managed lifecycle of the realm associated with a given realm identifier, this ensures that before the realm can return to the Clean state in which its parameters can be modified (and hence before a given realm identifier can be recycled for use by a different realm), the data associated with a previous realm which used the same realm identifier has to be scrubbed from memory and any caches, to prevent any data associated with the old realm being leaked to other realms through the reuse of the same realm identifier. When a realm is in the Clean state 202, its realm descriptor can also be cancelled by executing a realm descriptor release command 218 which enables the memory regions stored in the realm descriptor to be allocated for other purposes (at this point no scrubbing is required as the realm is already clean).

FIG. 19 shows an example of contents of an entry of the realm granule table 128 (or ownership table). Each entry corresponds to a given memory region of the memory address space. The size of a given memory region could be fixed or variable depending on implementation. The particular way in which the ownership table 128 is structured may vary significantly depending on implementation requirements, and so the particular way in which the corresponding memory region for a given entry is identified can vary (e.g. data could be stored in each entry identifying the corresponding region, or alternatively the corresponding entry may be identified at least partially based on the position of the corresponding ownership entry within the table itself). Again, FIG. 19 shows a particular example of parameters which may be specified for a given memory region but other examples could provide more information or could omit some of the types of information shown.

As shown in FIG. 19, each ownership table entry may specify, for the corresponding memory region:

The global RID identifying the owner realm for that memory region. The owner realm may be the realm which has the right to set the attributes which control which other realms are allowed to access the memory region.

A lifecycle state of the corresponding memory region used to control which RMU commands are allowed to be performed on the memory region.

A mapped address to which the memory region was mapped by the MMU 26 at the point when the memory region became owned by the owner realm. The mapped address could be a virtual address or an intermediate physical address. By specifying this address in the ownership table, this can guard against potential attempts to circumvent the security provided by the realm infrastructure by remapping the address translation tables after a realm has taken ownership of a given memory region.

A visibility attribute which specifies which realms in addition to the owner can access the memory region. For example, as shown in FIG. 20, the visibility attribute could specify a parent visibility bit which controls whether or not the parent realm of the current realm is allowed to access the region, and a global visibility bit which may specify whether any realm may access a corresponding memory region. In general, the realm protection scheme may assume that descendant realms of the current realm are always allowed to access the memory region owned by its parent or ancestor realm (subject to whether or not accesses are permitted based on the translation tables 120 which provide protection based on privilege level), but a given realm may control whether its parent or any other realm which is not a direct descendant of the given realm can access the memory region. In some embodiments both the parent and global visibility bits could be set by the owner realm itself. Alternatively, while the parent visibility bit may be set by the owner realm, the global visibility bit may be able to be set by the parent realm of the owner realm (provided that the parent visibility bit for the memory region has already been set to give the parent visibility of that memory region). It will be appreciated that this is just one example of how the owner realm could control which other processes could access its data.

Figure 22:
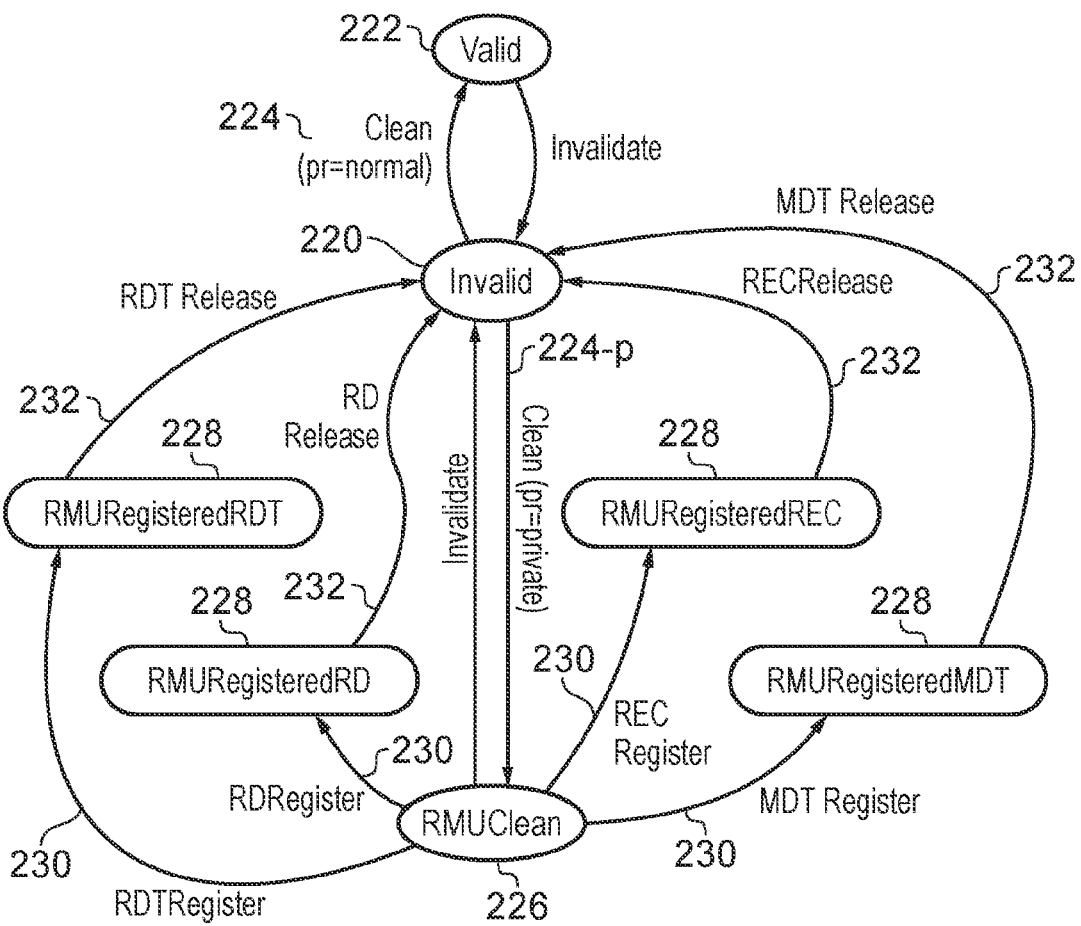
FIG. 22 is a state machine showing transitions of lifecycle state for a given memory region.

FIG. 21 is a table showing different lifecycle states in which a given memory region can exist, and FIG. 22 is a state machine showing the commands that trigger transitions between the respective lifecycle states. In a similar way to the realm lifecycle states shown in FIG. 18, the transitions between memory region lifecycle states are managed to ensure that a memory region passing from ownership by one realm to ownership of another realm must first undergo an invalidation process where data in that region is scrubbed (e.g. set to zero). Hence, in order to transition from an Invalid state 220 to a Valid state 222 in which software can access the memory region, a clean command 224 has to be executed by the RMU 20, triggered by software executing on the processing element 8. The clean command 224 identifies a particular memory region (page) and controls the RMU to step through the memory addresses of the corresponding memory region to invalidate/zero the data in each location within that memory region. The clean command is rejected (e.g. a fault is triggered) if the targeted memory region is in any state other than Invalid.

In some systems it may be sufficient to provide valid and invalid states 222, 220 as the only memory region lifecycle states. However, in the example of FIG. 22, a given memory region can also be designated as an 'RMU-private' memory region which is reserved for exclusive access by the RMU 20 itself, so that accesses to an RMU-private memory region which are triggered by software executing on the processing circuitry 32 (other than any RMU software) would be rejected. This could be useful especially for storing the realm management data such as the realm descriptors, realm descriptor tree entries, realm execution context and meta data for paging as discussed above. By providing attributes for designating a given memory region as an RMU-private memory region which is reserved for exclusive access by the RMU, this can prevent software processes, including the owner process of the memory region itself, from being able to access the realm management data which could otherwise allow software processes to circumvent the security protections provided by the realm scheme.

Hence, the clean command 224 may specify, as one of its parameters, a privacy indication specifying whether this is a normal clean command or a private clean command. Alternatively two entirely separate commands could be provided for these purposes. When the clean command is a normal clean command, this triggers the transition to the Valid state 222 as discussed above. However, when the clean command is a private clean command 224, this triggers a transition to the RMUClean state 226, in which the memory region is designated as an RMU-private memory region. In some examples all types RMU data could be stored within a single type of RMU-private memory region corresponding to the RMUClean state.

However, robustness can be improved by designating multiple types of RMU-private memory region, each corresponding to a particular form of realm management data. For example, in FIGS. 21 and 22, a number of RMURegistered states 228 are defined which each correspond to RMU private regions which are designated for a particular purpose. In this example, the RMURegistered states 228 include RMURegisteredRDT (for storing a RDTG of a realm descriptor tree), RMURegisteredRD (for storing a realm descriptor), RMURegisteredREC (for storing realm execution context data) and RMURegisteredMDT (for storing paging metadata used during export/import operations as discussed above). Different forms of registration commands 230 may be executed by the RMU for a memory region in the RMUClean state, to transition the memory region to a corresponding one of the RMURegistered states 228. A command for storing data to the an RMU-private memory region which does not correspond to the specified purpose (RDT, RD, REC or MDT) may be rejected. Hence, in a first lifecycle state of the RMURegistered states, a first type of RMU command for storing a first type of realm management data may be allowed, and in a second lifecycle state a second type of RMU command for storing a second type of realm management data may be allowed, with the first RMU command being rejected when the targeted memory region is in the second lifecycle state and the second RMU command being rejected when the targeted memory region is in the first lifecycle state. This can enable further security by avoiding a malicious parent realm for example attempting to store realm descriptor entries to a realm execution context region or vice versa in order to attempt to disrupt the operation of the child realm. From each of the RMU register states 228, a corresponding form of release command 232 may return the corresponding memory region to the Invalid state 220. A further clean command may trigger scrubbing of data from a previously defined RMU-private region before the region can be reallocated for general purpose data.

Hence, in summary, at least one RMU-private memory region may be defined which is still owned by a given owner realm, but which has an attribute specified in the ownership table which means that it is reserved for exclusive access by the RMU. In this example the attribute which control the RMU-private status is the lifecycle state specified in the corresponding entry in the ownership table, but it could also be identified in other ways. The MMU may prevent access to a given memory region by one or more software processes when the given memory region is specified as the RMU private memory region by the at least one status attribute. Hence any software-triggered access which is not triggered by the RMU itself may be rejected when it targets an RMU-private memory region. This includes preventing access to an RMU-private memory region by the owner realm itself.

One may question why it is useful to define an owner realm for an RMU-private memory region if the owner realm cannot even access the data in the memory region. For example, an alternative approach for enforcing access to data by the RMU only would be to define a special realm for the RMU, and to allocate the pages of the memory address space for storing the data to be kept private to that special RMU owner realm. However, the inventors recognized that when invalidating realms, there may be a requirement to invalidate all the control data associated with that realm, and if this control data was associated with special RMU owner realm rather than the invalidated realm, this can make scrubbing of the invalidated realm's data more complex.

In contrast, by using the RMU-private attribute, the memory regions which store the control data for a given realm are still owned by that realm, even though the owner cannot access it, which means that it is simpler to identify which memory regions need to be invalidated when that owner realm is cancelled. When a given realm is invalidated, the parent realm may simply perform a sequence of reclaim operations (e.g. by executing a reclaim command which is then acted upon by the RMU) which triggers the memory regions which were owned by the specified invalidated realm (or its descendants) to be invalidated, and made inaccessible, and returned to ownership of the parent realm which triggered the reclaim command. The reclaim operation may not only affect the pages accessible to the invalidated realm but also include the RMU-private memory regions owned by the invalidated realm.

Another advantage of storing the control data for a realm in RMU-private memory regions owned by that realm is when performing export operations. In order to reduce the memory footprint of a Realm to zero, during an export operation, the management structures associated with that Realm may be exported in addition to the normal memory. Requiring that those structures are owned by the Realm simplifies the management of this export operation.

In general any kind of realm management data could be stored in RMU-private regions, but in particular the realm management data may include any of the following: a realm descriptor defining properties of a given realm, a realm descriptor tree entry identifying a memory region storing the realm descriptor for a given realm or a further realm descriptor tree entry, realm execution context data which indicates architectural state associated with at least one thread of execution within a given realm, and temporary working data used at an intermediate point of a predetermined operation associated with a given realm.

Although generally the RMU private regions could be used for storing the specific realm control data associated with a given realm, it could also be used in order to increase security around certain other operations which are performed once a realm is active. For example, when performing the paging export or import operations discussed above where data is encrypted or decrypted, and the checks using the meta data are performed to check that the data is still valid when the data is imported again, such operations may take many cycles and such long running operations are more likely to be interrupted partway through. To avoid needing to start the operation again from the beginning, it can be desirable to allow the meta data or other temporary working data associated with such long running operations to be retained within cache/memory even when interrupted, without making such data accessible to other processes (including the owner realm itself). By temporarily designating regions of the memory system as RMU-private regions this temporary working data can be protected. Hence, as shown in FIG. 21 the page states can also include RMUExporting and RMUImporting states which can be used when this temporary working data is stored to a memory region, and when one of these states is selected then only the RMU can access that data.

Other examples of operations which may benefit from temporarily designating a corresponding memory region as RMU private can include: generation or verification of encrypted or decrypted data during the transfer of data between at least one memory region owned by the given realm and at least one memory region owned by a realm other than the given realm; a transfer of ownership of a memory region to another realm; and a destructive reclaim operation performed to make data stored in an invalidated memory region inaccessible. For example, the reclaim operation for scrubbing all the contents of a given page of the address space may be interrupted partway through and so to ensure that other processes cannot access that page until the scrubbing is complete, the page could temporarily be designated as RMU-private. In general any long latency operation performed by the RMU could benefit from having its temporary working data protected by converting the lifecycle state of some memory regions to an RMU-private state before starting the long running operation and then converting it back again when the long running operation is complete.

When a region is designated as RMU private it is reserved for access by the RMU 20 used to perform realm management operations. The realm management operations may include at least one of: creating a new realm; updating properties of an existing realm; invalidating a realm; allocating memory regions for ownership by a given realm; changing the owner realm for a given memory region; changing a state of a given memory region; updating access control information for controlling access to a given memory region in response to a command triggered by the owner realm for the given memory region; managing transitions between realms during processing of the one or more software processes; managing transfer of data associated with a given realm between a memory region owned by the given realm and a memory region owned by a different realm to the given realm; and encryption or decryption of data associated with a given realm. The RMU could be a hardware unit to perform at least a portion of the realm management operations, or could comprise the processing circuitry 32 executing realm management software to perform at least a portion of the realm management operations, or could be a combination of both.

Figure 23:
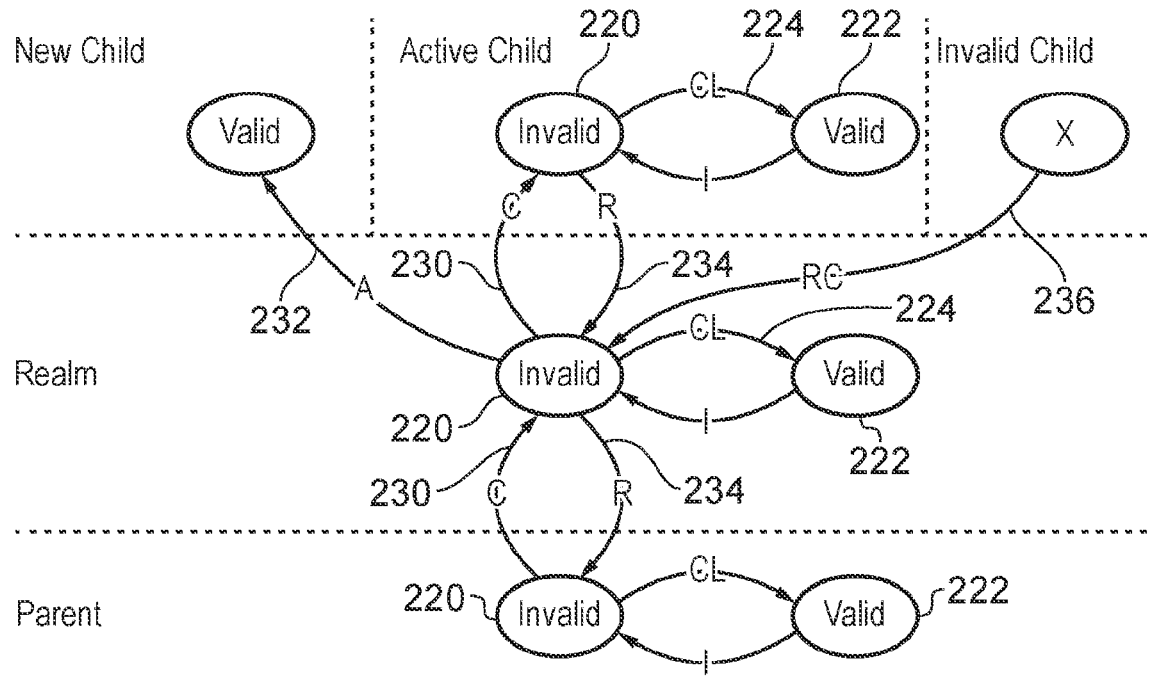
FIG. 23 illustrates how ownership of a given memory region can pass between a parent realm and its child realm.

FIG. 22 shows the state transitions which can be triggered by a given realm to clean a given page so it can be validly accessed, or invalidate the corresponding page. FIG. 23 expands this to show further commands which can be used to transfer ownership of a given page from one realm to another. Execution of a region claim command 230 by a parent realm enables the corresponding memory region to be transferred to a specified child realm if that memory region is currently in an Invalid state 220 and is owned by the parent realm. The region claim command 230 is rejected when the target memory region is owned by any realm other than the parent realm of the given child realm, or if the memory region is Valid or in one of the RMU-private lifecycle states 226, 228. This prevents the parent realm arbitrarily assigning ownership of a page which is does not itself have access to or which is in use by the RMU 20. Once the page has been assigned to the child realm, then that child realm can perform the clean command in order to transition to the valid state 222 in the same way as shown in FIG. 22. For conciseness the use of RMU-private regions is not shown in FIG. 23, but within any given realm a private clean command could alternatively transition the memory region to the RMU clean state 226 as discussed before.

A granule claim command 230 is used to transfer ownership to a child realm which has already been established. In addition, a parent realm can execute a granule add command 232 which triggers the RMU 20 to assign ownership to a new child realm in a New state so that the parent realm can write data to the region assigned to the child. For example this can be used for installing the program code of the new child realm so that the child realm can executed for the first time. Hence the add command 232 differs from the claim command 230 in terms of the lifecycle state in which the corresponding memory region is allocated to the child realm. The add command 232 may be allowed only when the child realm is in the New state 206 shown in FIG. 18. A child realm can release ownership of a given memory region back to its parent by executing a granule release command 234, which triggers the RMU to update the corresponding entry of the ownership table 128 as well as updating properties such as the resource count in the realm descriptor of the child realm etc. The granule release command 234 may be rejected if the specified memory region is not owned by the current realm which issued the command, or if the region is in a state other than Invalid (ensuring destructive cleaning of the data is required before it can be returned to ownership by the parent realm).

One advantage of using the hierarchical realm structure discussed above, where parent realms initialize child realms, is that this greatly simplifies invalidation of a realm and its descendants. It is relatively common that if a given virtual machine realm is to be invalidated, then it may also be desirable to invalidate realms for any applications running underneath that virtual machine. However, there may be a significant amount of program code, data and other control information associated with each of the processes to be invalidated. It may be desirable to ensure that such invalidations occur atomically, so that it is not possible to carry on accessing data associated with the invalidated realms when only part of the data scrubbing has been carried out. If each realm was established entirely independently of other realms, without the realm hierarchy as discussed above, this could make such atomic invalidations difficult as it may be necessary to provide a number of separate commands to separately invalidate each realm identified by a corresponding realm ID.

In contrast, by providing a realm hierarchy in which the RMU manages the realms such that each realm other than a root realm is a child realm initialized in response to a command triggered by a parent realm, then when a command requesting invalidation of a target realm is received, the RMU 20 can make the target realm and any descendant realm of the target realm inaccessible to the processing circuitry, with a more efficient operation.

In particular, in response to invalidation of the target realm, the RMU may update realm management data (e.g. the realm descriptor) associated with the target realm to indicate that the target realm is invalid, but need not update any realm management data associated with any descendant realm of the target realm. The realm management data associated with the descendant realm can remain unchanged. This is because simply invalidating the target realm may make any descendant realms effectively inaccessible even though the realm management data has not changed, because access to a given realm is controlled through its parent and so if the parent realm is invalidated then this means it is also not possible to access the parent realm's descendants. As each of the realms is entered using a realm entry instruction (ERET instruction discussed below) which uses the local RID defined by the parent realm to identify its particular child, and this is used to step through the realm descriptors which are stored in memory regions owned by the parent realm of the given child realm, then no process other than the parent realm can trigger the RMU to access the child realm's realm management data. Hence, if the parent realm is invalidated then the RMU cannot access the realm management data of the given child realm, ensuring that the given child realm becomes inaccessible.

After a realm has been invalidated, the parent realm of that realm may trigger the RMU to perform a reclaim operation for reclaiming each memory region owned by the invalidated target realm. For example as shown in FIG. 23, a reclaim command 236 for a memory region owned by a child realm may trigger a return of the memory region to the Invalid state 220 and also transfer ownership of the memory region back to the parent realm. However this reclaim operation can be performed in the background of ongoing processing of other realms and need not be performed instantly in order to allow any descendant realms of the invalidated realm to be made inaccessible. A single action to change a realm state of a given realm from Active to Invalid as shown in FIG. 18 is enough to make sure that all the data associated with any descendant realm of that invalidated realm is also inaccessible. Since any parent realm can only assign pages which it owns to its children, and the child can only assign pages which it owns to a grandchild realm, this also means that tracking which pages need to be invalidated and reclaimed upon invalidation of a given realm is relatively straightforward, since the protected address range defined in the realm descriptor of the invalidated realm (see FIG. 16) can be used to identify which pages to reclaim, since any further descendant realms of the invalidated realms will also own pages within that range.

Hence, in summary using a realm hierarchy greatly simplifies management of realms and invalidations. On such invalidations, as well as overwriting data in memory, the invalidation may also trigger invalidation of cached realm management data for the target realm and any descendant realm of the target realm held not only in the processing element 8 which triggered the invalidation, but also in other processing elements, such as another CPU or GPU. Hence there may be a broadcast of the invalidation to other processing elements, to ensure that other processing elements do not continue to have access the invalidated realms. When triggering such invalidations, it can be useful for the cached realm management data to be associated with a global realm identifier which identifies the corresponding realm uniquely, and to form the global realm identifier as discussed above so that the global RID of a given child realm shares a common prefix portion with a global RID of its parent realm. This enables bit masking or other similar operations to be used to compare quickly whether a given realm is a descendant of a specified realm ID. If a given realm is made inaccessible through invalidation of an ancestor realm, then an attempt to enter the specified target realm is not possible (as there is no parent realm to execute an ERET instruction for that realm), but even in other implementations which use a different realm entry mechanism, a realm entry could fail and trigger a fault condition if the realm descriptor of the descendant realm is no longer locatable.

FIG. 24 shows an example of checks performed by the MMU 26 and RMU 20 for determining whether a given memory access is permitted. The MMU 26 supports two stages of address translation, stage 1 translating a virtual address (VA) to an intermediate physical address (IPA) under control of stage 1 page tables 120-1 which are set by a given guest operating system, and a stage 2 address translation translating the intermediate physical address provided by the stage 1 translation into a physical address (PA) used to access memory 16 based on stage 2 page tables 120-2 which are set by the hypervisor 38. The hypervisor may define multiple sets of stage 2 page tables for different virtual machines, and a virtual machine ID (VMID) 250 provided with the memory access request may identify which particular stage 2 page tables to use. Similarly, the operating system may define multiple sets of stage 1 page tables for different applications and an address space identifier (ASID) 252 may be used to identify which stage 1 page tables to use. The VMID and ASID 250, 252 may collectively be referred to as a translation context identifier 254 which identifies a current translation context associated with the memory access request. The memory access request also specifies various attributes 256, such as attributes indicating whether the transaction is a read (R) or write (W) request, or indicating an exception level (X) associated with the process which issued the memory access request.

On receipt of a memory access, the MMU 26 may determine based on the information from the stage 1 page tables whether the transaction attributes are valid. For example the stage 1 page tables could specify that only read transactions may be allowed for certain addresses, or could permit both read and write accesses to a given address (some implementations may also permit write only regions of the address space to be defined). Also, the attributes in the stage 1 page tables could limit access to processes operating at a given exception level or higher. If the transaction attributes are valid and the access is permitted by the stage 1 page tables, then the MMU may return the corresponding intermediate physical address (IPA). The IPA together with the VMID 250 then indexes into stage 2 page tables which again validate the attributes of the transaction and, if valid, return a physical address. Note that not all transactions need to undergo two stages of address translation. For example if the input memory transaction was issued at EL3 or EL2, or at EL1 or EL0 in the secure domain, then the output of the stage 1 MMU may be treated as a physical address and the stage 2 MMU could be bypassed.

Having obtained the physical address, the physical address can then be looked up in the RMU tables 128 (Realm Granule Table) to determine whether the realm protections enforced by the MMU allow the memory access to proceed. The realm checks are discussed in more detail in FIG. 26 below. If the RMU checks at stage 3 succeed, then the validated physical address is output and the memory access is allowed to proceed. If any of the checks at stage 1 or stage 2 address translations or the RMU enforced realm protection provided at stage 3 fails, then the memory access is rejected. Hence the protections provided by the realm management unit can be seen as an additional layer of checks to be performed, in addition to any existing address translation checks based on page tables 120. The checks shown in FIG. 24 can be relatively slow to perform as there may be a number of tables in memory which need to be accessed and compared with parameters of the memory access request or the current translation context or realm from which the access was made. While it would be possible to perform these checks on every memory access, it can be faster to cache data within the TLBs 100 when the checks have been performed successfully for a given memory access request so that the next time a similar memory access request is issued then it can be allowed without repeating all the checks again. Hence, it may be desirable to perform these permission checks only when there is a miss in the TLB 100, and not for a hit.

FIG. 25 shows an example of a TLB structure 100 for caching data relating to already validated memory accesses. While FIG. 25 shows a single TLB, it will be appreciated that some systems may include multiple levels of TLB in a cache hierarchy, with a level 1 TLB storing a smaller subset of translation entries for faster access, and level 2 or further level TLBs storing a larger set of translation entries which can be accessed if there is a miss in the level 1 TLB. The TLB 100 (or "translation cache") has a number of entries 260, each entry specifying address translation data for a corresponding memory region. Each entry 260 includes a virtually addressed tag 262 corresponding to the virtual address for which the data provides the corresponding physical address 264. In this example, the TLB is a combined stage 1 and stage 2 TLB so that the virtual address can be translated directly to a physical address using the TLB without having to go via an intermediate physical address (although corresponding stage 1 and stage 2 translations would be performed on a TLB miss in order to locate the correct physical address, the TLB does not need to store the intervening IPA and can map the VA direct to a OA). Other examples could use split stage 1 (S1) and stage 2 (S2) TLBs, in which case the VA-PA pair 262, 264 can be replaced with a VA-IPA pair or IPA-PA pair. The TLB entries 260 are also tagged with the translation context identifier 254 (formed of the ASID 252 and VMID 250). Although this example provides two separate translation context identifiers, in other examples a single unified translation context identifier could be used, or in the case of split S1/S2 TLBs, the S1 TLB could use the ASID and the S2 TLB could use the VMID. The translation context identifier allows different operating systems or applications which specify the same virtual address to have their accesses mapped onto different entries of the TLB 100 which provide different physical addresses.

A hit in the TLB 100 requires not only the tag 262 to match a corresponding portion of the address 258 specified for the memory access request, but also the translation context identifiers stored in the same entry should match the current translation context from which the memory access was issued. It may be expected that the comparison of the tag 262 and the translation context identifiers 254 may be enough to locate the correct physical address 264 for a given memory access. However, if these are the only comparisons performed in the lookup, there is a potential security vulnerability if memory accesses hitting in the TLB are accepted without a further check of the realm management unit tables 128. This is because it is possible for a new process to be created which has the same VMID 250 or ASID 252 as a previously executed process, to trick the MMU into accepting a memory access which actually comes from a different realm to the one that was previously accepted for accessing a given memory region.

To address this problem, the TLB 100 may specify within each TLB entry 260 the global RID 270 of the owner realm which owns the corresponding memory region, as well as visibility attributes 272 set by the owner realm for controlling which other realms are allowed to access the corresponding memory region. When a given lookup of the translation cache 100 is performed in response to a memory access to a given target memory region issued from a current translation context and a current realm, if there is a miss in the translation cache 100, TLB control circuitry 280 may trigger the table walk unit 102 to access the relevant page tables 120 and RMU tables 128 in order to check whether the access is allowed. If either the page tables or the RMU tables 128 exclude the current combination of the translation context, exception level and realm from accessing the corresponding memory region, then no data is allocated to the translation cache in response to that memory access. In particular, when the lookup misses and the current realm is excluded from accessing the target memory region by an owner realm of the target memory region, then allocation of address translation data to the translation cache is prevented. Hence, an entry is allocated to the TLB 100 when the corresponding memory access passes the checks of both the MMU page tables 120 and the RMU tables 128.

Subsequently, when looking up the translation cache to check whether it already includes an entry 260 which provides the address translation for a given address, the TLB control circuitry 280 determines whether the memory access matches a given entry of the translation cache 100 in dependence upon a first comparison between the translation context identifier 254 specified in the corresponding entry 260 and the translation context identifier 254 for the current translation context which was received along with the memory access request, and also a second comparison between the global RID 270 specified by that entry 260 and a current global RID associated with the current realm which issued the memory access request. By providing an additional check that the TLB entry is still being accessed from a realm previously verified as allowed to access the memory region, this ensures that even if a malicious supervising process regenerates another process with the same ASID 252 or VMID 250 as a previously existing process which was permitted to access the data by the owner realm, since the global realm identifiers 270 cannot be reallocated to other processors without undergoing the realm scrubbing command 216 as discussed with respect to FIG. 18, this means that the current realm's global RID can be trusted as valid and cannot be "faked" as is possible for the ASID or VMID. Therefore, if the global RID of the current realm still satisfies the permissions indicated by the owner GRID 270 and the visibility attributes 272, then this indicates that the previously performed realm table checks are still valid.

If the second comparison of the realm identifier detects a mismatch, then the access request is considered to miss in the TLB even if the tag comparison and translation context comparison match, as it indicates there has been a change in the mapping between the translation context IDs 254 and the realm IDs 270 since the entry was allocated. This does not necessarily imply that the access will be rejected, as another walk of the page tables and RMU tables may be triggered by the table walk unit 102, and if the realm checks are successful this may lead to allocation of a different entry 260 in the TLB 100 and servicing of the memory access based on the information from the newly allocated entry.

FIG. 26 is a flow diagram illustrating a method of determining whether a given memory access is permitted by the MMU 26. At step 300 a memory access request is received and this is looked up in the TLB 100. The memory access request specifies at least a virtual address to be accessed, one or more translation context identifiers indicating a current translation context and a global realm identifier identifying the current realm. For example the global RID may be read from a state register of the processing element 8 which may be written with the global RID of the current realm on entry into the realm.

In response to the memory access request, the TLB control circuitry 280 performs a lookup of the TLB. The lookup accesses at least some entries of the TLB. Some approaches may use a fully associative cache structure, and in this case all the entries of at least a level 1 TLB may be searched and compared with the parameters of the current request in order to identify whether there is a hit or a miss. Other approaches may use a set-associative cache allocation policy and in this case only a subset of the entries of a given level of TLB may need to be looked up, indexed using the target address of the memory access. For each of the accessed set of entries, the TLB control circuitry 280 performs a number of comparisons (either in parallel or sequentially), including:

a tag comparison 302 for comparing whether the address of the memory access request matches the tag 262 stored in the accessed entry;

a first (context) comparison 304 for comparing translation context identifiers stored in the accessed entry with the translation context identifier of the memory access request; and a second (realm) comparison 306 for comparing the global RID of the memory access request against the owner RID 270 and the visibility attributes 272 for each of the accessed set of entries.

At step 308 the control circuitry 280 determines whether there is an entry in the TLB which returned matches for all of the comparisons 302, 304, 306, and if so then a hit is identified and at step 310 the physical address 264 specified in the matching entry is returned and the memory access is allowed to proceed based on that physical address. In the case of a hit, there is no need to perform any lookup of the page tables or the RMU tables (an ownership table lookup for the memory access can be omitted). The protections provided by the page tables and RMU tables are invoked only on a miss.

It there is no entry which matches all three of the comparisons 302, 304, 306, then a miss is detected. If a further TLB level is provided, a corresponding lookup to steps 300-308 can be performed in a level 2 or subsequent level TLB. If the lookup misses in the last level TLB, then a walk of the various page tables and RMU tables is performed. Hence, at step 311 a stage 1 page table walk is performed and at step 312 it is determined whether a stage 1 page table fault has occurred (e.g. because there was no address mapping defined for the specified virtual address or because the current parameters 256 of the access request violate the access permission specified for the targeted virtual address). If a stage 1 fault occurs then at step 314 the memory access is rejected and allocation of address mapping data to the TLB 100 in response the memory access is prevented.

On the other hand, if the access request passed the stage 1 page table checks, then at step 315 a stage 2 page table walk is triggered to obtain mapping data for the intermediate physical address returned by the stage 1 process, and at step 316 it is determined whether a stage 2 page table fault has occurred (again, because the address mapping was not defined or because the access is not permitted by the stage 2 access permissions). If a stage 2 fault occurs then again at step 314 the access request is rejected.

If no stage 2 fault occurs then at step 318 the RMU table lookup is triggered based on the physical address returned by stage 2 and at step 320 it is determined if a realm fault has been detected. A realm fault may be triggered if any of the following events occurs:

- If the lifecycle state for the corresponding memory region is indicated as Invalid in the realm ownership table 128. This ensures that a page of the memory address space which has not undergone the cleaning operation 224 shown in FIG. 22 cannot be accessed, to protect any data previously stored by another realm in that memory region from access by a different realm.
- The current realm is not permitted by the owner realm for the corresponding memory region to access that memory region. There could be a number of reasons why a given realm may not be allowed to access a given memory region. If the owner realm has specified that the memory region is visible only to the owner itself and its descendants, then another realm may not be allowed to access that region. Also if the current realm is the parent realm of the owner realm and the owner realm has not defined the parent visibility attributes to permit the parent to access the region, then the memory access may be rejected. Also, the owner realm itself may be prevented from accessing a memory region if that memory region is currently set as RMU-private as discussed above. At the RMU checking stage, a descendant realm of the owner realm may be permitted to access the memory region (as long as the memory region is not an RMU-private region). Hence, this check enforces the access permissions set by the owner realm.
- If the virtual address or intermediate physical address from which the physical address was mapped for the current memory access by the S1/S2 translations does not match the mapped address specified in the ownership table 128 for the corresponding memory region as shown in FIG. 19, then the memory access is rejected. This protects against situations where a malicious parent realm could allocate ownership of a given memory region to a child realm, but then change the translation mappings in the page tables 120 so that a subsequent memory access triggered by the child realm using the same virtual address it previously used to refer to a page owned by that child realm now maps to a different physical address which is not actually owned by the child realm itself. By providing a reverse mapping in the ownership table from the physical address of the corresponding memory region back to the mapped address used to generate that physical address at the time the ownership was claimed, this allows security breaches caused by changes of address mappings to be detected so that the memory access will fail.

It will be appreciated that other types of checks could also be performed. If the realm checks are successful, at step 322 the physical address is returned, the memory access is allowed to proceed using the physical address, and a new entry is allocated to the TLB indicating the physical address obtained from the page tables 120 and the owner realm and visibility attributes obtained from the ownership table 128 corresponding to the requested virtual address and translation context.

Hence, in summary by requiring a second comparison (comparing the current realm's GRID with a GRID provided in an entry of the translation cache) to match in order to allow a hit to be detected in the translation cache lookup, this ensures that even if there is a change in the translation context identifier associated with a given realm after a TLB entry has been allocated, this cannot be used to circumvent the realm protections even if the realm checks are not repeated again on a TLB hit. This enables performance to be improved, as by making it unnecessary to repeat the realm checks on every memory access (which would be relatively processor intensive given the number of checks to be performed). This allows most memory accesses to be performed faster, since hits are much more common than misses. A mismatch between the memory access and a given entry of the translation cache is detected when the second comparison identifies a mismatch between the realm identifier specified in that entry and the realm identifier of the current realm. This will then trigger a miss and this can trigger page table and RMU table walks in order to find the correct access control data (with the realm checks repeated in case the VMID/ASID has changed).

This approach is secure because the RMU may prevent initialisation of a new realm having a same realm identifier as a previously active realm until after a scrubbing process invalidating information associated with the previously active realm has been performed. This scrubbing process may include invalidation of not only the realm management data and any data stored in memory associated with the invalidated realm, but may also include invalidation of at least one entry of the translation cache for which the second comparison identifies a match between the realm identifier of that entry and the realm identifier of the invalidated realm. Hence, this means that it is not possible to regenerate a different process using the same realm identifier as a previous process, unless all the data in the translation cache 100 associated with that realm has been invalidated. Hence, a matching realm identifier in the TLB can be trusted to indicate that the previously performed realm checks are still valid. In particular, each realm may be associated with a life cycle state as discussed above and this may be used to enforce that the scrubbing process is performed. Address translation data may only be able to be allocated to the translation cache when the current life cycle state for the current realm is Active. A command for initialising a new realm with a given realm identifier may be rejected in any state other than a Clean state and transitions from the Active state to the Clean state may require a predetermined sequence of command to be executed which includes at least one command for triggering the scrubbing process.

Misses in the translation cache may trigger an ownership table lookup, which accesses an ownership table which specifies, for each of a number of memory regions, the owner realm for the corresponding memory region and access constraints set by the owner realm for controlling which other realms are allowed to access the memory region. By including the additional second comparison for determining a TLB hit, this enables the ownership table lookup to be omitted on lookup hits. The ownership table lookup is performed on a TLB miss.

While FIG. 25 shows an approach where the GRID of the owner realm is stored in each TLB entry, there could also be other ways of representing information which enables a determination of whether the GRID of the current realm is suitable for accessing the corresponding memory region. For example, a list of the GRIDs of authorized realms could be maintained in the TLB, or a TLB could maintain a separate list of Active Realms with the TLB entry containing an index into the Active realm list, instead of the full GRID, which could reduce the TLB entry size compared to storing the list in the TLB entry. However, simply representing the owner realm's GRID can be a more efficient way to identify the authorized realms, as it makes the processes of allocating and checking TLB entries less complex by avoiding an additional level of indirection in consulting the Active realm list and also avoids needing to synchronise changes in the active realm list between TLBs.

Note that a match in the second (GRID) comparison performed on looking up the TLB does not necessarily require the current realm identifier to be exactly the same as the global realm identifier 270 specified in both the corresponding TLB entry 260—some forms of the second comparison may use partial matching. Some implementations could only permit the owner realm to access its owned pages and so in this case an exact match between the current GRID and owner GRID 270 may be required. However, as it may be useful for data to be shared between realms, visibility attributes 272 can also be provided to allow the owner realm to define what access is permitted by other realms.

Therefore, by caching the visibility attributes 272 in the TLB 100 as well as the owner realms global RID 270, this enables the TLB control circuitry 280 to vary an extent of matching required for the second comparison to determine a match based on the visibility attributes. For example, the visibility attribute 272 could control which portions of the GRIDs should be masked when performing a comparison, so that it does not matter if those masked bits mismatch as they do not affect the overall matching of the comparison. For example, the control circuitry could in some cases determine a mismatch when the current realm indicates a realm other than the owner realm or a descendant realm of the owner realm. The descendant realms can easily be identified using the global RID format discussed above since they will have a prefix or suffix portion which matches the owner realm's GRID.

For at least one value of the visibility attributes, the control circuitry can determine a mismatch when the current realm is a realm other than the owner realm, a descendant realm of the owner realm or the parent realm of the owner realm (e.g. when the parent visibility is set as discussed above). In some cases, at least one value of the visibility attribute may allow the control circuitry 280 to determine a match for the second comparison regardless of which realm is the current realm (e.g. if the global visibility bit is set). Hence, while in general the second comparison based on the realm identifiers does need to be passed, exactly what requirements are to be satisfied by the current realm's GRID may dependent on the visibility bits 272. By constructing realm identifiers of a child realm that include a bit portion which corresponds to the realm identifier of a parent realm which initialised the child realm, this enables such partial matches to be performed efficiently. In implementations which support variable allocations of different variable length bit portions of the global realm identifier to different generations of realms, the TLB entries 260 may also specify some information which identifies the positions of the boundaries between the different local RIDs which are concatenated to form the GRID (in order to allow a parent realm to be distinguished from a grandparent or earlier ancestor realm). This can enable the TLB control circuitry 280 to determine which parts of the realm identifier are to be masked. For other implementations, this may not be necessary (e.g. if any ancestor is permitted to access a memory region for which the owner realm has given visibility to its parent realm). Also, some implementations may have a fixed mapping with each global realm identifier having a fixed number of bits (such as 32-bits) and in this case it may not be necessary to provide any additional boundary defining data.

FIG. 27 is a Venn diagram showing an example of architectural state accessible to the processing element 8 at different exception levels. FIG. 27 shows an example based on the ARM® architecture provided by ARM® Limited of Cambridge, UK, but other implementations may be based on other architectures, which may have different state associated with a given process. Also FIG. 27 only shows a subset of the state accessible at each exception level, used as an example for conciseness, but it will be appreciated that other registers may also be accessible which are not shown in FIG. 27.

When operating at exception level EL0 the processing element 8 has access to a subset of architectural state labelled 350, e.g. including the following:

General purpose registers, including integer registers, floating-point registers and/or vector registers, for storing general purpose data values during data processing operations.

A program counter (PC) register, which stores a program instruction address representing the current point of execution within the program being executed.

A saved processor state register (SPSR_EL0), which is used for storing information about the current state of a processor when an exception is taken from a process executed at exception level EL0. The SPSR may include information about the current processor state, e.g. a value PSTATE which represents the current processor mode at the time the exception occurred. The processor mode could specify the exception level as well as other information such as which instruction set was being executed. Also the SPSR register may include a realm entry flag R which is used to control realm entry as will be discussed below.

An exception link register ELR_EL0, which is used to store the current program counter value when an exception is taken, so that the ELR provides the return address to which processing should branch once the exception has been handled.

A realm identifier register RID_EL0 used to store the local RID of a child realm to which a realm entry is made (even though the exception level EL0 is the lowest, least privileged, exception level, with the ability to create sub-realms as discussed below, a realm may still be entered from a process operating at the exception level EL0).

An exception status register (ESR) used by EL0 to store information about an exception that occurred (e.g. to allow selection of an appropriate exception handler).

When the processor 8 is operating at exception level EL1, it has access to a subset of state 352 which includes all of the state 350 which was accessible at exception level EL0 but also includes additional architectural state. For example at EL1 there are banked versions of the SPSR, ELR, ESR and RID registers which are used by the process operating at EL1 for corresponding purposes to the EL0 versions of these registers. The SPSR_EL1 register may in addition to the PSTATE and R values also include an intermediate realm flag Int which is used during nested realm entry and exit as will be discussed below. Although FIG. 27 shows an example where the intermediate realm flag is stored in the SPSR, this is not essential and other examples could store the flag in a different register. Another example of state which may be accessible at EL1 but is inaccessible at EL0 may be a translation table base register TTBR_EL1 which provides an address indicating the base address of the stage one page tables 120-1 used by the MMU during page table walks.

Similarly, when executing instructions at exception level EL2, the processing element 8 has access to a subset of state 354 which includes all the states 352 accessible at EL1, but also includes additional state, such as further banked versions of the SPSR, ELR and RID registers for EL2 and a virtual translation table base register VTTBR_EL2 which provides the base address of the stage two translation tables 120-2.

Finally, when operating at EL3 the processing element has access to a subset of state 356 which includes all of the subset 354 accessible at EL2 but also may include other state such as a further realm identifier register RID_EL3 used by processes operating at exception level EL3 to enter realms, and further exception handling registers ELR, SPSR, ESR similar to the corresponding registers used for lower exception levels. Again, FIG. 27 is merely an example and other states may also be included in the relevant subsets accessible to particular exception levels.

Hence, each exception level is associated with a corresponding group of registers which is accessible to the processing circuitry when processing a software process at that exception level. For a given exception level other than the least privileged exception level, the group of registers accessible at the given exception level includes the group of registers accessible at a less privileged exception level than the given exception level. This hierarchy of state which is accessible to particular levels can be exploited to reduce the overhead associated with state saving and restoring upon realm entry and exit as will be discussed below.

On entry and exit to or from a realm, the processing element 8 and/or RMU 20 may need to perform a number of operations for ensuring secure handling of the realm entry or exit. For example, on entry to a realm a number of checks may need to be performed to check that the target realm is in the correct life cycle state (to avoid security measures being circumvented by attempting to enter a non-existent realm or a realm which has not undergone scrubbing of data from its owned pages, for example). Also, on exiting a realm, it may be desirable to mask the architectural state stored in registers of the processing element so that a higher privilege level process cannot access the state data used by the realm at a lower privilege level (which would otherwise enable the security measures provided by the realm protection to be circumvented). One approach for handling realm entry and exit could be to provide a dedicated realm entry or a realm exit instruction which triggers the RMU 20 to perform the relevant operations for entering or exiting a realm. However, this may require significant modification of existing software in order to use the new instruction.

In the technique described below, the realm mechanism re-uses the mechanisms already provided for exception entry and return in order to enter and exit from realms. This reduces the amount of software modification required to support realm entry and exit, and simplifies the architecture and hardware. This is particularly useful because often the realm boundaries may correspond to exception level boundaries anyway, and even if a new instruction was provided to control entry and exit, a behavior for handling exceptions would still be required, so overall it can be less costly to extend the exception mechanisms to also control entry and exit.

Hence, an exception return (ERET) instruction, which would normally return processing from an exception processed in a current realm to another process also processed in the current realm (where the other process could be handled at the same exception level or a less privileged exception level than the exception), may be re-used to trigger realm entry from a current realm to a destination realm. In response to a first variant of the exception return instruction, the processing circuitry may switch processing from a current exception level to a less privileged exception level (without changing realm), while in response to a second variant of the exception return instruction, the processing circuitry may switch processing from a current realm to a destination realm, which could be operating at the same exception level or a lower (less privileged) exception level as the current realm. Using an exception return instruction to trigger realm entry can greatly simplify the architecture and hardware overhead as well as reducing software modification requirements to support use of the realms.

Another advantage of using an exception return instruction is that typically on returning from an exception, the processing circuitry may perform an atomic set of operations in response to an exception return instruction. The set of operations required on returning from an exception may be performed atomically so that these operations cannot be divided partway through, and so either the instruction fails and none of the atomic set of operations are performed or the instruction is successfully executed and all of the atomic set of operations are performed. For the second variant of the exception return instruction, the processing circuitry may similarly perform a second atomic set of operations, which may be different to the first atomic set of operations. The mechanisms already provided in a processor for ensuring that the exception return instruction completes atomically can be re-used for realm entry in order to avoid a situation where the realm entry may only have partially have been performed which could lead to security vulnerabilities. For example the second atomic set of operations could include making realm execution context states available, changing the current realm being executed, and controlling branching to a program counter address at which processing was previously being executed when the last time the same realm was executed.

The first and second variants of the exception return instruction may have the same instruction encoding. Hence, no modification of the exception return instruction itself is necessary in order to trigger the realm entry. This improves compatibility with legacy code. Whether a given exception return instruction is executed as the first variant or the second variant may depend on a control value it stored in a status register (e.g. first and second values of the control value may represent the first and second variants of the exception return instruction respectively). Hence, the current architectural state at the time that the exception return instruction is executed controls whether it returns the processor to a lower privilege level in the same realm, or triggers entry into a new realm.

This approach enables realm entry to be controlled with less software modification, especially as the value in the status register could be set automatically by hardware in response to certain events implying that a realm switch is likely (in addition to allowing voluntary setting of the control value in response to software instructions). For example, when an exception condition occurs which triggers an exit to a given realm, the processing circuitry could set the control value to the second value for the given realm so that a subsequent exception return instruction will automatically return processing to the realm in which the exception occurred, even if the exception handler code for handling the exception is identical to previous legacy code which was not written with realms in mind. Alternatively, in some architectures it may be expected that, when exiting from a realm the control value in the status register will still contain the second value which was set before triggering a realm entry to that realm, and so no explicit setting of the control value in the status register may be required.

In one example, the control value in the status register may be the R flag in the SPSR register associated with the current exception level as discussed above. It can be useful to use the SPSR because this register would normally be used on exception return to provide the processor mode (including the exception level) and other information about how processing should continue upon return from the exception currently being processed. However, for a realm entry this information may instead be determined from the realm execution context (REC) and so the SPSR may not be needed. By re-using part of the SPSR for storing the R flag which controls whether an exception return instruction is treated as the first or second variant, this avoids the need to provide an extra register for storing this information. Hence, it can be useful to use a status register which, in response to the first variant of the ERET instruction, is used to determine return state information (such as the processing mode) for continuing exception at the less privileged exception level, but in response to the second variant of the exception return instruction, this return state information would be determined from memory instead so that there is no need to access the status register itself. In particular, the status register used for storing the control value may be a status register associated with the current exception level from which the exception return instruction is executed.

As shown in FIG. 27, at least one realm identifier register may be provided, and in response to the second variant of the exception return instruction the processing circuitry may identify the destination realm from a realm identifier stored in the realm identifier register. The realm identifier register may be banked, so that there are multiple realm identifier registers each associated with one of the exception levels, and in response to the second variant of the exception return instruction, the processing circuitry may identify the destination realm from the realm identifier stored in the realm identifier register associated with a current exception level. By using a realm identifier register to store the target realm identifier, there is no need to include this in the instruction encoding of the ERET instruction, which enables an existing format of ERET instruction to be used to trigger realm entry, reducing the amount of software modification required. The realm identifier in the realm identifier register may be a local realm identifier used by a parent realm to refer to its child realms, and so realm entry may be restricted to passing from a parent realm to a child realm, and it is not possible to go from a first realm to another realm which is not a direct child of the first realm. In response to the second variant of the exception return instruction, the processing circuitry may trigger a fault condition when a realm associated with the realm ID identified in the RID register is an invalid realm (a RID for which no realm descriptor has been defined or for which the realm descriptor defines a lifecycle state other than Active).

In response to the second variant of the exception return instruction the processing circuitry may restore architectural state associated with a thread to be processed in the destination realm from a realm execution context (REC) memory region specified for the exception return instruction. The state restoration can be performed immediately in response to the second variant of the exception return instruction (e.g. as part of the atomic set of operations), or could be performed later. For example the state restoration can be performed in a lazy manner so that the state required to commence processing in the destination realm could be restored right away (e.g. the program counter, processing mode information, etc.), but other state, such as general purpose registers, could be restored when required at a later time, or gradually in the background of ongoing processing of the new realm. Hence, the processing circuitry may commence processing of the destination realm before all the required architectural state has been restored from the REC memory region.

In response to the first variant of the exception return instruction the processing circuitry may branch to a program instruction address stored in a link register. For example this may be the ELR of FIG. 27 which corresponds to the current exception level at which the exception return instruction is executed. In contrast, for the second variant of the exception return instruction, the processing circuitry may branch to a program instruction address specified in the realm execution context (REC) memory region. Hence, as the link register would not be used for the second variant of the exception return instruction to directly identify any architectural state for the new realm, the link register can be re-used to instead provide the pointer to the REC memory region from which the new realm's architectural state is to be restored. This avoids the need to provide a further register in order for storing the REC pointer.

Hence, before executing an exception return instruction intended to cause a realm entry to a given realm, some additional instructions can be included in order to set the RID register to the realm identifier of the destination realm and to set the link register to store a pointer of a REC memory region associated with the destination realm. The REC pointer can be obtained by the parent realm from the realm descriptor of the destination realm.

In response to the second variant of the exception return instruction, a fault condition may be triggered by the processing circuitry when either the REC memory region is associated with an owner realm other than the destination realm or the REC memory region specified for the exception return instruction is invalid. The first check prevents a parent realm tricking a child realm into executing with processor state which it did not itself create, since only the memory regions owned by the child realm can store REC memory regions accessible on entering that realm (and as discussed above the REC memory regions will be set as RMU private). The second check of the validity of the REC memory region can be useful for ensuring that a REC memory region can be used only once to enter the realm and after that a subsequent attempt to enter the realm with the same REC data would be rejected. For example, each REC may have a life cycle state which may be either invalid or valid. In response to an exception occurring during processing of a given thread in a current realm, the architectural state of that thread may be saved to a corresponding REC memory region and that corresponding REC memory region may then transition from invalid to valid. In response to successful execution of the second variant of the exception return instruction, the REC memory region may then transition back from valid to invalid. This avoids a parent realm maliciously causing a child realm to behave incorrectly by specifying a pointer of an out of date REC memory region, a REC memory region associated with a different thread, or some other REC which is associated with a destination realm but is not the correct one that was used to store the architectural state upon a previous exit from the realm.

In a corresponding way, exit from a realm may re-use mechanisms provided for exception handling. Hence in response to an exception condition occurring during processing of a first realm which is unable to be handled by the first realm, the processing circuitry may trigger a realm exit to a parent realm that initialised the first realm. On exception occurrence/realm exit, some additional operations may be performed which would not be performed for an exception occurring which can be handled within the same realm. For example this may include masking or scrubbing of architectural state and triggering of state storage to the REC as will be discussed in more detail below.

However, in some cases an exception may occur which cannot be handled by the parent realm of the first realm in which the exception occurred. Hence in this case it may be necessary to switch to a further ancestor realm beyond the parent. Although it might be possible to provide the ability to directly switch from a given realm to an ancestor realm which is more than one generation older, this may increase the complexity of the state registers required for handling exception entry and return or realm exit and entry.

Instead, a nested realm exit may be performed when the exception condition is to be processed at a target exception level with a greater privilege level than a most privileged exception level at which the parent realm of the first realm is allowed to be processed. The nested realm exit may include two or more successive realm exits from child realm to parent realm, until a second realm is reached that is allowed to be processed at the target exception level of the exception that occurred. Hence, by stepping up the realm hierarchy one level at a time, this can simplify the architecture. At each successive realm exit there may be operations performed to save a subset of processor state to the REC associated with the corresponding realm.

When the exception has been handled, then in response to an exception return instruction of the second variant which is executed in the second realm following the nested realm exit, the processing circuitry may then trigger a nested realm entry to return to the first realm. This can be handled in different ways. In some examples the hardware may trigger the nested realm entry itself without needing any instructions to be executed at any intermediate realms encountered between the first realm and the second realm during the nested realm exit. Alternatively, the hardware can be simplified by providing a nested realm entry process which returns back to each successive realm encountered in the nested realm exit, one level at a time and executes a further ERET instruction of the second variant at each intermediate realm. In this case in order to ensure that an intermediate realm triggers a return to the child realm of the intermediate realm from which the realm exit to the intermediate realm was made during the nested realm exit, an exception status register could be set to indicate that a predetermined type of exception condition occurred in the child realm. For example, a new type of exception condition (e.g. "spurious realm exit") could be defined to handle this intermediate realm case. Hence, when reaching an intermediate realm the processor could then resume processing within the intermediate realm from a program instruction address corresponding to an exception handling routine for handling the predetermined type of exception condition. This exception handling routine could for example simply determine that the child realm exited for some unknown reason and could then choose to execute another exception return instruction of the second variant to return processing to the further child realm. By doing this at each intermediate realm eventually the original first realm at which the original exception occurred may resume processing.

During this nested realm entry and exit procedure, an intermediate realm flag within a status register can be used to flag which realms are intermediate realms, to either trigger the hardware-triggered immediate realm entry to the relevant child realm or to trigger the setting of the exception status information which will then trigger an exception handler or other code within the intermediate realm to return to the child realm. For example the intermediate realm flag could be the Int flag in the relevant SPSR as discussed in FIG. 27.

FIG. 28 is a flow diagram illustrating a method of handling realm entry or exception return. At step 400 an exception return (ERET) instruction is executed when the current exception level is ELx. ELx can be any of the exception levels supported by the processing circuitry. Although one might not expect an exception return to occur from the least privileged exception level EL0, the ability to create sub-realms as will be discussed below means that there could still be an ERET instruction executed from EL0 in order to trigger entry to the sub-realm also executed at EL0. Also, some types of exception may be able to be handled at the same exception level as the level at which the exception occurred, in which case exception returns could still occur from EL0.

At step 402 the processing element determines the current value of the realm flag R in the SPSR associated with exception level ELx. If the realm flag R is zero then this indicates a conventional exception return, without entering a different realm. At step 404 the processing element 8 determines the target exception level at which to operate following the exception return, based on the PSTATE value within SPSR_ELx and determines the program counter value to branch to from the link register ELR_ELx. The new target exception level and program counter values and any other return state associated with the return to processing following the exception are restored to the relevant architectural state registers associated with the target exception level (which would often be a lower exception level which is less privileged than exception level ELx, but could also be the same exception level ELx). Such return state operations are performed atomically. At step 406 processing then resumes at the target exception level, but staying within the same realm as the realm in which the ERET instruction was executed.

If at step 402 the realm flag R was set to 1, then this indicates realm entry, and so this triggers a second atomic set of operations different to the set performed for a conventional exception return. At step 408 the processing element triggers the realm management unit to carry out a number of realm checks. These include checking that:
  The local RID indicated in the realm identifier register RID_ELx associated with exception level ELx indicates a valid child realm. That is, the RMU checks the realm descriptor accessed from the realm descriptor tree 360 for the specified child realm, and checks whether the life cycle state of the child realm's realm descriptor indicates the Active state. If the child realm is in any state other than the active state then the realm check is unsuccessful.

The RMU 20 also checks that the REC memory region indicated by the pointer in the link register ELR_ELx is a memory region which is owned by the child realm indicated in the realm ID register RID_ELx. That is, the RMU 20 accesses the realm granule table 128 (or cached information from the RGT 128), locates the relevant entry corresponding to the memory region indicated in the REC pointer, and checks the owner realm specified for that memory region. The owner realm indicated in the ownership table may be specified as a global RID, and this can be compared with the global RID specified in the realm descriptor of the target child realm to determine whether the child realm is the valid owner of the REC. If the REC is owned by any realm other than the specified child realm in the RID register, then this check is unsuccessful.

The RMU 20 also checks whether the status of the REC memory region defined in ELR_ELx is valid. There are different ways in which the validity of REC memory regions can be represented. For example each REC memory region may include a flag specifying whether it is valid. Alternatively, a separate table could define the validity of RECs stored in other memory regions. A REC may be valid if it has been used to store architectural state of the relevant realm on a previous exception exit, but has not yet been used to restore state following a return from an exception. If the REC is invalid then again the realm check is unsuccessful.

The RMU 20 also checks whether a flush command has been executed since the last exit from any child realm other than the child realm indicated in the RID register RID_ELx. The flush command will be discussed in more detail below, but is a command for ensuring that any state still to be saved to a child realm's REC is pushed to memory (this helps to support lazy state saving approaches). If no flush command has been executed and the system is attempting to enter a different child realm to a child realm that was previously exited, then there is a danger that there could still be state left within the processor registers which has not yet been pushed to memory. Enforcing the use of the flush commands ensures that a different child realm can safely be entered without loss (or leakage to other realms) of a previous child realm's state. There may be a number of ways of identifying whether a flush command has been executed. For example, some status flags may be used to track (a) whether there has been a change to the RID register RID_ELx since the last realm exit, and (b) whether a flush command has been executed since the last realm exit. If there has been a change to the RID register and no flush command has been executed since the previous realm exit then this may cause the realm check to be unsuccessful.

If any of the realm checks is unsuccessful, then at step 409 a fault is triggered and the system stays within the current realm associated with the ERET instruction. Hence, it is not possible to reach a child realm unless all of the realm checks are successful.

If all of the realm checks are successful then at step 410 the processing element switches to processing in the child realm indicated in realm ID register RID_ELx. For example, the processor may have an internal register which specifies the global RID of the current realm (this internal register may not be visible to software and is different to the banked RID registers shown in FIG. 27). The switch to the child realm can be enacted by writing the global RID of the new destination realm to the internal RID register.

At step 412, state associated with the new realm is made available based on the states saved in memory in the REC memory region indicated by the pointer in the ELR_ELx register. As the REC region is owned by the new child realm, it is now accessible and so return state information such as the program counter and target exception level can be obtained from the REC. At this point, a selected subset of architectural states may be restored from the REC, or alternatively the architectural state may be restored lazily so that processing may commence without fully restoring all the state, and then the state can be restored as and when required, or gradually over a period of time in order to improve performance by reducing the delay before the processing can resume from the new realm.

At step 414 it is determined whether intermediate realm flag Int is set in the SPSR associated with the new realm. The SPSR contents would be restored from the REC along with the rest of the architectural state. If the intermediate realm flag is not set, then this indicates that the new realm is the realm in which the original exception occurred (or the realm is being entered for the first time without any previous exception occurring in that realm), and so there is no need to trigger any further realm entry into a child realm. At step 416 the program counter is obtained from the REC and then at step 418 processing continues in the new realm at the target exception level obtained from the REC.

Alternatively, if the intermediate realm flag is set then this indicates that a nested realm exit has previously occurred, and the nested realm entry has reached an intermediate realm. Hence there is a need to return processing to a further child realm in order to return to the realm in which the exception originally occurred. There are two alternative techniques for handling this. In a first alternative, at step 420 a spurious realm exit exception is taken, and so the exception status register associated with the new realm may be set by the processing element to a status code associated with this type of exception, and then processing may branch to an exception vector associated with that type of exception which triggers an exception handler to be processed. The exception handler need not perform any actual processing but could simply determine that an unknown type of exception occurred in a given child realm and so could then trigger another ERET instruction to be executed at step 422. The RID and ELR registers associated with the intermediate realm may still have the values which were placed in those registers when the intermediate realm previously entered the further child realm, and so execution of the ERET instruction may then trigger a further realm entry into the further child realm. The method may return to step 408 to check whether the realm checks are successful for that further realm entry and then the method continues in a similar way to the previous realm entry in the nested process.

Alternatively, instead of handling the nested realm entry using another ERET instruction executed in the intermediate realm, at step 424 hardware may detect that the intermediate realm flag is set for the current realm and then may trigger a further realm entry to the child realm without needing to execute any instructions within the intermediate realm and then the method may then return to step 408.

FIG. 29 shows a flow diagram illustrating a method of exiting from a realm or taking an exception. At step 430 an exception occurs within a given exception level ELx which targets an exception level ELy (ELy ELx). The target exception level ELy is the exception level at which the exception is to be handled. The target exception level could be the same as ELx, just one exception level higher than ELx, or could be several exception levels higher.

At step 432, the RMU determines whether the target exception level ELy is greater than the boundary exception level (BEL) of the current realm, which can be read from the realm descriptor of the current realm, and whether the current Realm is a sub-realm (see discussion of Sub-Realms below—the Type field of the Realm descriptor shown in FIG. 16 specifies whether the Realm is a sub-Realm). If the target exception level ELy is not greater than the boundary exception level then this indicates that the exception can be handled within the current realm and so if the current Realm is a full Realm there is no need to trigger a realm exit. In this case, at step 434 the processing element switches the current exception level to ELy (by updating the current state register for example), or if ELx=ELy then the current exception level remains the same (either way, the current exception level now is ELy). At step 436 the current processing state associated with exception level ELx is saved to registers accessible to target exception level ELy. For example the program counter may be saved to the link register ELR_ELy, and the previous exception level ELx at which the exception occurred may be indicated in the PSTATE value in SPSR_ELy. Also, the realm flag R in SPSR_ELy register may be set to 0 to indicate that the exception came from within the same realm, and so any subsequent exception return need not trigger a realm entry. Information about the exception type which occurred can also be saved to an exception status register ESR_ELy. At step 438 the processing element branches to the exception vector associated with the specified exception type and then processing continues in order to handle the exception. Eventually, when the exception handling is complete, an ERET instruction will be executed to trigger a return to the previous processing as discussed above for FIG. 28.

On the other hand, if at step 432 the target exception level ELy was greater than the BEL of the current realm, or if the current realm is a Sub-Realm (for which any exception triggers an exit to the Sub-Realm's parent Realm), then a realm exit is required in order to handle the exception. At step 440 it is determined whether the exception corresponds to a voluntary realm exit. Some types of exception may be triggered by unexpected events, such as the user pressing a button on the processing device, or some fault occurring. However, it is also possible for a realm to voluntarily relinquish processing and return to a parent realm. For example, the child realm may have reached the end of some processing routine, or may need to invoke some functionality at a higher exception level. When a child realm deliberately exits to a parent realm, then to allow the child realm to share data with the parent realm, it can be useful to allow some architectural state of the child realm to be retained for access from the parent realm, so that less state is masked and scrubbed compared to an involuntary realm exit. For example, general purpose registers may not be masked and scrubbed, although other control registers could still be masked and scrubbed. This avoids the need for the data to be stored to global visibility memory regions as the state can then be accessed directly from the registers, improving performance. That is, for a voluntary realm exit, the child realm is in control of the realm exit and so it can be assumed that the child realm has already overwritten the visible architectural state which should not be made accessible to the parent realm, and left any state which it does desire to share with the parent realm in the registers. A voluntary realm exit could be triggered for example by a predetermined variant of an exception triggering instruction which corresponds to a particular type of exception for which no masking or scrubbing is performed.

If the realm exit is not a voluntary realm exit, then at step 442 masking of a selected subset of architectural states is performed. The masking ensures that the architectural state to be hidden is made inaccessible to the parent realm. However, the parent realm may still attempt to access the registers which store that architectural state, and so also a scrubbing operation may be performed which ensures that any subsequent access to a scrubbed architectural register will return a predetermined value regardless of what value is actually stored in the physical register associated with that architectural register. That is, when the register scrubbing operation is performed for a given architectural register which stores part of the masked subset of architectural states this ensures that a subsequent read access to the given architectural register will return a predetermined value (e.g. zero) if it is performed by the processing circuitry without any intervening write access to that architectural register between the realms switch and the subsequent read access. The register scrubbing operation can be performed in different ways. For example, a physical register which corresponds to the given architectural register could be set to the predetermined value (e.g. a value of this zero could actually be written to a physical register). Alternatively, the register scrubbing could be performed by register renaming so that the given architectural register is remapped from a first physical register to a second physical register. Another approach could be to set a status value associated with the given architectural register or a physical register mapped to the given architectural register to indicate that a read access to the given architectural registers should return the predetermined value. With these last two approaches, it is possible to retain the masked architectural state within the physical register file of the processing element even though it is not accessible from the new realm, and any access to that state will return a predetermined value. This is useful for supporting lazy state saving as discussed below. Once the masking and scrubbing operations have been performed, at step 444 the processing element triggers saving of the masked subset of architectural states to the REC memory region associated with the current realm in which the exception occurred. This saving could be done immediately, or could be done lazily, overlapped with subsequent processing in the parent realm. Which approach is taken may depend on the particular implementation of the architecture and so is not an essential feature of the architecture. However, lazy state saving can improve performance.

If the realm exit was a voluntary realm exit, then at step 443 a reduced subset of architectural state is masked and scrubbed in the same way as at step 442, except that at least some of the state which would be masked/scrubbed for an involuntary realm exit does not need to be masked/scrubbed for a voluntary realm exit. For example, the reduced subset of architectural state may exclude the general purpose registers. Following step 443, the method continues to step 444 as discussed above for an involuntary realm exit.

Regardless of whether the realm exit was voluntary or involuntary, at step 446 the processing element switches to the parent realm. Since the RID_ELx and ELR_ELx registers associated with the child realm exception level and controlled by the parent realm exception level will still be set to the RID and REC pointer of the previously exited child realm (since these would have been set before an ERET instruction was executed to enter the child realm in the first place), there is no need to adapt this state, and so any subsequent ERET instruction will return to the same child realm as before. There is only a need to update these registers if the parent realm wishes to switch to a different child realm from the child realm which was last exited. Similarly, the realm flag R in the SPSR of the parent realm may still be set to 1 following the previous realm entry, and so can retain this value so that an FRET instruction subsequently will be treated as an entry to a new realm unless the R flag is cleared to 0 by an instruction executed in the parent realm.

At step 448 the RMU determines whether the target exception level ELy is greater than the BEL of the new parent realm into which processing has been switched. If not, then this indicates that the exception can be taken in the parent realm and at step 450 the processing element 8 branches to the corresponding exception handler appropriate for handling the type of exception that occurred. If the target exception level is higher than the BEL of the parent realm, then a nested realm exit is required in order to branch to a further ancestor realm and so at step 452 the intermediate realm flag associated with the parent realm is set to 1 in the SPSR and then the method returns to step 442 to trigger the masking and scrubbing of architectural states associated with that realm (this time the realm exit is not a voluntary realm exit since it has been triggered outside the control of the parent realm). The method then loops around again to mask or scrub any appropriate state associated with the current realm and then switch to the parent realm of that realm. The nested realm exit can loop through several times until eventually a realm is reached which can handle the exception.

At steps 412, 442, 444, the subset of architectural state which is masked, scrubbed and saved on exit from a realm, and restored on entry to the realm, may depend on the boundary exception level of the exited/entered realm. For non-nested realm exit and entry, the selected subset may include the subset of architectural state which is accessible to the exception level in which the exception occurred, as indicated in FIG. 27 for example. Hence, each exception level is associated with a group of registers, and in response to a realm-exiting exception condition occurring during processing of a given realm which is to be handled by an exception handler at a more privileged exception level than the boundary exception level of the given realm, the subset of registers may be selected depending on the boundary exception level of the given realm, and may include those registers which are accessible to the processing circuitry when processing a software process at that exception level. If the exception occurs at EL1 or higher than this may include all of the registers accessible to that exception level as well as any lower exception levels for a non-nested realm exit. Similarly, on returning to a realm then the corresponding subset of architectural states may be restored.

However, for a nested realm exit, it may be assumed that for an intermediate realm any registers which are accessible at lower exception levels than the boundary exception level of the intermediate realm would have been modified by a child realm at a lower exception level since the intermediate realm triggered entry to the child realm. Therefore, there may be no need to save such registers accessible at a lower exception level to the REC associated with the intermediate realm during the nested realm exit (no further execution at the intermediate realm has taken place since previously entering the child realm). Conversely, during the nested realm entry there is no need to restore those registers accessible at lower levels during the passage through intermediate realm, as these registers will subsequently be restored by a realm at a lower exception level. Instead the intermediate realm state saving and restoring could simply include the registers accessible to the intermediate realm's boundary exception level, but which are not accessible at lower exception levels. For example an intermediate realm at EL1, the state saved/restored in nested realm exit/entry may include the subset 352 in FIG. 27 but may exclude the subset 350 accessible at EL0. If the intermediate realm is at EL2, the saved/restored subset of state during the nested realm exit/entry may include the subset 354 accessible at EL2 but exclude the subset 352 accessible at EL1. With this approach, the amount of state saving and restoration required on passing through an intermediate realm can be reduced to improve performance.

Hence, when the exception condition is to be processed by an exception handler at a target exception level which is more privileged than the boundary exception level of the parent realm of the given realm in which the exception occurred, a nested realm exit can be triggered which includes multiple successive realm exits from child realm to parent realm until the target realm is reached which has a boundary exception level corresponding to the target exception level or higher. A respective state masking process (and state saving) may be triggered for each of the successive realm exits and each respective state masking process may mask (and save) the corresponding subset of registers selected based on the boundary exception level. For a realm exit from a given child realm which has a boundary exception level other than the least privileged exception level, the corresponding subset of registers masked/saved during the nested realm exit may include at least one register accessible at the boundary exception level of the given child realm, but may exclude at least one register accessible to the processing circuitry at a less privileged exception level than the boundary exception level of the given child realm (as it may be assumed that such registers would already have been saved when exiting a realm at that less privileged exception level). This reduces the amount of state masking and saving operations required.

Similarly, on realm entry (exception return) the intermediate realm flag may be used to determine whether the realm entered is an intermediate realm. If the intermediate realm status value for a realm having a boundary exception level other than the least privileged exception level is set to a predetermined value (indicating an intermediate realm) then the subset of registers to be restored upon realm entry may include at least one register accessible at the boundary exception level of the intermediate realm, but may exclude at least one register accessible to the processing circuitry at a less privileged exception level than the boundary exception level of the particular realm. If the intermediate status value is set to a value other than the predetermined value, then this realm being entered is the final realm and so the subset of registers to be restored accessed may include all registers accessible to the processing circuitry at the boundary exception level of the particular realm (without excluding any registers from lower levels).

In this way, the state saving and restoring operations during nested realm exit and entry can be made more efficient.

FIG. 30 illustrates an example of a non-nested realm entry and exit. In this example, the parent realm is A operating at exception level EL1 and it wishes to enter a child realm B having a BEL of EL0. Clearly, similar realm entry and exit procedures can be performed at other exception levels. At step 460 the parent realm sets the realm identifier register RID_EL1 to the local realm ID of child realm B. The local RID has the format obtained by concatenating the tree indices as discussed above. At step 462 the parent realm at EL1 sets the link register ELR_EL1 to an address providing the pointer to realm B's realm execution context. The parent realm obtains this pointer from the realm descriptor of the desired child realm B. At step 464 the parent realm sets the realm flag R in SPSR_EL1 to 1. At step 466 the parent realm then executes an ERET instruction, which as the realm flag is set to 1 is interpreted as triggering a realm entry. The various realm checks described above for step 408 of FIG. 28 are performed, and if they are successful then the realm entry is performed to switch to realm B. At step 468 state is restored from the REC indicated in the link register. This state includes the target exception level in which the new realm is to be executed. Note that at the point when the REC is accessed, the processor is still in the previous exception level associated with realm A and so this is why the link register ELR_EL1 is still accessible to obtain the REC pointer, even though the switch to realm B has been made and eventually that Realm will resume processing from EL0. The state restoration can be done immediately or can be done lazily over a period of time in parallel with the regular processing 470 of realm B.

When an exception occurs at step 472 during execution of the child realm B, then a set of masking operations is performed to hide state associated with realm B from its parent realm. This includes masking and scrubbing of at least a subset of the architectural states associated with EL0 at step 474 (the subset of architectural state that is masked/scrubbed may depend on whether the exit is a voluntary or involuntary realm exit). The masking makes the state inaccessible and the scrubbing ensures that subsequent accesses to the corresponding registers from the parent realm will trigger a predetermined value to be returned. At step 476 state saving to the REC associated with realm B is performed for the masked subset of architectural state. In this case, since the child realm has a BEL of EL0, the masked subset of state includes at least the subset 350 accessible at EL0. Again the state saving can be triggered immediately or could be done in a lazy fashion, in parallel with ongoing processing with the exception at the parent realm. At step 478 the realm exit is then triggered to switch to the parent realm A and at step 480 processing of the exception is carried out within the parent realm. Steps 474 and 476 of FIG. 30 can be omitted for a voluntary realm exit.

FIG. 31 shows a similar example showing a nested realm entry and exit. A grandparent realm A at exception level EL2 executes an ERET instruction at step 500, having already set the link register to point to the desired child realm's REC, set the realm ID register RID_EL2 to the child realm's local RID, and set the R flag to 1 in SPSR_EL2. This triggers a realm entry to realm B at step 502, and this triggers state to be restored from realm B's REC at steps 504 which again can be done immediately or lazily. Eventually realm B then executes a further ERET instruction at step 506, again having set the link register, RID register and R flag, to trigger a further realm entry at step 508. Note that the realm entries at steps 502 and 508 may be performed as shown in FIG. 28 and so steps such as the realm checks are still performed, but not shown in FIG. 31 for conciseness. Following entry to realm C then realm C's architectural state is restored from its REC at step 510 and processing resumes within realm C at step 512.

Subsequently, an exception occurs at step 514. The exception targets exception level EL2. For example, the exception may be a type of exception to be handled by the hypervisor (such as an event associated with a virtualized device or a stage 2 address translation fault). At step 516 the state masking process, including any scrubbing and state saving, is triggered in a similar way as shown in FIG. 30, and the realm exit to realm B, which is the parent realm of realm C in which the exception occurred, is performed at step 518.

At step 520 the processing element detects that the target exception level for the exception which occurred is higher than the boundary exception level of realm B, and so realm B is an intermediate realm and a further realm exit to realm B's parent realm is required. Hence the intermediate realm flag is set within SPSR_EL1 at step 522 and at step 524 further state masking, scrubbing and saving of a subset of registers is performed. Again, the saving part of this process could be deferred if the corresponding state can be retained in the process of registers in some way which is inaccessible to the processor following the realm exit to Realm A. The subset of registers which are saved for this intermediate realm include the registers 352 which are accessible at EL1 but excludes the registers 350 which are accessible at EL0. There is no need to save subset of registers 350 because Realm B has not executed any instructions to change these registers since the previous realm entry at step 508 and these registers have already been masked/scrubbed/saved by Realm C. Hence, this reduces the amount of additional masking and state saving required for the intermediate realm.

A further realm exit 526 is then triggered to the realm A which is the parent of the intermediate realm. In this case, realm A is able to handle the exception as it can operate at EL2, and so at step 528 the exception is trapped and handled at exception level EL2. The exception is processed by the hypervisor and once the exception has been handled an ERET instruction 530 is executed to return to the previous processing. At this point, the values of ELR_EL2 and RID_EL2 and the R flag in SPSR_EL2 are still the same as they were before the ERET instruction was executed at step 500. Therefore it is not necessary to set these values again. The FRET instruction 530 triggers a realm entry back to the previous child realm B at exception level EL1. Note that the exception handler code may already have such an FRET instruction in legacy code for returning processing to a lower exception level following handling of the exception. Hence, the re-use of FRET instructions to trigger realm entry as discussed above enables existing exception handler code written without awareness of the realm protection functionality to continue to be used, reducing platform development costs.

On returning to Realm B at EL1, the processing element detects that the intermediate flag is set in SPSR_EL1 (step 532). Hence, at step 534 the state which is restored from realm B's REC is the state accessible to EL1 (registered 352) but excludes the registers 350 which are accessible at EL0. If the processor implementation uses the software-assisted method of triggered nested realm entry, then at step 536 the processing element sets the exception status register ESR_EL1 for the intermediate realm to a particular value corresponding to a spurious realm exit. The processing element sets the program counter to an exception vector which indicates the exception handler for handling this predetermined type of spurious realm exit exception, and then the exception handler is executed at step 538. The exception handler need not carry out any real functionality but could simply trigger an ERET instruction or alternatively could provide some other operations as well. Eventually an ERET instruction is executed at step 542 which, since the ELR_EL1, RID_EL1 and SPSR_EL1 registers are still set as they were before the ERET instruction was executed at step 506, triggers a realm entry 544 back to the previous child realm which was executing before the original exception occurred. At this point state is restored from realm C's REC at step 546, and processing continues at step 548 in the same way as at steps 510 and 512 above.

Alternatively for a hardware assisted nested realm entry, steps 536 to 542 can be omitted and instead having restored the required subset of state at step 534, the hardware of the processing element may detect from the intermediate realm flag that further realm entry is required to realm C and so at step 550 the hardware may directly chain a subsequent realm entry without requiring a further ERET instruction 542 to be executed. In this case there is no need for any instructions to be executed within the intermediate realm.

By using such a nested realm entry and exit procedure, this avoids the realm at EL2 needing to deal with any realm values or REC pointers associated with EL0. This allows a cleaner and simpler check when entering a realm, as only the parameters of an immediate child of the current realm need to be checked. This greatly simplifies the architecture and hardware implementation.

FIGS. 32 and 33 show examples of lazy state saving and state restoration to and from the REC on realm exit and realm entry respectively. In general, on exiting a realm to a parent realm it may be desirable to mask state associated with the child realm to hide it from the parent realm, and to perform scrubbing to ensure that the parent realm will see some predetermined value if it attempts to access an architectural register corresponding to scrubbed state. These operations can be performed relatively quickly. However, if there is insufficient space in the physical register file of the processing circuitry for retaining the child realm state indefinitely, then it may be desired to save some of that data to the REC. However, this can take a longer time, and occupies memory bandwidth which could otherwise be used for processing in the parent realm, which can delay processing in the parent realm. Similarly, the corresponding operations to restore state from memory to the registers on entering a realm can take some time. Therefore, for performance reasons it may be desirable to support asynchronous saving/restoring of processing element state to/from the REC. Whether a given processor implementation actually does this lazy state saving is an implementation choice for the particular processor. For example, some processors not aimed at high performance may find it simpler simply to trigger the state saving operation right away, in order to reduce to complexity of managing which state has already been saved and which has not. However, to enable performance improvements if desired, it can be desirable to provide an architecture functionality supporting such asynchronous, lazy state saving, approaches.

Hence, in response to a realm switch from a source realm to a target realm which is to be processed at a more privileged exception level than the source realm, the processing circuitry may perform state masking to make a subset of architectural state data associated with the source realm inaccessible to the target realm. Although it is possible for that masked subset of state to be saved to memory at this point this is not essential. However, the architecture provides a flush command which can be used following a realm switch. When the flush command is executed, the processing circuitry ensures that any of the masked subset of architectural state data not already saved to at least one REC memory region owned by the source realm if saved to the at least one REC memory region). By providing such a flush command, it can be ensured that at a point when it is necessary to ensure that the subset of architectural state data has definitely been saved, this can be forced through, and this gives the freedom for particular micro-architectural implementations of the architecture to vary exactly when that subset of architectural state data is actually saved to memory in cases when the flush command has not yet been executed.

In addition to the state masking, on a realm switch the processing circuitry may also perform a register scrubbing operation as discussed above which ensures that any subsequent read access to a given architectural register returns the predetermined value (if performed without an intervening write access). This scrubbing could be done by actually writing the predetermined value to a physical register corresponding to the given architectural register, or by register renaming, or by setting other control status values associated with the given architectural register to indicate that a read access should return the predetermined value instead of the actual contents of the corresponding physical register. If the state saving to be performed in response to the realm switch is performed asynchronously, then the processing circuitry may commence processing of the target realm when at least part of the subset of architectural state data made inaccessible in response to the realm switch is still stored in the registers of the processing circuitry. For example, a processor may have a larger physical register file than the number of registers provided as architectural registers in the Instruction Set Architecture, and so some spare physical registers could be used to retain the previously masked states for a period after the target realm has already started processing. This is advantageous because if then the processing returns to the source realm when a given item of the subset of architectural state data is still stored in the registers, the processing circuitry can simply restore access to that given item of architectural state to from the register file, without needing to restore data from the REC. Some types of exceptions may only need a relatively short exception handler to be executed, in which case it is likely that some masked state is still resident in the register file on returning from the exception. Such "shallow" exception entry/return events can benefit from using lazy state saving.

If lazy state saving is used, then once processing of the target realm has commenced following the exception, the processing circuitry may trigger saving of a given item of the REC region(s) in response to occurrence of a predetermined event other than the flush command. Although processing at this point has already switched to the parent realm (which would not usually have access to the REC associated with the previous child realm), as these operations are triggered in hardware by the microarchitecture implementation rather than by software, they may not be subject to the same ownership checks that would be required for a general software-trigger memory accesses (effectively these REC saving operations will already have been authorized by the child realm before exiting).

Many different types of predetermined event could be used to trigger a certain item of subset of architectural state data to be saved to REC including the following:

A register access to an architectural register corresponding to the given item of the subset of architectural state data. This approach could be useful for less complex processors which do not support register renaming. In this case each architectural register may map to one fixed physical register, and so the first time that code associated with the parent realm tries to access the given architectural register then this may require the old value of that register used by the child realm to be saved to memory.

Remapping of the physical registers storing the given item of the subset of architectural state data. In systems supporting register renaming, the architectural state could remain in the register file for longer, but eventually it may be necessary to remap the corresponding physical register to store a different value and at this point the corresponding architectural state of the child realm could be saved to the REC.

A number of available physical registers becoming less than or equal to a predetermined threshold. In this case, rather than waiting for an actual remapping of a given physical register, state saving could start to be preemptively performed once the number of free physical registers (which are available for reallocation to a different architectural register) becomes low.

Elapse of a given number of cycles or a given period of time. Hence it is not necessary for any particular processing event to trigger saving but instead the lazy state saving could simply spread out saving of the child realm's context to the REC over a period of time in order, to reduce the impacts on memory bandwidth available for other memory accesses triggered by processing in the parent realm.

An event indicative of reduced processor workload, for example a period of idle processor time or some other event which indicates that performing the state saving now would have less impact on the overall performance of the processing of the parent realm. At this point the saving of at least part of the subset of architectural state data could be triggered.

Following the realm switch, if the processing circuitry attempts to enter a further realm other than the source realm from which the realm previously switched to the parent realm, then the processing circuitry may reject a realm entry request when the further realm is to be processed at the same exception level or a less privileged exception level than the target realm of the previous realm exit and no flush command has been received between the realm switch and the realm entry request. Alternatively, the realm entry request could be accepted regardless of whether the flush command has been executed, but if the flush command has not been executed then the initial child realm REC state may be corrupted so that the REC cannot be used again, preventing valid entry into the child realm. Either way, a flush command is required before a parent realm can successfully direct processing to a different child realm to the one that was previously executed. This ensures that even if the hardware chooses to use the lazy state saving approach, all the necessary state associated with the previous child realm will have been committed to being saved to memory at the point where different child realm is entered. This avoids the need to back up several sets of child realm data to be saved to memory and simplifies the architecture.

Note that the flush command merely needs to ensure that state from the masked registers is committed to being stored to the REC memory region. The store operations triggered by the flush command can be queued within a load/store queue of the processing element 8, or in queues within the interconnect 14, a memory controller or the memory 16 itself, so the actual write to the memory cells may not occur until later, but from the processing element's point of view it is known that the memory writes of the masked state will definitely happen.

The flush command could be a native instruction supported by an instruction decoder of the processing circuitry. Alternatively, the flush command could be a command triggered by a predetermined event to carry on processing of the instructions decoded by the instruction decoder. For example, a flush command could be triggered automatically by some other type of instruction which implies that it should be ensured that state saving operations have been triggered to memory for all the required subset of architectural state associated with the previous child realm.

As discussed above, the particular subset of architectural state which is to be saved during the realm switch may depend on the boundary exception level associated with the source realm (and also may depend on whether the source realm is an intermediate realm in a nested realm exit). The state masking and saving operations may be suppressed if the realm switch is a predetermined type of realm switch (e.g. a realm switch triggered by execution of a voluntary realm switching instruction in the source realm).

Hence, FIG. 32 shows an example of lazy state saving and restoring. At step 560 a realm exit is handled in the same way as discussed above. Although the subset of architectural state to be hidden for realm B is masked and scrubbed on the realm exit, the state saving to the REC can be deferred and so a lazy state saving process 562 may be performed in the background of the processing 564 associated with the parent realm A. The particular way in which the lazy state saving is performed may be an implementation choice for a particular processing design. At step 566 the parent realm triggers a realm entry back to the previous child realm (using a ERET instruction as discussed above). In this case, since the realm entry goes back to the same child that was previously exited then there is no need for a flush command for the realm entry to be valid. If a portion 568 of the lazy state saving operations is still to be performed then this can be cancelled following the realm entry, and instead the corresponding state values for realm B can simply be restored from some of the physical registers of the processing element. Hence, for a relatively shallow exception exit and return, using the lazy state saving approach helps to reduce the volume of memory accesses required improving performance.

FIG. 33 shows another example in which a realm exit 560 is performed from a realm B1 to its parent realm A in the same way as in FIG. 32. However, this time, rather than returning to the same realm, realm A wishes to switch processing to a different child realm B2. Hence, the parent realm executes a flush command at step 570 which triggers the processing element to ensure that any remaining part of the lazy state saving process 562 is completed (i.e. store operations are issued for all the remaining architectural state of the masked subset which is still resident in the processing element's register file). At step 572, the parent realm sets the realm identifier register and link register to indicate the realm ID and REC pointer for the target realm B2, and then executes an ERET instruction at step 574 which triggers a realm entry 566 to realm B2. If the flush command had not been executed prior to executing the ERET instruction, the realm entry would have failed. At step 578 state restoration is performed from realm B2's REC memory region (again this can be done lazily).

Hence, the use of the flush command enables the fast exception exit and trickling out of processor states into the REC of the previously exited realm and also allows for shallow exception exits and returns where state is held within the registers of the processing elements and not stored and reloaded from the REC.

FIG. 34 illustrates the concept of sub-realms which can be initialized by a parent realm. As shown in FIG. 34, a given parent realm 600 operating at a particular exception level may initialize a sub-realm 602 which operates at the same exception level as its parent. The full realm 600 corresponds to a given software process (or collection of two or more processes) but the sub-realm corresponds to a predetermined address range within the given software process. As the full realm is the parent of the sub-realm, then as discussed above the sub-realm may have a right to access data stored in memory regions owned by the parent full realm, but the sub-realm may have a right to exclude its parent full realm from accessing data stored in a memory region owned by the sub-realm 602. This is useful for allowing a certain portion of a given software process to be made more secure than other parts of the software process. For example a portion of code for checking passwords in a mobile banking application or for processing other sensitive information could be allocated to a sub-realm in order to prevent other portions of the same application or operating system from accessing that sensitive information.

Sub-realms may generally be handled in the same way as full realms, with some differences as explained below. Entry and exit to and from sub-realms may be handled using exception return instructions and exception events in the same way as discussed above. Hence, the sub-realm may have a child realm ID constructed in the same way as for full child realms of the same parent, and may be provided with a realm descriptor within the realm descriptor tree as discussed above. Entry to the sub-realm can be triggered simply by executing the ERET instruction having placed the appropriate child sub-realms RID in the RID register before executing the ERET instruction. Hence, the same type of ERET instruction (of the second variant) can be used to trigger entry to either a full realm or a sub-realm.

One way in which sub-realms may be different to full realms may be that sub-realms may not be allowed to initialize their own child realms. Hence a realm initialization command for initializing a new realm may be rejected if the current realm is a sub-realm. The RMU may determine whether the current realm is a full realm or a sub-realm using the realm type value in the realm descriptor of the current realm. By disabling realm initialization when currently in a sub-realm, this simplifies the architecture since it is not necessary to provide additional state registers for use by the sub-realm in initializing further realms.

Similarly, execution of a realm entry instruction may be disabled when currently in a sub-realm. This simplifies the architecture because it means that some of the banked registers such as the ELR, SPSR, ESR and RID registers discussed above which are used for handling realm entry and exit (and exception entry and return) do not need to be banked a further time for each sub-realm, which would be difficult to manage as it may not be known at design time how many sub-realms a given process will create. Similarly, exception return events which trigger a switch to a process operating at a lower privilege level may be disabled when a current realm is a sub-realm rather than a full realm. Although in the examples discussed above a single type of FRET instruction functions both as a realm entry instruction and an exception return instruction, this is not essential for all embodiments, and in cases where separate instructions are provided, then both the realm entry instruction and the exception return instruction could be disabled when the current realm is a sub-realm.

Similarly, on occurrence of an exception when in a sub-realm, rather than taking the exception from directly from the sub-realm, the processing circuitry may trigger an exit from the sub-realm to a parent full realm which initialized the sub-realm, before handling the exception. Hence, exceptions trigger a return to the parent full realm. The exception return to the parent full realm may include the state masking, scrubbing and saving operations to the REC, but by avoiding exceptions being taken directly from a sub-realm to a realm at a higher exception level, this avoids the need to bank exception control registers such as the ELR, SPSR and ESR a further time for sub-realms, simplifying the architecture.

For a sub-realm, the boundary exception level, which indicates the maximum privilege level allowed for processing of the realm, is equal to the boundary exception level for its parent full realm. In contrast, for a child full realm the boundary exception level is a less privileged exception level than the boundary exception level of its parent realm.

When a realm is initialized by a parent realm, the parent realm may choose whether the new realm is to be a child full realm or a child sub-realm, and may set the appropriate realm type parameter in the realm descriptor accordingly. Once the realm is operational, the parent realm can no longer change the realm type, because modification of the realm descriptor is disabled through the managed realm lifecycle discussed above with respect to FIG. 18.

In summary, the ability to introduce sub-realms, which are managed similar to full realms but with exception handling, realm initialization and realm entry functionality disabled within the sub-realm, enables a smaller portion of code corresponding to a given address range within the software process of a full realm to be isolated from other parts of that software, to provide additional security for a certain piece of sensitive code or data.

As discussed above, the realm management unit (RMU) may control transitions of memory regions between a number of region states (or life cycle states). The region states available may include at least an invalid state in which the memory region is allowed to be reallocated to a different owner realm, and a valid state in which the memory region is allocated to an owner realm, is accessible to that owner realm, and is prevented from being reallocated to a different owner realm. For a memory region to transition from the invalid state to the valid state, the RMU may require that a scrubbing process is performed to set each storage location of that memory region to a value which is uncorrelated with a previous value stored in the storage location. For example the scrubbing could comprise writing zeros to every location within the scrubbed memory region, or could comprise writing some other fixed non-zero value to each memory location, or writing random values to the different memory locations which are unrelated to the values which were previously stored. Either way, the scrubbing ensures that any previous data which was stored in an invalid region when the region was owned by a different realm does not become accessible to the new owner realm when the region becomes valid. The scrubbing process could be triggered by the RMU itself in response to a command requesting that the region transitions from invalid to valid, or alternatively the scrubbing could be triggered by a different command or a series of commands (separate from the command instructing the transition from invalid to valid).

In the example of FIGS. 21 and 22 above, the invalid and valid states are the only states which a memory region can have (other than the RMU-private states). This means that in order for a given realm to take ownership of a non-RMU-private memory region, that memory region has to be scrubbed, which takes some time and results in actual physical memory locations being updated with new data values, and hence requires physical memory to be committed. Also, once a region has become valid, then the RMU would be unable to distinguish whether it has only just been scrubbed and so the data is not significant, or whether at least one write request to write actual data to the region has taken place since the region become valid, and hence if an export command is executed then the data would need to be exported to backup storage and so would consume space in the backup storage.

In the examples discussed in FIGS. 35 to 39 below, an additional scrub-commit state is provided in which the memory region is allocated to an owner realm, but is inaccessible to that owner realm until the scrubbing process has been performed for the memory region, and is prevented from being reallocated to a different owner realm. This means that it is not necessary to perform the scrubbing process in order to be able to allocate a memory region to a particular owner realm. Hence, a realm can be allocated owned regions in the scrub-commit state, and if the owner realm for some reason does not use all of those regions then the time and energy associated with performing the scrubbing process has not been consumed unnecessarily.

The scrub-commit state in some examples could be a zero-commit state in which the region is inaccessible to the owner realm until the scrubbing process has been performed to write zeros to each location of the memory region. Alternatively the scrub-commit state could correspond to scrubbing processes which write non-zero values to each location.

In general the region in the scrub-commit state may be inaccessible to the owner realm until the scrubbing process has been performed to the memory region. Hence, the scrubbing process would need to be performed before the region can become valid and accessible to the owner realm. If the owner realm attempts to make a memory access to a memory region which is in the scrub-commit state, then the memory access circuitry may signal an exception condition (e.g. a fault). For example the exception could trigger a parent realm or other supervisor process to trigger one or more commands for performing the scrubbing process and transitioning the region state to valid.

As discussed above, while the RMU and memory access circuitry may enforce ownership rights for memory regions of a first memory, the first memory may not have enough capacity to handle all data which may be needed and so from time to time some data may need to be exported from the first memory to a second memory (e.g. off-chip non-volatile memory 6 as shown in FIG. 1). The RMU 20 and memory access circuitry 26 may not be able to protect data while it is in the second memory and so the export command is provided which triggers encryption of data stored in an export target memory region specified by the export command, and writing of the encrypted data to a second memory, so that that export target memory region can then be transitioned from the valid state to the invalid state and be re-used for other data. When the export command is processed by the RMU, the RMU may generate metadata specifying at least one characteristic of the data stored in the export target memory region, and store the metadata to the first memory. For example the metadata may comprise a hash of the original unencrypted data, or some other information which may allow the validity of the encrypted data in the second memory to be checked. The metadata may be stored to a region of a first memory which is private to the RMU (i.e. one of the RMU private states discussed above, in particular state 228 shown in FIG. 22) and which is inaccessible to one or more software processes executed by the processing circuitry (other than any RMU software). The RMU private region may be inaccessible to the owner realm of the region storing the metadata (other than through commands directed to the RMU). In response to an import command corresponding to the metadata, the realm management unit may trigger decryption of the encrypted data read from the second memory, validate integrity of the decrypted data using the metadata stored in the first memory, and when the integrity of the decrypted data is validated, restore the decrypted data to an import target memory region and transition the import target memory region to the valid state. Hence, the metadata allows potential tampering or modification of the encrypted data when it is stored in the second memory region to be identified so that this does not compromise the ownership rights of the owner realm of the region in which that data was previously stored in the first memory.

However, the generation of the encrypted data and of the metadata takes some time and involves some processing resource. Also, the export of data to the second memory consumes space within the second memory. By providing the scrub-commit state, memory regions can still be allocated to an owner realm, but they can be exported to the second memory without having to actually generate any encrypted data and without writing any data to the second memory. Instead, in response to the export command specifying an export target memory region which is in the scrub-commit state, the RMU may suppress the encryption and writing to the second memory, and generate metadata specifying that the export target memory region was in the scrub-commit state. The target memory region can then be transitioned from the scrub-commit state to the invalid state. When an import command is executed and the corresponding metadata specifies that the target memory region was in the scrub-commit state, the RMU may simply transition a selected memory region from the invalid state to the scrub-commit state and there is no need to read data from the second memory as there was no cipher text associated with encryption.

Hence, a child realm may be created and allocated a number of owned memory regions so that from the point of view of the child realm it has a reasonably large address space available to it and so it would not be necessary for the child realm to later claim ownership for all of these regions, which could cause issues and conflicts with other owner realms. Nevertheless, the child realm may be created with minimal committed memory as the scrub-commit state means that the pages can be immediately exported without generating any cipher text, with the metadata simply indicating that the corresponding regions were in the scrub-commit state. Hence neither the first memory nor the second memory needs to have physical space committed immediately on creating the realm. This can improve performance in a number of situations. Some example usage models are discussed below.

Various RMU commands may be provided for triggering transitions between the memory region life cycle states. For example a scrub-commit variant of a region add command (e.g. a variant of the granule add command 232 discussed above) specifying a predetermined realm and a scrub-commit target memory region which is currently in the invalid state may be used (e.g. by a parent realm of the predetermined realm) to control the RMU to allocate the target memory region for ownership by the predetermined realm and to transition that scrub-commit target memory region from invalid to the scrub-commit state. For example, a parent realm can transfer ownership of its owned memory regions which are currently invalid to the child realm directly in the scrub-commit state so that the child realm does not immediately need to commit first or second memory space to those regions but can be guaranteed some owned regions.

Another example of an RMU command may be a scrub-commit command which specifies a scrub-commit target memory region, which is valid and owned by the realm which issued that command. In response to the scrub-commit command, the RMU may transition the scrub-commit target memory region from valid to the scrub-commit state. Hence, a given child realm may request that one of its owned regions is transitioned to the scrub-commit state. For example this can be useful for a balloon driver which has a variable memory usage and so may be allocated a relatively large amount of memory but may later find that some regions are not required and can be returned for other purposes. By transitioning the no longer required regions to the scrub-commit state this retains the option that the child realm can easily return these to valid without having to go through the ownership claiming process again later if the driver's memory requirements increase again (avoiding the risk that other realms could claim ownership of these pages in the meantime), but if the parent realm determines that some of the no longer required regions should be reallocated for other purposes then the parent can safely remove them from the child realm for re-use by exporting these regions without needing to consume physical space in the second memory.

To transition a scrub-commit memory region to valid, a commit command may be executed by the RMU to trigger the scrubbing process to be performed. This command could be issued by the child realm which owns the region in the scrub-commit state or could be issued by the parent realm of the owner realm of the region in the scrub-commit state. Hence the RMU may accept the commit command issued either by the owner realm or the parent realm of the own realm of the commit target memory region.

FIG. 35 shows an example of the set of memory region life cycle states which can be implemented in some examples. FIG. 35 includes all of the states of FIG. 21 but additionally includes a zero commit (scrub-commit) state in which the memory region is inaccessible to software, but allocated to a particular owner realm and so prevented from being reallocated to a different realm. The zero commit state is not an RMU-private state. In the zero commit state, unlike the invalid state, the region cannot be transferred ownership to a different realm, but unlike the valid state the region is inaccessible to software because the scrubbing process has not yet been performed. Transition from zero commit to valid requires the scrubbing process to be performed.

As shown in FIG. 36, the state diagram of FIG. 22 can be expanded to include the zero commit state 800. For conciseness, in FIG. 36, the various RMU private states 226, 228 shown in FIG. 22 are simply shown as a single state, but all of the transitions between the invalid state 220 and the various RMU private states 226, 228 shown in FIG. 22 can still be provided in the example of FIG. 36. Similarly, FIG. 37 shows an expanded version of FIG. 23 in which the zero commit state 800 is added so that a parent realm can transition one of its invalid realms to the zero commit state and allocate it to one of its children in the new state by executing a zero commit variant of a granule add command 802, and an active child can transition one of its valid regions to the zero commit state 800 by executing a zero-commit command 804.

As shown in FIGS. 36 and 37, a number of commands (in addition to those described earlier) are provided to handle transitions with respect to the zero commit state, as follows:
Scrub-Commit (Zero-Commit) Variant of the Granule Add Command (802)
Rmu.granule.add(rid,ZC,src,dst)
rid=RID of child realm to which ownership is to be transferred
ZC=parameter indicating that this is the zero-commit variant of granule add src, dst: address of transferred region in the address spaces of the parent and child realms's respectively
Similar to the granule add command 232 of FIG. 23 (can be accepted only when the specified child realm is in the new state), but parent can defer the zero filling to later time. Realm measurement updated for a zero filled granule. Granule state in the RGTE (ownership table entry) is recorded as zero-commit.
Scrub-Commit (Zero-Commit) Command 804
RMU.granule.zerocommit(rid,a)
Transform an owned granule (memory region) into the zero-commit (ZC) state
Called by the owner of that granule, i.e. rid will specify current realm, a is address of the zero-commit target region.
Scrub-Commit (Zero-Commit) Variant of the Clean Command (810)
Called by an owner of an invalid owned granule (memory region) to transform the owned granule into the zero-commit (ZC) state, without actually performing scrubbing. Instead of transitioning an invalid granule to valid or RMU private as for the other variants of the clean command, this variant transitions the invalid granule to zero-commit.
Commit Command 806
RMU.granule.commit(rid,a)
Scrubs (e.g. zero fills) the contents of the granule and set state to Valid.
Rejected if granule indicated by address a is not in the Zero-Commit state or specified realm is not Active.
Called by owner realm or parent realm of the owner realm.
Export Command
RMU.granule.export( )
An exported ZC granule will produce no destination cipher text, only metadata. The metadata generated for an exported ZC granule indicates that the granule was a ZC granule and that there is no cipher text.
Import Command
RMU.granule.import( )
An imported ZC granule has no input cipher text, only MD. Results in an invalid granule transitioning to ZC, but does not automatically scrub (zero fill) the ZC granule)—a commit command would be issued to perform the scrubbing and transition to Valid.

Note that the import and export commands are not shown in FIGS. 22 and 36 for conciseness, as export commands can be called for a memory region in any of the lifecycle states to transition the export target region to invalid, and import commands can be called to transition an import target region to any of the other states (including invalid).

FIG. 38 is a flow diagram showing processing of an export command in an embodiment which includes the zero commit state 800 in the set of life cycle states available for each memory region of the first memory 16. At step 820 an export command is received by the RMU 20. At step 821, the RMU 20 transitions both the export target memory region (the page of the address space mapped to the on-chip memory 16 from which the data is being exported) and the export destination memory region (the page of the address space mapped to the location in the external memory 6 to which the data is being exported) to the RMU-private state. These regions remain as RMU-private for the duration of the processing of the export command.

At step 822 the RMU 20 checks the realm granule table (ownership table) 128 to determine the region life cycle state which the export target memory region had prior to receiving the export command (i.e. before the export target memory region was transitioned to RMU-private at step 821).

If the export target memory region was valid, invalid or RMU-private (including any of the respective RMU private states shown in FIG. 35) then at step 824 the RMU 20 triggers the cryptographic unit 104 to encrypt the data stored in the export target memory region. For regions in the invalid state, instead of encrypting actual data read from physical memory, the cipher text is generated at step 824 by encrypting dummy data which is not based on any real stored data (as an invalid region has no real stored data associated with that region of the address space). For example, a cipher text obtained by encrypting a random or pseudorandom value could be generated for invalid pages. Alternatively, the encryption of dummy data and writing of the encrypted data to the second memory 6 could be omitted for invalid pages to save time and energy. However, by exporting encrypted dummy data for invalid regions even though there is no valid data, this prevents the parent realm of a child realm gaining insight into the child realm's operations by issuing export commands for different regions in an attempt to determine which regions are valid or invalid—valid and invalid regions are both treated the same from the point of view of the parent realm (as encryption is performed regardless of whether the region is valid or invalid, the time taken to carry out the export operation is the same and so the timings associated with the export operation do not give away information on whether the region state is valid or invalid).

At step 826 the RMU generates the metadata which specifies at least one characteristic of the exported data, to allow a subsequent validity check on importing the data. For example the metadata could be a hash of the contents of the target memory region, which would allow modification of the data when it is in the second memory to be detected on import. The metadata could also specify other information such as the location of the second memory 6 to which the data will be exported. Also, the metadata could specify attributes of the realm granule table entry associated with the export target memory region (such as the region lifecycle state, mapped address or visibility attributes), so that these can be restored when the region is later imported. The parent realm software may be responsible for assigning or managing metadata for import and export commands and keeping track of which block of metadata corresponds to which encrypted page in the second memory (e.g. by using software-defined metadata in page tables or pointers in the metadata itself to track the relationship between a given address in the address space of a child realm and the corresponding metadata and encrypted data in memory). At step 828 the RMU triggers writing of the encrypted data generated at step 824 to the second memory 6. At step 830 the RMU triggers writing of the metadata to an RMU-private region in the first memory 16 which is owned by the same owner realm as the export target memory region. It will be appreciated that the relative ordering of steps 824 to 830 in FIG. 38 is just one example and these could be done in a different order (e.g. the metadata could be generated in parallel with the encryption, or could be performed before the encryption, and the relative order of the writes to the second and first memory may vary).

On the other hand, if the export target memory region was in the zero commit state at step 822, then at step 832 metadata is generated which specifies that the export target memory region was in the zero commit state. Again, the metadata for the zero commit state could specify attributes of the corresponding RGT entry. The RMU suppresses the encryption of the data stored in that memory region and the writing of the encrypted data to the second memory, so that it is not necessary to consume either the time and energy associated with performing the lengthy encryption process and the generation of the metadata dependent on characteristics of the data (e.g. the hashing may take some time), and also it is also not necessary to consume memory within the second memory for storing the encrypted data. Following step 832, the metadata is again written to an RMU-private region in the first memory at step 830. Note that while omitting the encryption process for regions in the zero-commit state could in theory permit a parent realm to determine that an exported page was in the zero-commit state by analysing the time taken to perform the export operation, in practice this is not a problem, because zero-commit regions for a child realm will typically be used in scenarios in which the parent realm is allowed to be aware of which regions are in the zero-commit state (either the parent realm created the zero-commit regions itself when creating the child realm, or the child has voluntarily requested that the regions are made zero-commit so that the parent can take advantage of being able to export them with reduced export time), and so omitting the encryption process does not leak any unexpected knowledge about the child realm's operation to the parent realm.

Regardless of the export target memory region state, following step 830 or step 834 the export target memory region is transitioned to the invalid state, so that while any data may have been retained by encrypting it and exporting it out to the backup memory, the physical region within the first memory can be reallocated for use by a different software process (once any scrubbing has been performed to allow a transition to the valid state). Also, the export destination memory region is transitioned to the valid state.

Hence, by using the zero commit state, exports can be made faster and avoid committing memory.

FIG. 39 shows a corresponding flow diagram showing processing of an import command. At step 840 an import command is received by the RMU 20. In response to the import command, at step 841 the RMU transitions to the RMU-private state both the import source memory region (the page of the address space from which data is being imported from the external memory 6) and the import target memory region (the page of the address space to which data is being imported in the on-chip memory 16). At step 842 the RMU accesses the previously stored metadata associated with the import command. For example the import command may specify an address in the address space of the parent realm which is issuing the import command and this may be used to index into a metadata tree to access the previously stored metadata. At step 844 the state of the previously exported memory region indicated by the metadata is determined. If the state was in the zero commit state then at step 846 an import target memory region is simply transitioned to the zero commit state, and there is no need to read any data from the second memory 6 or to perform any decryption or integrity validation. The import target memory region may be any invalid region of the first memory 16. When the region transitions to the zero commit state, it may also be allocated for ownership to the same realm which owned the corresponding export target memory region which was exported by the previous export command. The parent realm issuing the import command may specify the RID of the relevant child realm which is to own the page after import within the import command itself.

If at step 844 the state of the previously exported memory region was indicated as valid or RMU-private, then at step 848 the encrypted data which was previously exported is read from the second memory 6. The location from which the encrypted data is read may be specified by the metadata itself. At step 850 the encrypted data is decrypted, and at step 852 the integrity of the decrypted data is validated using the metadata (for example comparing the hash against a result of applying the same hash function to the decrypted data). If at step 854 it is determined that validation is unsuccessful, then at step 856 an exception may be signalled or the import rejected so that the decrypted data is not written to the first memory to avoid compromising the ownership protections given by the RMU 20 and the memory access circuitry 26. If the validation is successful then at step 858 the decrypted data is restored to an import target memory region and at step 860 the import target memory region is transitioned to either RMU-private or valid (depending on the state of the previously exported memory region). Again the target memory region used for the import may be selected as any invalid region of the first memory and may transition to ownership by a realm having an RID specified by the import command.

If at step 844 the previously exported memory region was determined to be in the invalid state, then at step 847, the encrypted data is read from the import target memory region, and decrypted, in a similar way to steps 848 and 850 of FIG. 39. Optionally, the integrity of the decrypted data may be checked against the metadata in a similar way to step 852, although this is not essential for an invalid region, as for an invalid region the decrypted data is dummy data which is discarded without writing it to an import target memory region. By performing the decryption of the dummy data in a similar way to valid/RMU-private pages, the parent realm cannot gain information on whether the page was valid or invalid from the time taken to perform the import operation. At step 849 the import target memory region is transitioned to Invalid.

Regardless of the state of the previously exported memory region determined at step 844, at step 862 the realm granule table entry for the import target memory region is restored based on the attributes specified by the metadata for the previously exported memory region. The import source memory region remains in the valid state following the import operation, as the data in the import source memory region has not been modified during the import process. Also, the metadata about the import source memory region may be destroyed following successful import of the data, to prevent replay attempts to import the same "old" data.

The zero commit state can be useful for a range of usage models including the following:

Realm Creation:
Fully pre-populated with memory. Parent creates child Realm as normal. Parent then "pre-commits" the zero filled memory regions. Creates a full MD tree for this through the use of add(ZC) and export(ZC), while only using one physical page (an RMU-private page for storing the metadata). At Realm runtime, when a page fault to a ZC granule occurs, the parent will commit a physical page to the child, import the ZC to it, then commit( ) it, fix up MMU mappings and continue.

Memory Allocation:
Reduce Child bookkeeping requirements. Child asks parent for memory, parent provides and maps a region of Invalid granules into child. Child claims granules for immediate ownership. Child zerocommits granules for later use. Implicit contract that child does this to allow parent the option of ZC export. Child doesn't need to track any additional state, as any complexity is with the parent. Safe for a child to take a realm protection fault on a ZC granule and automatically commit it.

Balloon Driver:
Software with variable usage of memory. When memory usage drops, driver will zero-commit (ZC) granules no longer required. Parent can safely remove them from child Realm for re-use. Any child access to the previously zero-committed granules will cause either a page fault or a realm protection fault.

As discussed above, the realm management unit (RMU) may maintain an ownership table specifying ownership entries which each define ownership attributes for a corresponding region of memory of a given size. The ownership attributes specify, from among plurality of realms, an owner realm of the corresponding region. The owner realm has a right to exclude other realms from accessing data stored in the corresponding region. Memory access circuitry may control access to the memory based on the attributes defined in the ownership table.

In some examples the RMU may be responsive to a region fuse command specifying a fuse target address indicative of a plurality of contiguous regions of the memory to be fused into a fused group of regions, to perform a region fuse operation to update the ownership table to indicate that the ownership attributes for each region in the fused group of regions are represented by a single ownership entry corresponding to a predetermined region of the fused group. It may be relatively common that a number of contiguous regions of memory may need to be provided with the same ownership attributes and in this case it can be more efficient to represent the attributes of those regions using a single ownership entry, for example if such entries are cached in a translation lookaside buffer or other cache structure by a particular micro-architectural implementation. While the precise details of how such caching is implemented may be an implementation choice, by providing the RMU, at an architectural level, with the capability to respond to region fuse commands by updating the ownership table to indicate that the attributes for a number of contiguous regions can each be represented by a single ownership entry associated with one of the regions of the fused group, this can enable performance improvements. By enabling caching of a single entry representing the ownership attributes for the entire fused group of regions, this frees up cache space for caching ownership entries associated with other regions of the memory address space. That is, by fusing groups of regions where possible, the fraction of the total address space which can have entries simultaneously cached can be increased, improving performance.

This technique is particularly useful if the memory access circuitry controls access to memory based on both the ownership table and at least one translation table providing address translation data for translating virtual addresses to physical addresses. The at least one translation data table may provide further access permissions for controlling access to memory, which may provide an orthogonal layer of protection in addition to the ownership protections provided by the ownership table. For example, while the at least one translation table may implement a top-down privilege-based accessed control, in which more privileged processes can deny access to certain regions of memory to less privileged processes, the ownership table may specify corresponding protections which enable an owner realm to define a particular region of the memory address space to set ownership attributes which control whether more privileged realms can access the owned region. In typical translation tables, it can be common for multiple pages of virtual addresses to be coalesced into a single larger page which can be represented by a single page table entry within a translation lookaside buffer or other cache structure. This can exploit the hierarchical nature of many translation tables which may make it relatively easy for a page table entry at a higher level of the hierarchy to indicate that multiple lower entries have been combined. Hence, an operating system or other process setting translation tables may expect that if it allocates the memory so that a number of contiguous pages can each have their access permissions and address translation data represented by a single page table entry in the translation table, then this should enable performance improvements by improving the efficiency with which a translation lookaside buffer or other cache structure for caching information from the address translation tables can be managed, resulting in more different pages having their address translation data ethically cached within the TLB.

However, when access control is also based on an ownership table, and the ownership table does not have its ownership entries coalesced or fused in a similar way to the page table entries within the translation table, then in practice this may prevent such performance gains that would normally be expected from combining multiple translation table entries. For example, in some micro architectural implementations at least one translation lookaside buffer (TLB) may be provided which caches information from both the address translation tables and the ownership table. In some cases the information from the address translation tables and the ownership table could be combined into a single entry. Hence in such a combined TLB, each entry may correspond to the smallest granularity of memory region associated with either the information from the address translation tables or the information from the ownership table. Hence, if ownership entries remain unfused then even if the page table entries in the translation table can be combined then this may not result in any improvement in the efficiency of TLB allocation. By providing RMU support for a region fuse command, this enables multiple regions having corresponding ownership attributes to be fused into a fuse group of regions for which a single ownership entry may represent the ownership attributes, so that TLB allocation efficiency can be improved. It will be appreciated that not every micro architecture may benefit from the potential performance gains obtained by fusing, depending on the particular implementation of the TLB. However, by providing architectural support for such a region fuse command then software can be written in such a way that those micro architectures which do provide a TLB implementation which could benefit from fusing can realise those advantages.

While combining different page table entries of a translation table may be relatively simple to implement, by the operating system or other process which manages the translation tables writing updated page table entries to the translation table, with the ownership table which defines different owners for different portions of the address space, where the owner is responsible for controlling which other realms can access the data in the corresponding region, this may make fusing of regions associated with the ownership table more complex. Hence, in contrast to a translation table update, where a single process responsible for managing the entire translation table may simply overwrite the entry to be updated, with region fusing in the ownership table, the RMU may be responsible for receiving region fuse commands requesting fusing of regions from other processes, with the RMU determining whether that region fuse command can be acted upon and if so performing a region fuse operation to update the ownership table to indicate that the attributes for each region in the fuse group of regions can be represented by a single ownership entry. Hence, there may be a separation between the process which requests the region fusing by issuing the region fuse command, and the RMU which determines whether that region fuse command can be accepted and if so controls the region fuse operation to be performed. The RMU could be a dedicated hardware unit for controlling management of ownership permissions, or could be realm management software executed on the same processing circuitry that also executes some of the software processes corresponding to the respective realms.

Region fuse commands may be allowed to be issued by different processes. In some cases the owner realm which is specified in the ownership table as being the owner for the contiguous regions to be fused may itself issue the region fuse command to trigger those regions to be fused in a fused group of regions. For example, when setting the ownership attributes for a number of contiguous regions, the owner realm may be aware that those regions are to have the same attributes and therefore may trigger a region fuse command so that the common attributes for each region can be represented in the ownership table by a single entry. Hence, the TLBs of some micro architectural implementations are able to cache a single ownership entry as representative of the attributes of the entire fused group of regions, instead of needing to cache individual entries for each separate region.

However, the RMU may also allow the region fuse operation table to be performed in response to a region fuse command triggered by a realm other than the owner realm specified in the ownership table for the contiguous regions to be fused. For example, it could be useful to allow a software process which is involved with setting of the translation tables to request fusing of regions defined in the ownership table. For example, when an operating system is setting the translation tables so that a number of pages of the address space will have the same translation attributes, it could also issue a region fuse command to request fusing of the corresponding regions (if permitted by the RMU). The actual owner realm associated with those regions of the address space may not have been aware that all of the regions had the same properties in the translation tables, and so may not have chosen to fuse those regions. On the other hand, the operating system may not be aware whether the ownership attributes for those regions are the same, and if not then it may not be appropriate to fuse the regions, but if the RMU does approve the region fuse command then this can enable improved performance when using the operating system's translation tables. Hence, by allowing different processes to request fusing, but providing the RMU to validate whether fusing is allowed, this can simplify writing of software than if only the owner realm could trigger fusing.

The RMU may validate whether it is appropriate to act upon the region fuse command, to guard against cases where, for example, another process may issue the region fuse command but the attributes set by the owner realm indicate that it is not appropriate to fuse those regions, for example as they may have different ownership attributes defined. Hence, the RMU may, in response to the region fuse command, determine whether the region fuse command passes at least one validation check, and reject the region fuse command when the at least one validation check has failed. When the at least one validation check is passed then the RMU may perform the region fuse operation.

In general, the at least one validation check may be such that the region fuse command may pass the at least one validation check only if fusing the specified regions would not cause a change in the effective ownership attributes of any of those regions. This means that whether regions are fused or not does not impact on program logical correctness or on the security enforced by the ownership table, but may merely be a performance enhancing measure which can be chosen to be acted upon or not by the RMU. From the point of view of the software issuing the region fuse command, whether or not that region fuse command passes or fails the validation check has no impact on the correct running of that software, but if it does pass the at least one validation check then this may enable better performance.

For example, the RMU may determine that the at least one validation check is failed when different ownership attributes are specified in the ownership entries for any two of the plurality of contiguous regions to be fused. Hence, if the respective owners of any two of the specified contiguous regions are different or the owners have defined different ownership attributes (e.g. attributes defining which other processes can access those regions or indicating a particular region state (valid, invalid, scrub-commit, etc. as discussed above)) then the validation check may be failed and so any region fuse command targeting those regions with different ownership attributes may be rejected. If the region fuse command is rejected, then the ownership table remains unchanged and so multiple separate ownership entries would still be needed to represent the attributes for the contiguous regions.

Another form of validation check may involve a mapped address which may be specified in each entry, in addition to the ownership attributes which define the owner realm and any other access permissions. Each ownership entry may correspond to a physically addressed region of memory. The mapped address specified in a given ownership entry may identify an address to which the physical address identifying the corresponding region was mapped at the time when the ownership attributes for the region were set in the ownership table. The mapped address could be a virtual address, an intermediate physical address, or a physical address, depending on the privilege level of the owner realm associated with the region. Specifying such a mapped address in the ownership entry can be useful to avoid security protections provided by the ownership attributes being compromised when a higher privilege process than the owner realm of the corresponding memory region remaps translation tables to change which addresses are mapped to the physical address of the memory region after the ownership attributes for that region have already been defined in the ownership table. As discussed above, when accessing memory, part of the security checks performed to determine whether the memory access is allowed can be to compare the mapped address in the ownership entry for the required physically addressed region of memory with the corresponding address which is currently mapped to that physically addressed region of memory, and reject the memory access if those addresses do not match. When fusing multiple regions into a fused group of regions which can be represented with a single ownership entry, then if those contiguous regions did not specify a contiguous group of mapped addresses, then this could lead to the protection associated with checking the mapped address being circumvented if only a single ownership entry was provided to record the ownership attributes for the entire fused group. Hence, when performing the validation checks for the region fuse command, the RMU may determine that the at least one validation check is failed when the ownership entries for the contiguous regions specify a non-contiguous group of mapped addresses.

As discussed above, each ownership entry may specify one of a number of region states associated with the corresponding memory region, which may include at least an invalid state in which the memory region is allowed to be reallocated to a different owner realm and a valid state in which the memory region is allocated to a given owner realm and prevented from being reallocated to a different owner realm. There could also be additional states. In one example the at least one validation check may be failed when the ownership entry for any of the contiguous regions to be fused specifies that the region is in any state other than the valid state. Transition of a region from the invalid state to the valid state may require certain measures to be performed to maintain security. For example the RMU may require that a scrubbing process is performed to set each storage location of a region to a value uncorrelated with a previous value stored in a storage location, before a region can transition to the valid state. This can guard against leakage of data from regions which were previously valid when they are reused and reallocated to a different owner realm. By requiring that all of the contiguous regions to be fused are currently valid in order to implement the region fuse operation, then this ensures that such security measures cannot be circumvented by fusing regions before they became valid in order to avoid needing to scrub the data from each of the fused regions for example.

Often, translation tables may be implemented as hierarchical tables which involve multiple levels of sub-tables which are traversed in order to find the entry of interest for a given address, with information indexed at one level of the table structure used to identify the relevant entry at the next level of the hierarchy. This can be useful to allow information common to a larger range of addresses to be specified in a shared higher-level entry rather than needing to duplicate this information for each region, and to allow entries corresponding to a relatively large sparsely populated address space to be compressed into a smaller space. With a hierarchical table, it can be relatively straightforward to set an indication that multiple pages are to be combined, for example by a higher-level page table entry indicating that all of the lower level entries below it are to be represented using common attributes.

In contrast, the ownership table may comprise one or more linear tables. In a linear table, a required entry for a given address can be accessed by a single index into the table structure, rather than multiple jumps through a hierarchy as for the translation tables. In some examples, the ownership table could comprise more than one linear table, for example if multiple banks of memory are provided then a separate linear table could be provided for each bank, with part of the address selecting which bank's table to lookup, and the remainder of the address providing a single linear index into that bank's table. A linear table may be faster for lookup performance as it means that only one memory access is enough to obtain the required ownership entry for a given memory region.

In some implementations, the region fuse command could specify an arbitrary number of regions, to be fused into a fused group represented by a single ownership entry.

However, with a linear table it may be more complex to efficiently handle fusing of multiple regions so that they can be represented by a single ownership entry within a TLB or other cache structure, as there is no route into multiple entries of the table via a shared higher level entry as there is for the hierarchical structure of the translation tables. Hence, while it may be desirable to support fusing of fused groups of regions of a number of different sizes, it may also be desirable to limit how many ownership entries have to be updated when such a fuse in operations is performed, and constrain the granularity with which regions can be fused to simplify processes for looking up the ownership tables and processing the region fuse command.

Hence, in one example the region fuse command may be a group size incrementing the form of the command, which specifies an indication of a target fused group size. The target fused group size may be specified from among multiple fused group sizes supported by the RMU. The region fusing operation performed in response to the group size incrementing form of the command may comprise updating the ownership table to indicate that a number of contiguous regions which each are associated with fused groups having an expected current fused group size which is the next smallest fused group size then the target fused group size, are to be fused into a fused group of the target fused group size. By providing a command which increments the fused group size up to the next level, rather than enabling a single command to arbitrarily fuse any number of regions into a fused group, this can make the memory accesses for updating the ownership entries to indicate the new fused group size more efficient as discussed below. Also, if fused groups are constrained to be in sizes of certain levels of a hierarchy (e.g. certain powers of 2 numbers of regions), this can simplify regular ownership table lookups as the position of the single ownership entry representing the attributes for an entire fused group could be the entry corresponding to an address aligned to a certain group size. This can make the micro-architectural implementation of the memory access circuitry and RMU more efficient.

In some cases, the group size incrementing form of the region fuse command may specify the target fused group size directly. Alternatively, the target fused group size may be implicit from some other information specified by the command. For example, the command could specify the expected current fused group size which is expected to be associated with the contiguous regions identified by the command, and in this case the target fuse group size may be deduced from the expected current fused group size as being the next highest fused group size among the supported fused group sizes.

A minimum fuse group size among the supported fuse group sizes may correspond to the predetermined size of a single region. Hence when regions are indicated as having the minimum fuse group size this may effectively indicate that they are not part of any fused group. Other fused group sizes may indicate fused groups which comprise two or more fused regions.

For the group size incrementing form of the region fuse command, another form of validation check may be to check that the specified contiguous regions to be fused are currently associated with a current fused group size which is the next smallest fused group size than the target fused group size. That is, the RMU may check whether the actual current fused group size of the specified regions matches the expected current fused group size for the region fuse command. If any of the specified contiguous regions is associated with a current fused group size other than the next smallest fuse group size than the target fuse group size, then the validation check may fail and the command may be rejected. This can be useful because, as discussed above, different software processes may be able to issue region fuse commands, and so another process may already have fused regions to form a fused group of the target fused group size or larger, and so in this case it would not be necessary to action the region fuse command as the desired effect has already happened.

In response to the group size incrementing form of the region fuse command, the region fusing operation may comprise updating a subset of the ownership entries associated with the contiguous regions to be fused. The subset selected may depend on the indication of the target fused group size specified by the region fuse command. Hence, an advantage of providing the incrementing form of command is that it is not necessary to update every single ownership entry associated with each of the contiguous regions which are fused into a fused group of the target fused group size. If multiple region fuse commands are executed successively to jump up two or more steps of the fused group size hierarchy then the later command can build upon updates to the table already made by an earlier command to avoid needing to update all of the entries of the larger fused group.

For example, when the expected current fused group size is the minimum fused group size among the plurality of fused group sizes (i.e. the specified regions are not yet fused into a fused group), then the subset of entries to be updated may be all of the entries associated with the contiguous regions to be fused into the fuse group of the target fused group size. On the other hand when the expected current fuse group size is a fused group size other than the minimum fused group size, then the subset of entries may be less than all of the entries associated with the contiguous regions to be fused. In particular, when the expected current fused group size is greater than the minimum size then the selected ownership entries to be updated may comprise the first ownership entry of each fused group which has already been fused by earlier region fused commands, so that it is not necessary to update the ownership entries associated with subsequent regions in the same fused groups being fused further by another region fusing command. For example, the subset of ownership entries which are updated in response to the region fuse command may be entries associated with regions whose addresses are offset by an amount corresponding to the expected current fused group size associated with those regions.

In some cases each level of the size incrementing form of the region fused command may be associated with fusing of a certain predetermined number regions or already fused groups of regions into a larger fused group size. In some cases the number of regions or fused groups, which are fused by a given command specifying a given level of group size as to target fused group size, may be the same for each level. In this case, the subset of entries selected for updates may comprise the same number of ownership entries regardless of which fused group size is the target fused group size. While the selected entries may be separated by different offsets depending on the target group size, this can limit the memory access overhead for performing the fuse operation to a certain amount for each level of the fused group size incrementing process.

However, in other examples the command which specifies one fused group size as the target fused group size could combine a first predetermined number of regions or already fused groups into a larger fused group size, while a command specifying a different target fused group size could combine a different number of regions or fused groups into a larger fused group size. In this case a different number of ownership entries may need to be updated depending on the target fused group size.

Note that the subset of entries of the ownership table which are updated in response to the region fuse command may also be the same subset which are looked up to validate whether the current fused group size is the next smallest fused group size than the target fused group size in order to determine whether to perform the region fusing operation in response to the region fuse command.

Each ownership entry may specify an indication of a current fused group size associated with the corresponding region. However, when only a subset of entries are updated upon processing a region fuse command, then this may mean that the effective fused group size associated with a given region could be indicated by the current fused group size indicated in the ownership entry associated with a different region to that given region. Hence, on looking up the region table to allocate a new entry for a given region to a TLB, the TLB or RMU may need to try reading the current fused group size of a number of different ownership entries, each at an address boundary corresponding to a different candidate fused group size within which the required region could have been fused, in order to determine the actual fused group size for that region and hence determine which ownership entry represents the attributes associated with that region.

In a corresponding way, a region shatter command may also be provided which specifies a shatter target address indicating a fused group of regions to be shattered into subsets of one or more regions. In response the RMU may perform a region shatter operation to update the ownership table to indicate that the ownership attributes for the respective subsets of regions are now represented by different ownership entries of the ownership table. Hence, when the attributes for different subsets of regions within a fused group now need to be set to different values then the region shatter command could be issued to signal that going forward different ownership entries would need to be cached in a TLB or other cache structure for those subsets of regions. The subset of regions into which a fused group is shattered could be individual regions or could be smaller fused group of regions. For example in some implementations the region shatter command could be a decrementing form of command which reduces the size of fused groups one level down the hierarchy of fused group sizes in a complementary way to the way in which the incrementing form of region fused command increases the fused group size by one level in the hierarchy. Alternatively another form of region shatter command could simply shatter a fused group of any size into individual regions. The decrementing form of command can be more efficient to build in microarchitecture, for similar reasons discussed above for the incrementing form of region fuse command.

Hence, for a decrementing form of region shatter command, the region shatter command may specify an indication of the target fused group size which is expected to be the next smallest fused group size than the current fused group size associated with the fused group of regions to be shattered. The RMU may validate whether the actual current fused group size matches the expected fused group size and reject the region shatter command if this is not the case. Again, only a subset of ownership entries may be updated in response to the decrementing form of the region shatter command, with the ownership entries updated being selected at offsets depending on the indication of the target fused group size.

In some examples, the region shatter operation performed by the RMU may include triggering a translation lookaside buffer which caches information from the ownership table to invalidate any information associated with the fused group of regions indicated by the shatter target address. This can provide security by ensuring that the TLB cannot continue to retain old information about the entire fused group of regions, so that if the owner realm for any of the shattered subsets of regions then subsequently changes the ownership attributes of those regions, the new attributes will be accessed as the previously defined attributes for the entire fused group are no longer be accessible from the TLB.

Alternatively, instead of triggering TLB invalidation in response to the region shatter operation, a TLB invalidation could be triggered in response to the first update of information in one of the ownership entries associated with one of the previously fused group of regions after the region shatter operation has been performed. This recognises that the fused entry can be allowed to remain in the TLB as long as no change to any of the ownership attributes of the previously fused group of regions has taken place since the shatter command was processed. As in any case any change to ownership attributes is likely to be accompanied by a TLB invalidation to ensure old attributes are not still cached in the TLB, this approach can avoid needing to perform additional TLB invalidations in response to the region shatter command.

In some examples, the region fuse operation performed in response to a region fuse command could also include such a TLB invalidation of any information associated with the newly fused group of regions. This can ensure that if any TLB entries associated with individual fused entries were present in the TLB then these are discarded so that the next access to any of those regions would then trigger loading of the single combined ownership entry, allowing a greater number of other memory regions to have their entries of the ownership table also cached in the TLB. However, with the region fuse operation the TLB invalidation may be desirable to gain the performance boost, but is not essential for security and so could be omitted.

In some examples, during the region fuse operation the RMU may lock ownership entries to be updated in the region fuse operation to prevent those ownership entries being updated by other processes until the region fuse operation is complete. Similarly, ownership entries updated during a region shatter operation could also be locked until the region shatter operation is complete. This avoids unpredictable and potentially insecure results which could occur if another process updates one of the relevant ownership entries partway through the region fuse operation or the region shatter operation, which could for example mean that validation checks might be circumvented or the wrong ownership attributes being indicated for some regions. By locking the relevant ownership entries at the start of the update process associated with the region fuse or shatter operations and then unlocking those entries once all of the relevant updates are finished, the region fuse operation or region shatter operation can be performed atomically. This means any subsequently received command may only see the results resulting from the complete region fuse or shatter operation. Any technique may be used to achieve the locking. For example there may be a bit specified in each entry which indicates whether the entry is locked by the RMU.

A command to be serviced by the RMU, which specifies an operation to be performed on a single target region of memory of the predetermined size, may be rejected when the single target region is part of a fused group of regions. For example, commands for changing the region life cycle state in the ownership table, changing the visibility attributes which control which processes other than the owner realm can access the region of memory, or exporting data from a single target region to backup storage, may be rejected if the specified region is part of a fused group. As mentioned above, as the region fuse commands may be issued by a number of processes then the process issuing the single-region command may not be aware that region has been fused and so it is useful for the RMU to check whether the target region is in a fused group and reject such single-region operations if so. If a single-region RMU command is rejected, a fault handling routine in the software requesting the RMU command, or in an exception handler, could respond by issuing a region shatter command and then reissuing the single-region RMU command for example.

FIG. 40 schematically illustrates an example of a hierarchical table structure used for translation tables, which could be the stage one page tables 120-1 or stage two page tables 120-2 discussed above. Translation tables (page tables) to describe virtual to physical address translations, memory types and access permissions defined by a top-down approach where a more privileged process responsible for management of the tables defines information in the tables which controls how less privileged processes can access the corresponding regions of memory. Translation tables are typically used to describe memory at a 4 KB granularity. Logically, on each CPU memory access the virtual input address is checked against the translation tables. In practice, these checks are cached for a range of address in a TLB 100. TLB hit (or miss) rate is a significant contributor (impactor) on system performance.

The translation tables are hierarchical, in that multiple steps of indexing in different levels of the table are required to access the required information. FIG. 40 shows an example with 4 levels of table (levels 0 to 3), where a first portion of the address indexes into the level 0 table, and the indexed entry then specifies the base address of a corresponding level 1 table. A second portion of the address indexes into the entry of the level 1 table which provides the base address for the level 2 table. A third portion of the address indexes into the entry of the level 2 table which provides the base address for the level 3 table. A fourth portion of the address indexes into the entry of the level 3 table which provides the actual address mapping and other access permission data required for the target address.

To improve TLB efficiency, the MMU architecture may allow for larger regions of memory to be described, and these large regions can be cached in the TLB. For example, this can be done using block entries at earlier levels of the translation tables, e.g. for a 4 Kbyte translation table, a level 3 entry will describe a 4 Kbyte page, and level 2 entry will describe a region corresponding to 2 Mbytes. The level 2 entry could specify the attributes to be used for all of the level 3 entries below, so it is not necessary to cache all the individual level 3 entries. Alternatively, contiguous entries within the current level of table could specify that they are to be combined into one, e.g. 16 aligned 4K entries can describe a 64 Kbyte region. By using large translations software performance can be improved by measurable percentage (1-5%). Real world software such as Linux and Hypervisors may perform behind the scenes operations to align virtual and physical addresses to allow for the use of large pages.

In contrast, as shown in FIG. 41, the realm granule table (ownership table) 128 may be implemented as one or more linear tables which are indexed based on a single index to derived from the physical address. Each RGTE may identify a number of ownership attributes, including the owner realm, realm states and visibility as discussed above and may also specify a mapped address as shown in FIG. 19. Also as discussed below, the RGTE may specify an additional parameter indicating a fuse level (fused group size). For any given address, the required entry in the linear table structure can be accessed with a single memory access, simply by indexing into a single table based on the physical address. In some cases, multiple linear tables may be needed, e.g. if covering regions in multiple banks of memory, but still in this case the required table is selected based on the address and the required entry read from a single access to that table, rather than using information derived from one indexed entry of the table to then locate a further entry of the next level of the hierarchy as for the translation tables of FIG. 40. With such a linear table is it less simple to fuse multiple regions so that their attributes can be represented by a single entry within a TLB. If regions having the same attributes cannot be fused, then for microarchitecture implementations which use a TLB 100 of the form shown in FIG. 25, in which a single combined entry caches information from both the translation tables and the RGT, then the TLB would have to allocate separate entries for different pages of the address space even if the translation tables represent those pages with a single page table entry. In contrast, by supporting fusion of regions represented in the RGT, so that a single ownership entry can represent attributes for a larger region, this can enable a more sufficient stage 3 lookup in the TLB.

Page fusing allows a single RGTE to represent, a set of contiguous pages, to enable a more efficient Stage 3 RPU (TLB). Fused pages can restore the TLB performance with respect to MMU large pages. Without fusing, the TLBs will only hold references to 4K mappings even if larger MMU mappings are used.

Groups of pages are fused together and shattered (unfused) using the following commands:
Region fuse command: RMU.Granule.Fuse(addr, level)
Region shatter command: RMU.Granule.Shatter(addr, level)

Fusing and shattering can be applied recursively to create and destroy larger fuse groups. Fuse group sizes are defined match the TT large region sizes.

Valid pages can be fused. Invalid, Zerocommit (scrub commit), and RMU_Private pages cannot be fused.

Pages to be fused are required to be contiguous and address aligned to the new fuse group size. The fuse command is rejected unless the pages to be fused are first claimed and cleaned, with identical types, attributes and permissions.

Also, the region fuse command is rejected if the pages to be fused are not contiguous in Mapped Address and physical address PA:
  EL0 pages require contiguous VA and PA (contiguous IPA may also be required for large TT mapping)
  EL1 pages require contiguous IPA and PA
  EL2 and EL3 pages require contiguous PA All pages must be physically present to be fused. This is enforced by requiring the corresponding pages to be in the Valid state in the RGT. Fused pages cannot be exported (paged out), they would first need to be shattered.

RMU commands that operate on single pages return an error if a fused page is provide as input. The fused page would first need to be shattered, and the command retried (otherwise the state of a page within a fuse group could be different).

Fusing is a performance optimisation, which may be performed by the software that owns the pages, or by higher level software in coordinated with the management of large page tables.

Failure to fuse pages impacts TLB performance, but does not impact program logical correctness or security.

Fuse Level (Fused Group Size)

Fuse group state is stored as the "Fuse Level" within a RGTE. The minimum Fuse Level 0 is the default level when a page is not part of a fuse group. Further fuse levels may be defined corresponding to certain larger fused groups, e.g. level 1=64K, level 2=2 MB. It can be useful for these sizes to be selected in correspondence with the sizes of regions covered by the respective levels of the translation table hierarchy.

Hence, to fuse 16×4K pages into a single 64K fuse group, software can call RMU.Granule.Fuse(addr, FuseLevel=1). Upon successful completion from the 64K aligned address addr, the sixteen physically contiguous pages will have their RGTE.FuseLevel values increased to FuseLevel1. Likewise a RMU.Granule.Shatter(addr) will reduce the fuse level of the sixteen pages back to FuseLevel0.

To create a 2 MB fused group first all the 512 individual 4K pages would be fused into 64K fused groups. Then these 32 groups can be fused again into a 2 MB group.

When fusing into higher levels only the fuse level of the first RGTE of each lower group is updated to the new fuse level. Therefore, the RGTEs aligned to 64K address would have RGTE.FuseLevel=FuseLevel2. The other RGTEs not-aligned to 64K would have RGTE.FuseLevel=FuseLevel1. This limited update reduces the quantity of RGTEs that need to be modified on each Fuse/Shatter command.

Within the linear RGT, the updating of Fuse Level at large page-granule-aligned addresses, can be viewed as the flattening of a two dimensional tree into one dimension table.

For level 3 RMU lookups as shown in FIG. 24, the MMU 26 may, when accessing the RGT 128 to identify the attributes for a given memory region, either access that region's RGTE directly and check if its FuseLevel is greater than zero, and if so, then walk up the aligned granule addresses to find the actual size of the fused group of regions associated with the required memory region and hence which RGTE at one of the aligned addresses specifies the combined attributes for that fused group. If the FuseLevel is zero then the attributes from the required region's RGTE may simply be returned. Alternatively, on receipt of a translation table walk that has resulted in large mapping, the MMU 26 may directly try the aligned RGTE for the fused group size corresponding to that large mapping to see if the following pages are fused, and if not walk down the aligned addresses to find a match and store the best result in the TLB.

Upon completion of a RMU.Granule.Shatter command the RMU issues a TLB invalidate command specifying the aligned physical address and size of the fuse group in question. This maintains security by ensuring that if attributes of individual entries associated with the previously fused group are subsequently updated, the out of date values previously shared by all regions of the fused group cannot still be accessed from the TLB. On the other hand, TLB invalidates on RMU.Granule.Fuse are desirable to gain the performance boost, but not essential for security.

FIG. 42 illustrates the concept of fuse levels (fused group sizes). As shown in the left hand-side of FIG. 42, initially when regions (granules) are allocated to particular owners then the corresponding ownership entries (RGTEs) of the ownership table (RGT) 128 may each be defined with a fuse level of 0, which is the default level when a page is not part of any fuse group. The fuse level of 0 can be seen as indicating a minimum fused group size, corresponding to the size of a single memory region represented by one RGTE, e.g. 4 kB. Hence, if a memory access to one of these regions is made, the TLB caches information from a single RGTE corresponding to the accessed region, independent of any entries associated with other regions in this part of the address space. Each of the regions may have a different owner realm defined for that region, and/or different ownership (visibility) attributes, for example.

As shown in the middle part of FIG. 42, a process then issues a region fuse command to the RMU, specifying a target fuse level of 1 and a target address identifying a block 900 of $N_{L1}$ contiguous 4K regions. $N_{L1}$ may be implicit. For example the architecture may define the number of regions to be fused by a level 1 region fuse command, so that this does not need to be explicitly indicated in the command. $N_{L1}$=16 in this example. The RMU 20 validates whether the command can be actioned. For example, the RMU 20 checks whether each of the regions of the block 900 to be fused have the same owner realm, same visibility attributes, are each in the valid state, and have contiguous mapped addresses. Also, the RMU 20 checks whether the fuse level specified in each of the RGTEs associated with block 900 meets the expected fuse level, which is one level below the target fuse level—i.e. to check that the fuse level=0 for the 16 RGTEs associated with block 900.

If the region fuse command passes the validation, then the $N_{L1}$ contiguous regions are fused to form a single fused group of 64 KB, and the RMU increments the fuse level specified by each of those fused regions to 1. This indicates that when a memory access is made to any region within the 64 KB fused group, the attributes are read from the RGTE (shown shaded in FIG. 42) which is at the 64 KB-aligned address corresponding to that region, i.e. the RGTE for the first region associated with the fused group.

Similar level 1 region fuse commands can be issued to fuse other 64 KB groups at different addresses. Hence, within each 64 KB fused group, each of the RGTEs specifies a fuse level of 1, and the ownership attributes for all 16 memory regions of the same fused group are indicated by a predetermined RGTE of that group, shown shaded in FIG. 42. In this example the predetermined entry is the first entry associated with the very first region of the fused group.

A level 2 region fuse command can then be issued specifying target fuse level=2, which triggers fusing of $N_{L2}$ level 1 fused groups to form a larger level 2 fused group. Again, $N_{L2}$ may be implicit in the architecture, e.g. $N_{L2}$=32 in this example, so that the level 2 fused group corresponds to 2 MB. Again, the RMU validates whether the attributes for each of the level 1 fused groups are the same (checking only the $N_{L2}$ shaded RGTEs at the aligned addresses of each level 1 fused group), that the expected fuse level for each of these RGTEs is 1 (one less than the target fuse level), and that these RGTEs define contiguous mapped addresses (at offsets of 64K in this example).

If the level 2 region fuse command is validated, then the RMU updates the table to indicate that the $N_{L2}*N_{L1}$ regions all have their attributes indicated by a single RGTE, which is the shaded entry in the right hand diagram of FIG. 42 at the address aligned to the start of the 2 MB level 2 fused group.

Note that, on executing a granule fuse command which specifies target fuse level 2 or higher, not all of the RGTEs associated with the regions being fused have their fuse levels updated. Instead, only the first RGTE within each of the smaller fused groups (e.g. level 1) being fused have their fuse levels incremented. Hence, in the example of FIG. 42 the 32 RGTEs which are shown shaded in the middle part of FIG. 1 have their fuse levels incremented to 2, but the remaining RGTEs within each of those level 1 fused groups still indicate a fuse level of 1. By only updating the first RGTE of each lower fused group size when increasing the fuse level, this avoids needing to make as many memory accesses, improving performance. When the MMU accesses a region associated with one of the non-incremented RGTEs, then the actual fuse level associated with those regions can be determined from the RGTE associated with the aligned address aligned to the boundary corresponding to the size of the larger fuse region. Hence, when the MMU accesses data from the realm granule table (ownership table) then it may need to walk up and down accesses at different aligned addresses corresponding to different possible fused group sizes (fuse levels) in order to find the actual fused group size and attributes associated with a given region. Once fused, a single TLB entry can store the information which can be looked up on an access to any of the fused group of regions.

As shown in FIG. 42, corresponding level 2 and level 1 region shatter commands can also be provided to reverse the effects of the corresponding level 2 and level 1 region fuse commands. Alternatively, as shown at the bottom of FIG. 42 a single global shatter command could decompose a fused group of any size into individual 4 KB regions without needing to selectively reverse each level of fusing one step at a time. However, the decrementing form of the region shatter command (marked level 1 or level 2 in FIG. 42) can be more efficient to implement in micro-architecture.

FIG. 43 is a flow diagram illustrating a method for processing a region fuse command issued. At step 920 the region fuse command is received by the RMU 20. The region fuse command can be issued by any software process, including processes other than the owner realm of the regions being fused. The region fuse command specifies an address and a target fuse level (FL) indicative of the size of the fused group to be formed in response to the region fuse command. In this example, the target fuse level FL is explicitly indicated in the command, but other examples could implicitly identify the target fuse level FL, e.g. by instead specifying the expected current fuse level, i.e. FL−1.

At step 922, the RMU 20 looks up the RGTE for the region associated with the address specified in the region fuse command, and checks whether it is indicated as valid. If the region is not Valid (e.g. in one of the Invalid, RMU-private, or Scrub-Commit (zero-commit) states), then at step 924 the region fuse command is rejected. Note that if any of the other regions to be fused is not Valid, this may be detected at step 930 below when comparing the attributes of each region to be fused to check they are the same, so it is not necessary at step 922 to check whether all of the RGTEs associated with regions to be fused are Valid.

At step 926, the RMU 20 checks the ownership table to determine whether the target fuse level FL is one level higher than the current fuse level indicated in the RGT 128 for the addressed region identified by the address specified in the region fuse command. Note that the current fuse level of the addressed region could be specified in either the RGTE looked up at step 922 for the addressed region itself, or could be specified in another RGTE associated with a different region at an address aligned with a fused group size boundary. If the RGTE for the addressed region specifies fuse level 0, then the current fuse level=0. If the RGTE for the addressed region specifies fuse level 1, then the RMU aligns the address to a 64K address size boundary, and checks whether the fuse level in the RGTE of the region associated with the 64K-aligned address=1. If so, then the current fuse level of the originally addressed region is also 1. On the other hand, if the 64K aligned RGTE has a fuse level of 2 or higher, then the RMU aligns the address to a 2 MB address size boundary, and checks the RGTE associated with the 2 MB aligned address, and if this specifies fuse level=2 then this means the originally addressed region has fuse level 2, and if the fuse level in the 2 MB-aligned RGTE is higher than 2 then further checks of RGTEs of higher level aligned addresses may be needed. Eventually the RMU 20 identifies the current fuse level CL of the addressed region, and validates whether FL=CL+1. If FL does not equal CL+1, then at step 924 the region fuse command is again rejected.

If the addressed region is both valid and has a current fuse level which matches the expected fuse level (the next smallest fused group size after the fused group size corresponding to the target fuse level FL), then at step 928 the address specified by the fuse command is aligned to the size boundary corresponding to the target fuse level FL (e.g. with the specific example shown in FIG. 42, aligned to 64K for level 1 and to 2 MB for level 2). At step 930, the RMU then performs a loop over $N_{FL}$ RGTEs which are at offsets selected based on the target fuse level FL. For example, in the example of FIG. 42, for FL=1 then $N_{FL=1}$=16 and the offset between the RGTEs corresponds to a single RGTE corresponding to a 4K region, while for FL=2 then $N_{FL=2}$=32 and the offset between the RGTEs corresponds to a group of 16 RGTEs corresponding to a 64 KB region. Hence, the looked up RGTEs at these offsets correspond to a selected subset of RGTEs to be updated in the region fuse operation.

For each of these selected subset of RGTEs, the following loop is performed:
  the RGTE is locked to prevent the RGTE being accessible to the MMU in response to other processes, or in response to the RMU in response to other RMU-commands, to prevent RGTEs with partial updates becoming visible to other processes until all of the atomic effects of the region fuse command have been implemented; and
  for any RGTE other than the first RGTE in the selected subset of RGTEs:
    the RMU 20 compares the ownership attributes of the current RGTE (including owner realm, region lifecycle state and visibility attributes) against the corresponding attributes defined for the previously looked up RGTE among the selected subset of RGTEs, to check whether the attributes are the same; and
    the RMU 20 checks whether the mapped address $M_i$ specified in the currently looked up RGTE is contiguous with the mapped address $M_{i+1}$ of the previously looked up RGTE. That is, the mapped address $M_i$ is validated if it corresponds to $M_{i+1}$+offset, where offset is selected based on the target fuse level FL, such that the offset corresponds to the size of a fused group of fuse level FL-1 (e.g. in the example of FIG. 42, for a level 1 command the offset is 4K, for a level 2 command the offset is 64K, and so on).
This loop is repeated for each of the RGTEs of the selected subset. If for any of the selected subset of RGTEs, either the ownership attributes are different from the corresponding attributes set for the preceding RGTE, or the mapped address is not contiguous with the mapped address of the preceding RGTE, then at step 932 any previously locked RGTEs are unlocked and the region fuse command is rejected.

If at step 930 all of the RGTEs pass the validation of the ownership attributes and the mapped address, then at step 934 a reverse loop is performed over the selected subset of RGTEs, in the opposite order to the loop of step 930. In the reverse loop, for each of the selected subset of RGTEs:
- the RMU 20 increments the fuse level specified in that RGTE; and
- the RMU 20 then unlocks that RGTE so that the RGTE can now be accessed by the MMU in response to processes other than the RMU.

Performing the loop of step 934 in the reverse order to the loop of 930 ensures that the very first RGTE of the subset (which corresponds to the address aligned to the group size boundary, and which is the main entry identifying the attributes for the fused group), is the last to be updated and unlocked, to prevent incorrect results which could otherwise be caused by the RGTE at the head of a fused group being accessed or updated before all other RGTEs of the fused group have been updated.

At step 936 the RMU 20 issues a TLB invalidation command specifying the address and a size dependent on the target fuse level FL, to trigger any TLB 100 to invalidate information associated with any of the RGTEs updated at step 934. This helps to improve performance because a subsequent memory access after the TLB invalidation will then trigger fetching of a single fused RGTE to represent the entire fused group, leaving other TLB entries free for caching information for other memory regions.

FIG. 44 shows a flow diagram illustrating a method of processing a region shatter command. At step 950 the region fuse command is received by the RMU 20. The region shatter command can be issued by any software process, including processes other than the owner realm of the regions being fused. The region shatter command specifies an address and an expected fuse level (EFL) indicative of the expected current fused group size of the fused group to be shattered (i.e. a level 2 shatter command specifying EFL=2 is for shattering level 2 fused group into a level 1 fused group). It will be appreciated that in other implementations the fuse level specified by the command could indicate the target fuse level expected to result from shattering (so that a level 1 shatter command with target FL=1 would be for shattering a level 2 fused group into a level 1 fused group). Regardless of how the fuse level is represented, the RMU is able to determine an expected fuse level EFL from the encoding of the region shatter command.

At step 952, the RMU 20 looks up the RGTE for the region associated with the address specified in the region shatter command, and checks whether it is indicated as valid. If the region is not Valid (e.g. in one of the Invalid, RMU-private, or Scrub-Commit states), then at step 954 the region shatter command is rejected.

At step 956, the RMU 20 checks the ownership table to determine whether the expected fuse level EFL derived from the region shatter command matches the current fuse level indicated in the RGT 128 for the addressed region identified by the address specified in the region shatter command. As at step 926 of FIG. 43, this could require walking up or down several RGTEs associated with aligned addresses corresponding to different fuse group sizes, to find the entry which indicates the actual current fuse level for that region. Again, if the region has a different current fuse level to the expected fuse level EFL defined for the region shatter command, then the command is rejected at step 954. If the region shatter command is rejected, no changes are made to the RGT in response to the region shatter command.

If the addressed region is both valid and has a current fuse level which matches the expected fuse level EFL, then at step 958 the address specified by the shatter command is aligned to the size boundary corresponding to the expected/current fuse level EFL (e.g. with the specific example shown in FIG. 42, aligned to 64K for EFL=level 1 and to 2 MB for EFL=level 2). At step 960, the RMU then performs a loop over selected RGTEs starting from the aligned address, at intervals of offsets selected based on the expected fuse level. These are the same subset of RGTEs that would be set in response to the corresponding level of region fuse command. For each of these selected subset of RGTEs, the following loop is performed:
- the RGTE is locked to prevent updates triggered by any other command other than the region shatter command, and to prevent potential access to partially updated information; and
- for all RGTEs other than the first RGTE of the fused group being shattered, the RMU 20 validates whether the current fuse level specified in the RGTE=1 (as shown in FIG. 42 the remaining RGTEs of a fused group of any size should always specify a fuse level of 1).

This loop is repeated for each of the RGTEs of the selected subset. If, for any of the selected subset of RGTEs other than the first RGTE associated with the fused group being shattered, the fuse level is not equal to 1, then at step 962 any previously locked RGTEs are unlocked and the region shatter command is rejected.

If at step 960 all of the RGTEs pass the validation of the fuse level, then at step 964 a reverse loop is performed over the selected subset of RGTEs, in the opposite order to the loop of step 960. In the reverse loop, for each of the selected subset of RGTEs:
- the RMU 20 decrements the fuse level specified in that RGTE; and
- the RMU 20 then unlocks that RGTE so that the RGTE can now be updated, or accessed by the MMU in response to processes other than the RMU.

At step 966 the RMU 20 issues a TLB invalidation command specifying the address and a size dependent on the expected fuse level EFL, to trigger any TLB 100 to invalidate information associated with any of the RGTEs updated at step 964. This ensures that any subsequent access to one of the regions of sub-groups of the shattered group will trigger refetching of the information associated with the accessed region or sub-group, to ensure the latest version of the attributes for that region/sub-group are used (which could now differ from other regions or sub-groups of the same shattered group). Alternatively, step 966 could be omitted if desired, as the fused RGTE could remain in the RGTE as long as none of the attributes for the fused group of regions are changed following the region shatter command. Hence, a TLB invalidation could instead be triggered in response to an update of attributes in the RGTE, rather than in response to the region shatter command.

In the example of FIG. 44, the region shatter command specifies an expected fuse level (EFL). In another variant, the shatter command could omit the indication of the expected fuse level. In this case, step 956 can be omitted (hence the method proceeds straight from step 952 to 958), and at step 958 the expected fuse level (EFL) may be determined simply by looking up the RGT to determine the actual current fuse level of the addressed region.

FIG. 45 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include the applications, operating systems and hypervisor as shown in FIG. 2) which is the same as the application program interface of the hardware architecture being modelled by the simulator program 710. Thus, the program instructions of the target code 700, including the control of memory accesses based on the realm protection functionality described above, may be executed from within the instruction execution environment using the simulator program 710, so that a host computer 730 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to perform data processing in response to one or more software processes;
a-realm management circuitry to maintain an ownership table specifying a plurality of ownership entries, each ownership entry defining ownership attributes for a corresponding region of memory of a predetermined size, the ownership attributes specifying, from among a plurality of realms, an owner realm of the corresponding region, where each realm corresponds to at least a portion of at least one of the software processes and the owner realm has a right to exclude other realms from accessing data stored in the corresponding region; and
memory access circuitry to control access to the memory based on the ownership table; in which:
the realm management circuitry is responsive to a region fuse command specifying a fuse target address indicative of a plurality of contiguous regions of the memory to be fused into a fused group of regions, to perform a region fuse operation to update the ownership table to indicate that the ownership attributes for each region in the fused group of regions are represented by a single ownership entry corresponding to a predetermined region of the fused group; and
at least one of:
the realm management circuitry is configured to allow the region fuse operation to be performed in response to a region fuse command triggered by a realm other than the owner realm specified in the ownership table for the plurality of contiguous regions; and
the realm management circuitry is configured to reject a command specifying an operation to be performed on a single target region of memory of said predetermined size, when the single target region is part of a fused group of regions.

2. The apparatus according to claim 1, in which the memory access circuitry is configured to control access to the memory based on both the ownership table and at least one translation table providing address translation data for translating virtual addresses to physical addresses.

3. The apparatus according to claim 2, comprising at least one translation lookaside buffer to cache information from the address translation tables and the ownership table.

4. The apparatus according to claim 1, wherein in response to the region fuse command, the realm management circuitry is configured to determine whether the region fuse command passes at least one validation check, reject the region fuse command when the at least one validation check is failed, and perform the region fuse operation when the at least one validation check is passed.

5. The apparatus according to claim 4, in which the realm management circuitry is configured to determine that the at least one validation check is failed when different ownership attributes are specified in the ownership entries for any two of the plurality of contiguous regions.

6. The apparatus according to claim 4, in which each ownership entry corresponds to a physically-addressed region of memory, and specifies a mapped address to which a physical address identifying the corresponding region was mapped when the ownership attributes for the corresponding region were set in the ownership table; and the at least one validation check is failed when the ownership entries for the plurality of contiguous regions specify a non-contiguous group of mapped addresses.

7. The apparatus according to claim 4, in which the ownership attributes of each ownership entry specify one of a plurality of region states associated with the corresponding memory region, the region states including at least an invalid state in which the memory region is allowed to be reallocated to a different owner realm, and a valid state in which the memory region is allocated to a given owner realm and prevented from being reallocated to a different owner realm; and the at least one validation check is failed when the ownership entry for any of the plurality of contiguous regions specifies that the region is in a state other than the valid state.

8. The apparatus according to claim 1, in which the ownership table comprises one or more linear tables.

9. The apparatus according to claim 1, in which in response to a group size incrementing form of the region fuse command specifying an indication of a target fused group size, the region fusing operation comprises updating the ownership table to indicate that a plurality of contiguous regions, each associated with fused groups having an expected current fused group size which is the next smallest fused group size than the target fused group size among a plurality of fused group sizes supported by the realm management circuitry, are to fused into a fused group of the target fused group size.

10. The apparatus according to claim 9, in which a minimum fused group size among said plurality of fused group sizes corresponds to said predetermined size of a single region.

11. The apparatus according to claim 9, in which the realm management circuitry is configured to reject the group size incrementing form of the region fuse command when the ownership table indicates that at least one of the plurality of contiguous regions is associated with a current fused group size other than the next smallest fused group size than the target fused group size.

12. The apparatus according to claim 9, in which in response to the group size incrementing form of the region fuse command, the region fusing operation comprises updating a subset of the ownership entries associated with the plurality of contiguous regions, the subset selected depending on the indication of the target fused group size.

13. The apparatus according to claim 12, in which when the expected current fused group size is the minimum fused group size among said plurality of fused group sizes, the subset of the ownership entries comprises the ownership entries associated with all of the plurality of contiguous regions to be fused into the fused group of the target fused group size; and when the expected current fused group size comprises a fused group size other than the minimum fused group size, the subset of the ownership entries comprises the ownership entries associated with less than all of the plurality of contiguous regions to be fused into the fused group.

14. The apparatus according to claim 12, in which the subset comprises ownership entries associated with regions whose addresses are offset by an amount corresponding to the expected current fused group size.

15. The apparatus according to claim 12, in which the subset comprises the same number of ownership entries regardless of which fused group size is the target fused group size.

16. The apparatus according to claim 1, in which the realm management circuitry is responsive to a region shatter command specifying a shatter target address indicative of a fused group of regions to be shattered into subsets of one or more regions, to perform a region shatter operation to update the ownership table to indicate that the ownership attributes for the respective subsets of regions are represented by different ownership entries of the ownership table.

17. The apparatus according to claim 16, comprising a translation lookaside buffer for caching information from the ownership table; in which:

the region shatter operation comprises triggering the translation lookaside buffer to invalidate information associated with the fused group of regions indicated by the shatter target address.

18. The apparatus according to claim 1, in which, during the region fuse operation, the realm management circuitry is configured to lock ownership entries to be updated in the region fuse operation to prevent those ownership entries being updated by other processes until the region fuse operation is complete.

19. The apparatus according to claim 1, in which the owner realm of a given memory region has a right to prevent access to the given memory region by a process executed at a higher privilege level than the owner realm.

20. The apparatus according to claim 1, in which the realm management circuitry comprises one or both of:
dedicated hardware circuitry; and
the processing circuitry executing realm management software.

21. A method comprising:
maintaining an ownership table specifying a plurality of ownership entries, each ownership entry defining ownership attributes for a corresponding region of memory of a predetermined size, the ownership attributes specifying, from among a plurality of realms, an owner realm of the corresponding region, where each realm corresponds to at least a portion of at least one software process processed by processing circuitry, and the owner realm has a right to exclude other realms from accessing data stored in the corresponding region;
controlling access to the memory based on the ownership table;
in response to a region fuse command specifying a fuse target address indicative of a plurality of contiguous regions of the memory to be fused into a fused group of regions, performing a region fuse operation to update the ownership table to indicate that the ownership attributes for each region in the fused group of regions are represented by a single ownership entry corresponding to a predetermined region of the fused group; and
at least one of:
allowing the region fuse operation to be performed in response to a region fuse command triggered by a realm other than the owner realm specified in the ownership table for the plurality of contiguous regions; and rejecting a command specifying an operation to be performed on a single target region of memory of said predetermined size, when the single target region is part of a fused group of regions.

22. A non-transitory storage medium storing a computer program for controlling a host data processing apparatus to simulate processing of one or more software processes on a target data processing apparatus, the computer program comprising:

processing program logic to control the host data processing apparatus to perform data processing in response to target code representing said one or more software processes;

realm management program logic to maintain an ownership table specifying a plurality of ownership entries, each ownership entry defining ownership attributes for a corresponding region of memory of a predetermined size, the ownership attributes specifying, from among a plurality of realms, an owner realm of the corresponding region, where each realm corresponds to at least a portion of at least one of the software processes and the owner realm has a right to exclude other realms from accessing data stored in the corresponding region; and memory access program logic to control access to the memory based on the ownership table; in which:

the realm management program logic is responsive to a region fuse command specifying a fuse target address indicative of a plurality of contiguous regions of the memory to be fused into a fused group of regions, to perform a region fuse operation to update the ownership table to indicate that the ownership attributes for each region in the fused group of regions are represented by a single ownership entry corresponding to a predetermined region of the fused group; and at least one of:

the realm management program logic is configured to allow the region fuse operation to be performed in response to a region fuse command triggered by a realm other than the owner realm specified in the ownership table for the plurality of contiguous regions; and the realm management program logic is configured to reject a command specifying an operation to be performed on a single target region of memory of said predetermined size, when the single target region is part of a fused group of regions.

\* \* \* \* \*